US012523634B2

(12) United States Patent
Bergs

(10) Patent No.: US 12,523,634 B2
(45) Date of Patent: Jan. 13, 2026

(54) ELECTROMAGNETIC TRANSDUCER WITH DUAL FLUX

(71) Applicant: Tommy Bergs, Mölnlycke (SE)

(72) Inventor: Tommy Bergs, Mölnlycke (SE)

(73) Assignee: Cochlear Limited, Macquarie University (AU)

(\*) Notice: Subject to any disclaimer, the term of this patent is extended or adjusted under 35 U.S.C. 154(b) by 725 days.

(21) Appl. No.: 17/347,426

(22) Filed: Jun. 14, 2021

(65) Prior Publication Data

US 2021/0302386 A1   Sep. 30, 2021

Related U.S. Application Data

(62) Division of application No. 15/631,176, filed on Jun. 23, 2017, now Pat. No. 11,035,830.

(51) Int. Cl.
| | |
|---|---|
| *H04R 25/00* | (2006.01) |
| *B06B 1/04* | (2006.01) |
| *G01N 29/24* | (2006.01) |
| *H02K 21/22* | (2006.01) |
| *H02K 23/34* | (2006.01) |
| *H02K 33/00* | (2006.01) |
| *H02K 33/16* | (2006.01) |

(Continued)

(52) U.S. Cl.
CPC .......... *G01N 29/2412* (2013.01); *B06B 1/04* (2013.01); *H02K 21/227* (2013.01); *H02K 23/34* (2013.01); *H02K 33/00* (2013.01); *H02K 33/16* (2013.01); *H04R 9/025* (2013.01); *H04R 9/027* (2013.01); *H04R 9/047* (2013.01); *H04R 25/606* (2013.01); *H04R 2460/13* (2013.01)

(58) Field of Classification Search
CPC .......... B06B 1/04; H04R 9/047; H04R 9/027; H04R 25/606; H04R 9/025; H04R 2460/13; H04R 11/02; H04R 31/003; H02K 21/227; H02K 33/00; H02K 23/34; H02K 33/16; G10H 3/182; H05B 41/32; G01R 33/18
USPC ....................................................... 381/326
See application file for complete search history.

(56) References Cited

U.S. PATENT DOCUMENTS

| | | |
|---|---|---|
| 905,781 A | 12/1908 | Baldwin |
| 4,129,187 A | 12/1978 | Wengryn et al. |
| 4,425,482 A | 1/1984 | Bordelon et al. |

(Continued)

FOREIGN PATENT DOCUMENTS

| | | |
|---|---|---|
| CN | 101931837 A | 12/2010 |
| DE | 19541882 A1 | 5/1997 |

(Continued)

OTHER PUBLICATIONS

Martin Cosenza, "Believed Prior Art", believed to be known or used by others before Jun. 2017.

*Primary Examiner* — Md S Elahee
(74) *Attorney, Agent, or Firm* — Pilloff Passino & Cosenza LLP; Martin J. Cosenza

(57) ABSTRACT

An electromagnetic transducer, including a plurality of static flux paths, and a plurality of dynamic flux paths, wherein at least two of the plurality of static flux paths lie in respective first planes parallel and offset from one another, at least two of the plurality of dynamic flux paths lie in respective second planes parallel and offset from one another, and the first planes and the second planes are arrayed so as to establish at least a general tic-tac-toe lattice.

41 Claims, 40 Drawing Sheets

(51) Int. Cl.
  *H04R 9/02*  (2006.01)
  *H04R 9/04*  (2006.01)

(56) References Cited

U.S. PATENT DOCUMENTS

| | | | |
|---|---|---|---|
| 4,476,451 A | 10/1984 | Kosugi | |
| 5,338,287 A | 8/1994 | Miller et al. | |
| 5,535,097 A | 7/1996 | Ruben et al. | |
| 5,809,157 A | 9/1998 | Grumazescu | |
| 5,814,907 A | 9/1998 | Bandera | |
| 5,913,815 A | 6/1999 | Ball et al. | |
| 5,947,155 A | 9/1999 | Miki et al. | |
| 5,960,875 A | 10/1999 | Beauquin et al. | |
| 6,002,184 A | 12/1999 | Delson et al. | |
| 6,262,648 B1 * | 7/2001 | Lammers | H01H 50/32 335/229 |
| 6,751,334 B2 | 6/2004 | Hakansson | |
| 6,985,599 B2 | 1/2006 | Asnes | |
| 7,319,771 B2 | 1/2008 | Asnes | |
| 8,565,461 B2 | 10/2013 | Asnes | |
| 8,929,577 B2 | 1/2015 | Asnes | |
| 9,130,445 B1 | 9/2015 | Katz et al. | |
| 9,173,040 B2 | 10/2015 | Hakansson | |
| 2003/0034705 A1 | 2/2003 | Hakansson | |
| 2004/0032962 A1 | 2/2004 | Westerkull | |
| 2004/0057588 A1 | 3/2004 | Asnes | |
| 2005/0109197 A1 * | 5/2005 | Garrett | G10H 3/182 84/726 |
| 2005/0135651 A1 | 6/2005 | Hakansson | |
| 2006/0045298 A1 | 3/2006 | Westerkull | |
| 2006/0208600 A1 | 9/2006 | Sahyoun | |
| 2007/0053536 A1 | 3/2007 | Westerkull | |
| 2008/0074055 A1 * | 3/2008 | Peterson | H05B 41/32 315/241 P |
| 2009/0064484 A1 | 3/2009 | Hakansson | |
| 2009/0209806 A1 | 8/2009 | Hakansson | |
| 2010/0145135 A1 | 6/2010 | Ball et al. | |
| 2010/0321009 A1 * | 12/2010 | Lee | H10N 35/00 335/215 |
| 2011/0268303 A1 | 11/2011 | Ahsani | |
| 2012/0237067 A1 | 9/2012 | Asnes | |
| 2012/0255805 A1 | 10/2012 | van Halteren et al. | |
| 2012/0302822 A1 | 11/2012 | Van Himbeeck et al. | |
| 2014/0146995 A1 * | 5/2014 | Adelman | H04R 11/02 381/412 |
| 2014/0193011 A1 * | 7/2014 | Parker | H04R 25/606 381/326 |
| 2014/0270297 A1 | 9/2014 | Gustafsson et al. | |
| 2014/0275731 A1 | 9/2014 | Andersson et al. | |
| 2015/0229239 A1 * | 8/2015 | Takahashi | H02N 2/026 310/323.02 |
| 2015/0373461 A1 * | 12/2015 | Andersson | H04R 25/606 600/25 |
| 2016/0037273 A1 * | 2/2016 | Gustafsson | H04R 25/606 381/326 |
| 2018/0372692 A1 | 12/2018 | Bergs | |

FOREIGN PATENT DOCUMENTS

| | | | |
|---|---|---|---|
| DE | 202004006117 U1 | 7/2004 | |
| DE | 102006026288 A1 | 1/2007 | |
| EP | 0018484 A1 * | 11/1980 | |
| EP | 1965604 A1 | 9/2008 | |
| JP | 2010118877 A | 5/2010 | |
| JP | 2012044245 A | 3/2012 | |
| KR | 100872762 B1 | 12/2008 | |
| TW | 201215174 A | 4/2012 | |
| WO | 9834320 A2 | 8/1998 | |
| WO | 9909785 A1 | 2/1999 | |
| WO | 0167813 A1 | 9/2001 | |
| WO | 03096744 A1 | 11/2003 | |
| WO | 2009110705 A2 | 9/2009 | |
| WO | 2012030270 A1 | 3/2012 | |
| WO | 2012160542 A2 | 11/2012 | |
| WO | WO-2017046716 A1 * | 3/2017 | H04R 31/003 |

* cited by examiner

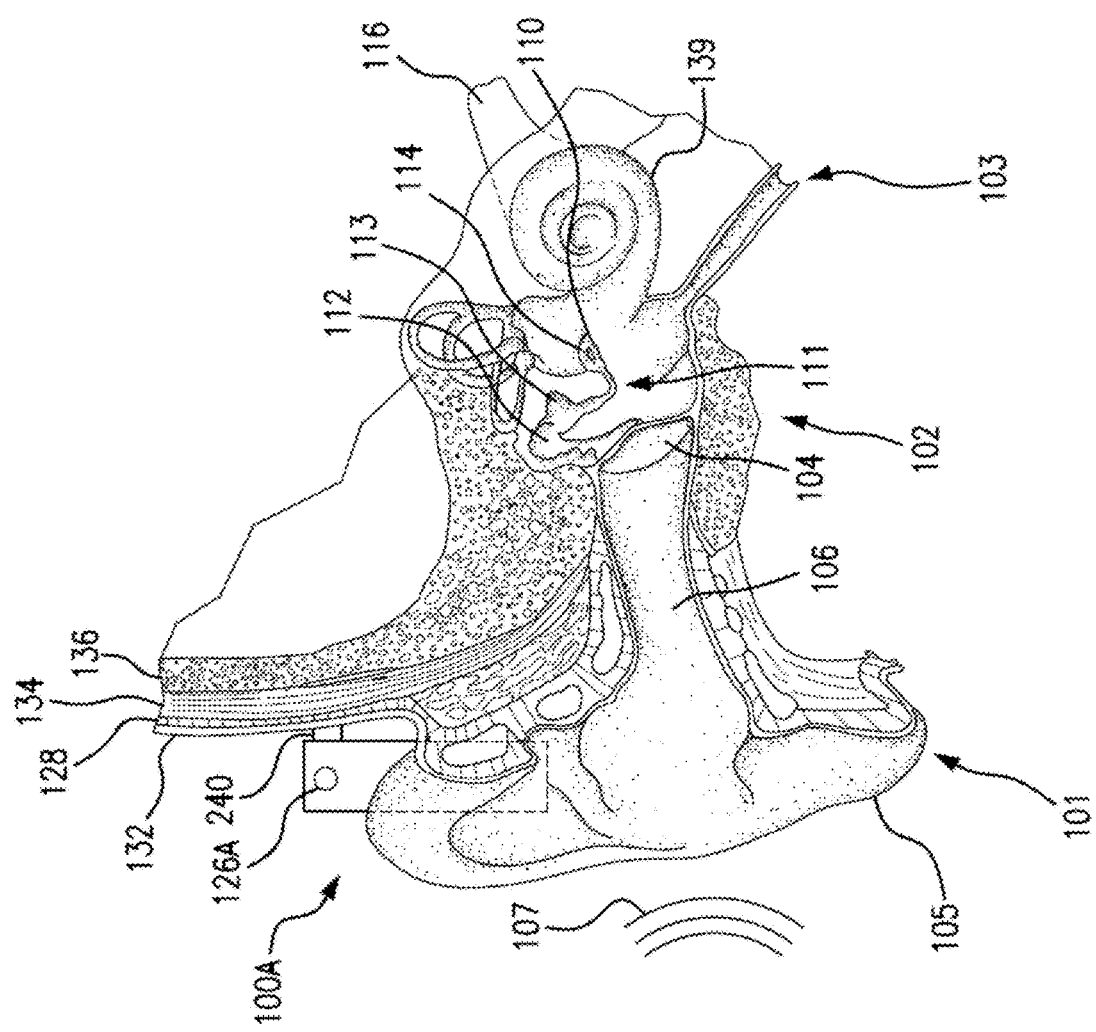

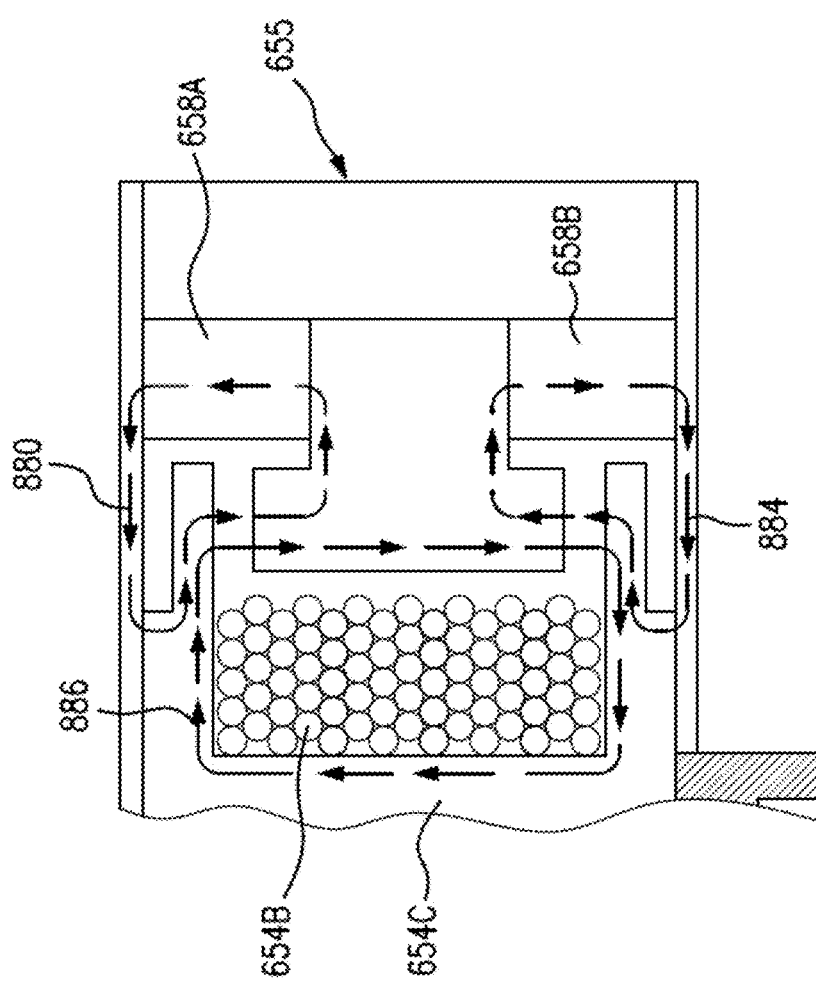

ELECTROMAGNETIC TRANSDUCER WITH DUAL FLUX

CROSS REFERENCE TO RELATED APPLICATIONS

The present application is a Divisional application of U.S. patent application Ser. No. 15/631,176, filed Jun. 23, 2017, naming Tommy BERGS as an inventor, the entire contents of that application being hereby incorporated by reference herein in its entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. For example, cochlear implants use an electrode array implanted in the cochlea of a recipient to bypass the mechanisms of the ear. More specifically, an electrical stimulus is provided via the electrode array to the auditory nerve, thereby causing a hearing percept.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from conductive hearing loss typically receive an acoustic hearing aid. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve.

In contrast to hearing aids, which rely primarily on the principles of air conduction, certain types of hearing prostheses commonly referred to as bone conduction devices, convert a received sound into vibrations. The vibrations are transferred through the skull to the cochlea causing generation of nerve impulses, which result in the perception of the received sound. Bone conduction devices are suitable to treat a variety of types of hearing loss and may be suitable for individuals who cannot derive sufficient benefit from acoustic hearing aids, cochlear implants, etc., or for individuals who suffer from stuttering problems.

SUMMARY

In accordance with one aspect, there is an electromagnetic transducer, comprising a plurality of static flux paths, and a plurality of dynamic flux paths, wherein at least two of the plurality of static flux paths lie in respective first planes parallel and offset from one another, at least two of the plurality of dynamic flux paths lie in respective second planes parallel and offset from one another, and the first planes and the second planes are arrayed so as to establish at least a general tic-tac-toe lattice.

In accordance with another aspect, there is an electromagnetic transducer, comprising a plurality of dynamic flux circuits, wherein a first of the plurality of dynamic flux circuits is established by one or more coils collectively having a first total number of coil turns, a second of the plurality of dynamic flux circuits is established by other one or more coils collectively having a second total number of coil turns, and the first total number of coil turns is less than the second total number of coils.

In accordance with another aspect, there is a prosthesis, comprising an electromagnetic actuator including two dynamic magnetic flux circuits that are mechanically connected to each other, wherein the prosthesis is configured to be at least one of implanted in or worn on a human.

In accordance with another aspect, there is a hearing prosthesis, comprising an electromagnetic actuator, and a sound capture apparatus, wherein the sound capture apparatus is configured to transduce sounds in at least a first range of 300 Hz to 4000 Hz, and relative to the first range, the actuator is optimized for performance at, relative to the first range, both a low frequency and a high frequency.

In accordance with another aspect, there is an electromagnetic transducer, comprising a first static magnetic flux circuit generated by at least one permanent magnet and a plurality of dynamic magnetic flux circuits, wherein at least two of the plurality of dynamic flux circuits interact with the static magnetic flux circuit to enable transduction.

In accordance with another aspect, there is an electromagnetic transducer, comprising at least one active air gap, wherein the active air gap is a non-axial air gap.

In accordance with another aspect, there is an electromagnetic transducer, comprising at least one dynamic magnetic flux circuit and a seismic mass assembly, wherein both sides of an air gap crossed by the dynamic magnetic flux are established by the seismic mass assembly.

In accordance with another aspect, there is an electromagnetic transducer, comprising a seismic mass and a dynamic magnetic field generator, wherein the generated dynamic magnetic field crosses an air gap that expands and contracts with movement of the seismic mass relative to a stationary component of the transducer, and the respective amounts of movement of the seismic mass at the center of gravity thereof relative to the stationary component in a first direction and a second direction opposite the first direction relative to the non-energized state is more than the respective amounts of expansion and contraction of the air gap from a non-energized.

BRIEF DESCRIPTION OF THE DRAWINGS

Some embodiments are described below with reference to the attached drawings, in which:

FIG. 1A is a perspective view of an exemplary bone conduction device in which at least some embodiments can be implemented;

FIGS. 8A and 8B are schematic diagrams detailing static and dynamic magnetic flux in the vibratory actuator-coupling assembly at the moment that the coils are energized when the bobbin assembly and the counterweight assembly are at a balance point with respect to magnetically induced relative movement between the two;

DETAILED DESCRIPTION

Figure 1B:
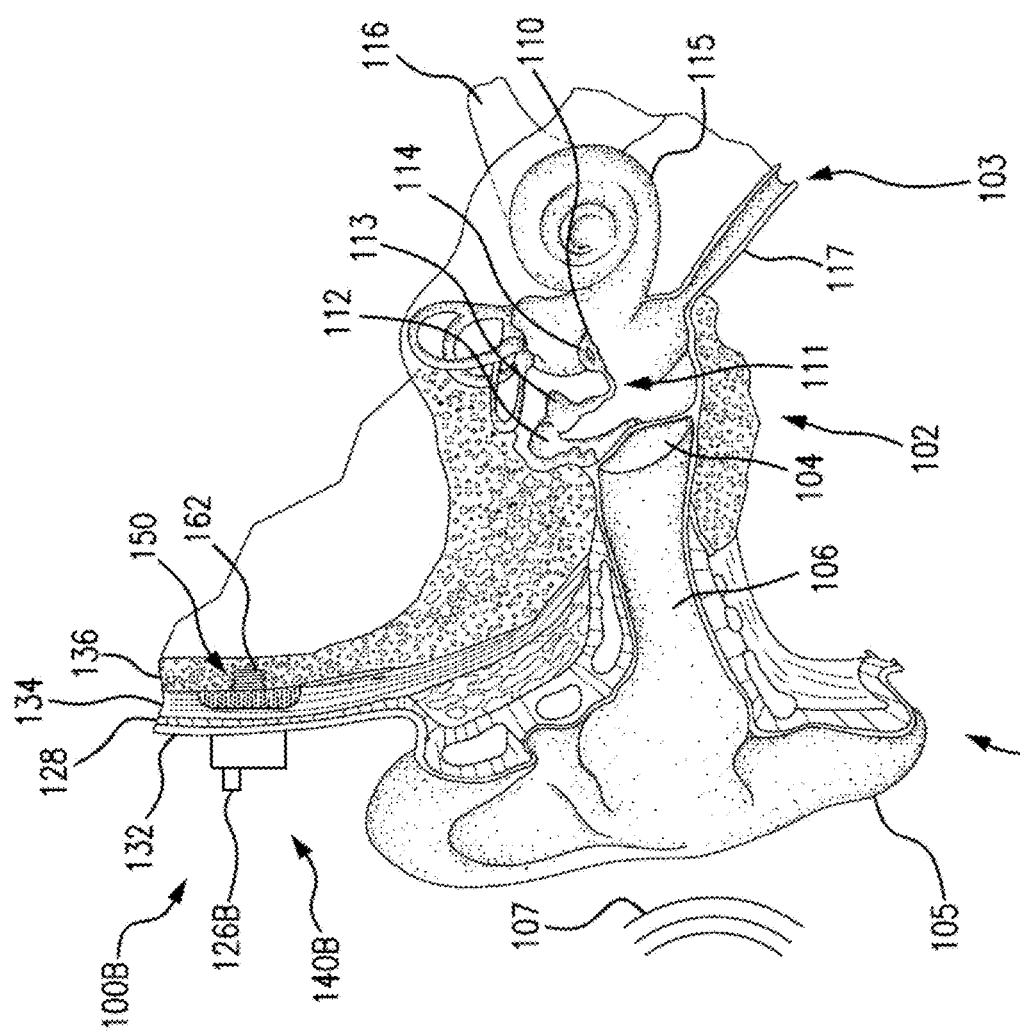
FIG. 1B is a perspective view of an alternate exemplary bone conduction device in which at least some embodiments can be implemented.

FIG. 1A is a perspective view of a bone conduction device 100A in which embodiments may be implemented. As shown, the recipient has an outer ear 101, a middle ear 102 and an inner ear 103. Elements of outer ear 101, middle ear 102 and inner ear 103 are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 210 through three bones of middle ear 102, collectively referred to as the ossicles 111 and comprising the malleus 112, the incus 113 and the stapes 114. The ossicles 111 of middle ear 102 serve to filter and amplify acoustic wave 107, causing oval window 210 to vibrate. Such vibration sets up waves of fluid motion within cochlea 139. Such fluid motion, in turn, activates hair cells (not shown) that line the inside of cochlea 139. Activation of the hair cells causes appropriate nerve impulses to be transferred through the spiral ganglion cells and auditory nerve 116 to the brain (not shown), where they are perceived as sound.

FIG. 1A also illustrates the positioning of bone conduction device 100A relative to outer ear 101, middle ear 102 and inner ear 103 of a recipient of device 100. As shown, bone conduction device 100 is positioned behind outer ear 101 of the recipient and comprises a sound input element 126A to receive sound signals. Sound input element may comprise, for example, a microphone, telecoil, etc. In an exemplary embodiment, sound input element 126A may be located, for example, on or in bone conduction device 100A, or on a cable extending from bone conduction device 100A.

In an exemplary embodiment, bone conduction device 100A comprises an operationally removable component and a bone conduction implant. The operationally removable component is operationally releasably coupled to the bone conduction implant. By operationally releasably coupled, it is meant that it is releasable in such a manner that the recipient can relatively easily attach and remove the operationally removable component during normal use of the bone conduction device 100A. Such releasable coupling is accomplished via a coupling assembly of the operationally removable component and a corresponding mating apparatus of the bone conduction implant, as will be detailed below. This as contrasted with how the bone conduction implant is attached to the skull, as will also be detailed below. The operationally removable component includes a sound processor (not shown), a vibratory electromagnetic actuator and/or a vibratory piezoelectric actuator and/or other type of actuator (not shown-which are sometimes referred to herein as a species of the genus vibrator) and/or various other operational components, such as sound input device 126A. In this regard, the operationally removable component is sometimes referred to herein as a vibrator unit. More particularly, sound input device 126A (e.g., a microphone) converts received sound signals into electrical signals. These electrical signals are processed by the sound processor. The sound processor generates control signals which cause the actuator to vibrate. In other words, the actuator converts the electrical signals into mechanical motion to impart vibrations to the recipient's skull.

As illustrated, the operationally removable component of the bone conduction device 100A further includes a coupling assembly 240 configured to operationally removably attach the operationally removable component to a bone conduction implant (also referred to as an anchor system and/or a fixation system) which is implanted in the recipient. In the embodiment of FIG. 1, coupling assembly 240 is coupled to the bone conduction implant (not shown) implanted in the recipient in a manner that is further detailed below with respect to exemplary embodiments of the bone conduction implant. Briefly, an exemplary bone conduction implant may include a percutaneous abutment attached to a bone fixture via a screw, the bone fixture being fixed to the recipient's skull bone 136. The abutment extends from the bone fixture which is screwed into bone 136, through muscle 134, fat 128 and skin 232 so that the coupling assembly may be attached thereto. Such a percutaneous abutment provides an attachment location for the coupling assembly that facilitates efficient transmission of mechanical force.

It is noted that while many of the details of the embodiments presented herein are described with respect to a percutaneous bone conduction device, some or all of the teachings disclosed herein may be utilized in transcutaneous bone conduction devices and/or other devices that utilize a vibratory electromagnetic actuator. For example, embodiments include active transcutaneous bone conduction systems utilizing the electromagnetic actuators disclosed herein and variations thereof where at least one active component (e.g. the electromagnetic actuator) is implanted beneath the skin. Embodiments also include passive transcutaneous bone conduction systems utilizing the electromagnetic actuators disclosed herein and variations thereof where no active component (e.g., the electromagnetic actuator) is implanted beneath the skin (it is instead located in an external device), and the implantable part is, for instance a magnetic pressure plate. Some embodiments of the passive transcutaneous bone conduction systems are configured for use where the vibrator (located in an external device) containing the electromagnetic actuator is held in place by pressing the vibrator against the skin of the recipient. In an exemplary embodiment, an implantable holding assembly is implanted in the recipient that is configured to press the bone conduction device against the skin of the recipient. In other embodiments, the vibrator is held against the skin via a magnetic coupling (magnetic material and/or magnets being implanted in the recipient and the vibrator having a magnet and/or magnetic material to complete the magnetic circuit, thereby coupling the vibrator to the recipient).

More specifically, FIG. 1B is a perspective view of a transcutaneous bone conduction device 100B in which embodiments can be implemented.

FIG. 1A also illustrates the positioning of bone conduction device 100B relative to outer ear 101, middle ear 102 and inner ear 103 of a recipient of device 100. As shown, bone conduction device 100 is positioned behind outer ear 101 of the recipient. Bone conduction device 100B comprises an external component 140B and implantable component 150. The bone conduction device 100B includes a sound input element 126B to receive sound signals. As with sound input element 126A, sound input element 126B may comprise, for example, a microphone, telecoil, etc. In an exemplary embodiment, sound input element 126B may be located, for example, on or in bone conduction device 100B, on a cable or tube extending from bone conduction device 100B, etc. Alternatively, sound input element 126B may be subcutaneously implanted in the recipient, or positioned in the recipient's ear. Sound input element 126B may also be a component that receives an electronic signal indicative of sound, such as, for example, from an external audio device. For example, sound input element 126B may receive a sound signal in the form of an electrical signal from an MP3 player electronically connected to sound input element 126B.

Bone conduction device 100B comprises a sound processor (not shown), an actuator (also not shown) and/or various other operational components. In operation, sound input device 126B converts received sounds into electrical signals. These electrical signals are utilized by the sound processor to generate control signals that cause the actuator to vibrate. In other words, the actuator converts the electrical signals into mechanical vibrations for delivery to the recipient's skull.

In accordance with some embodiments, a fixation system 162 may be used to secure implantable component 150 to skull 136. As described below, fixation system 162 may be a bone screw fixed to skull 136, and also attached to implantable component 150.

In one arrangement of FIG. 1B, bone conduction device 100B is a passive transcutaneous bone conduction device. That is, no active components, such as the actuator, are implanted beneath the recipient's skin 132. In such an arrangement, the active actuator is located in external component 140B, and implantable component 150 includes a magnetic plate, as will be discussed in greater detail below. The magnetic plate of the implantable component 150 vibrates in response to vibration transmitted through the skin, mechanically and/or via a magnetic field, that are generated by an external magnetic plate.

In another arrangement of FIG. 1B, bone conduction device 100B is an active transcutaneous bone conduction device where at least one active component, such as the actuator, is implanted beneath the recipient's skin 132 and is thus part of the implantable component 150. As described below, in such an arrangement, external component 140B may comprise a sound processor and transmitter, while implantable component 150 may comprise a signal receiver and/or various other electronic circuits/devices.

Figure 2:
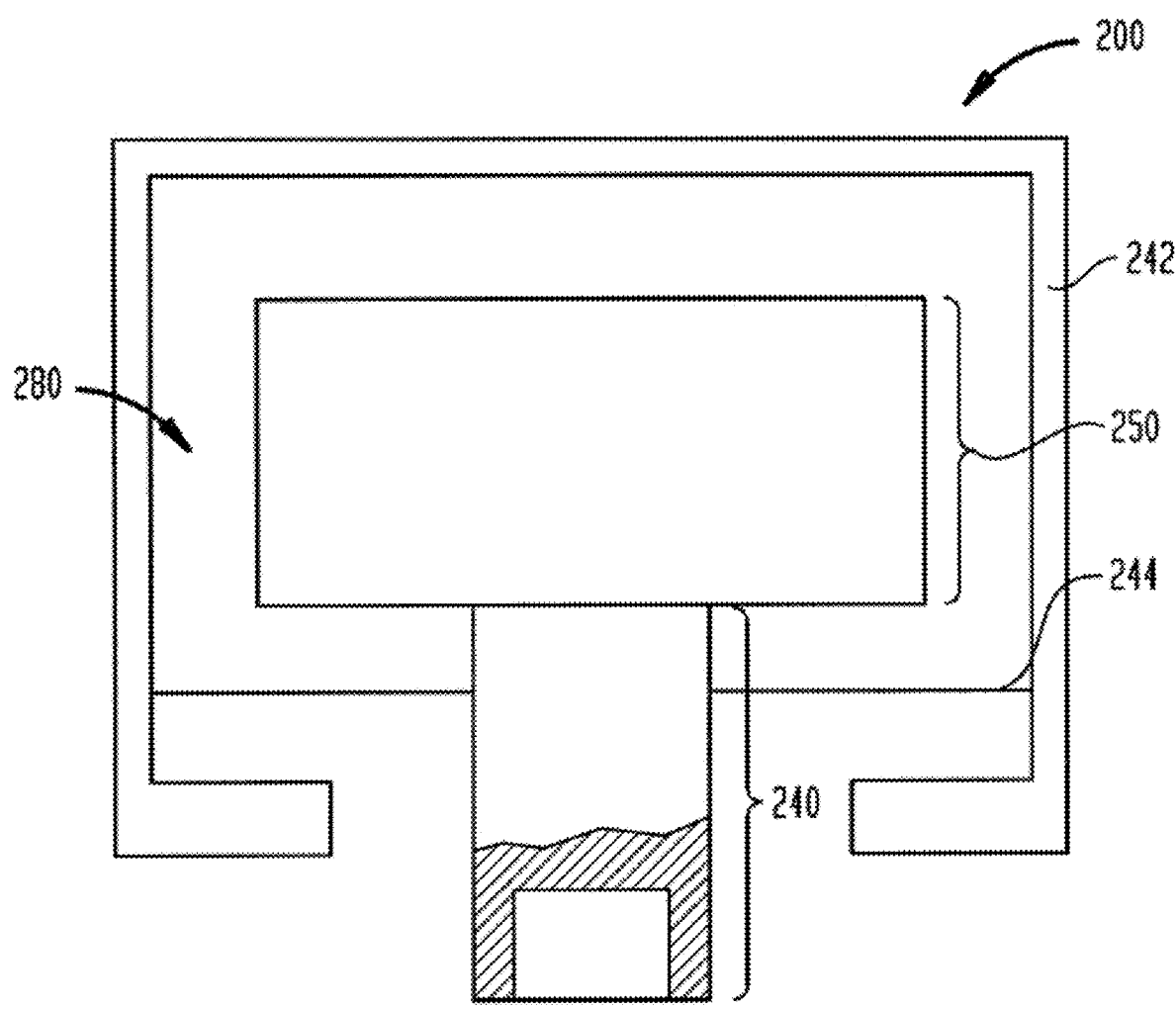
FIG. 2 is a schematic diagram conceptually illustrating a removable component of a percutaneous bone conduction device in accordance with at least some exemplary embodiments.

FIG. 2 is an embodiment of a bone conduction device 200 in accordance with an embodiment corresponding to that of FIG. 1A, illustrating use of a percutaneous bone conduction device. Bone conduction device 200, corresponding to, for example, element 100A of FIG. 1A, includes a housing 242, a vibratory electromagnetic actuator 250, a coupling assembly 240 that extends from housing 242 and is mechanically linked to vibratory electromagnetic actuator 250. Collectively, vibratory electromagnetic actuator 250 and coupling assembly 240 form a vibratory actuator-coupling assembly 280. Vibratory actuator-coupling assembly 280 is suspended in housing 242 by spring 244. In an exemplary embodiment, spring 244 is connected to coupling assembly 240, and vibratory electromagnetic actuator 250 is supported by coupling assembly 240.

Figure 3:
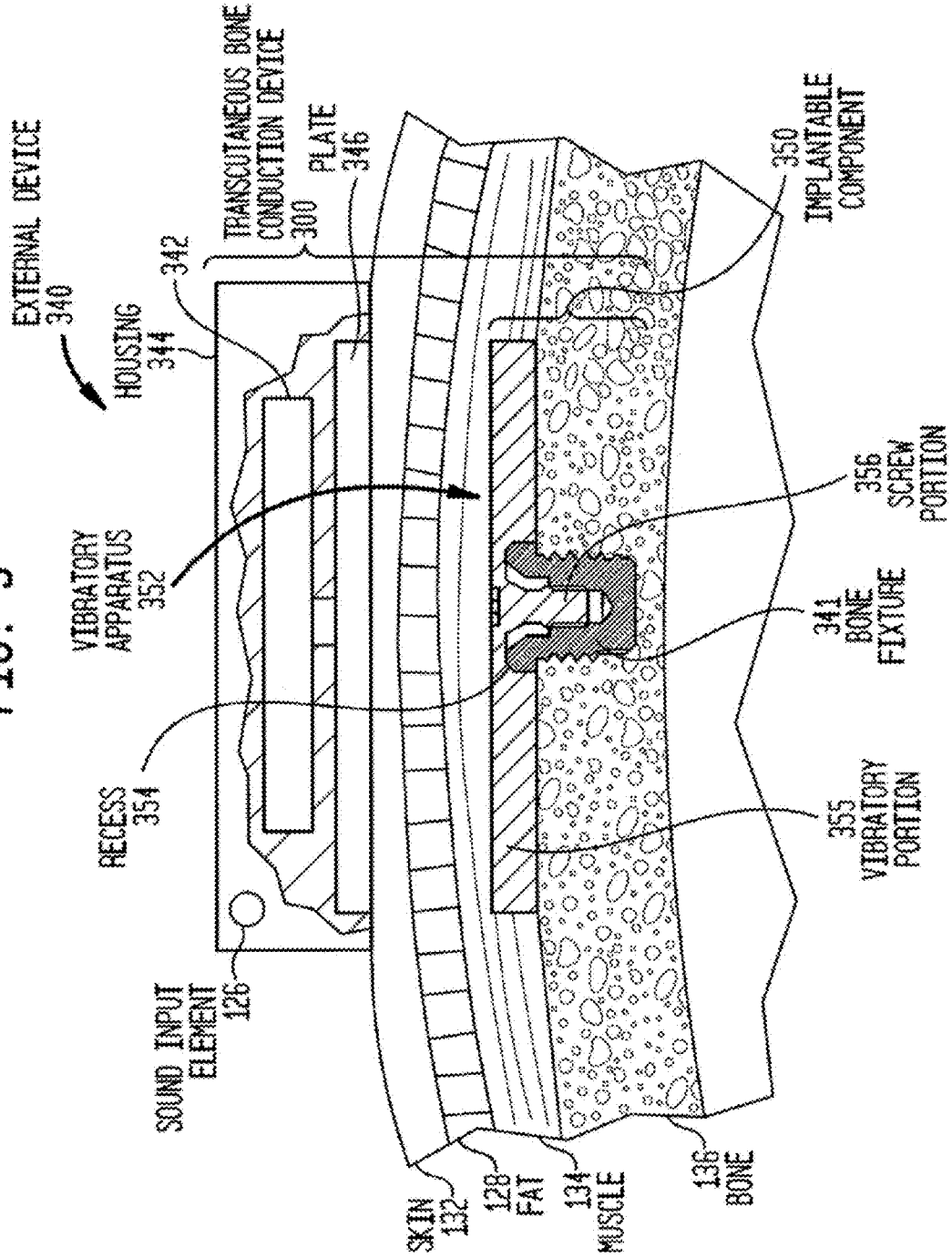
FIG. 3 is a schematic diagram conceptually illustrating a passive transcutaneous bone conduction device in accordance with at least some exemplary embodiments.

FIG. 3 depicts an exemplary embodiment of a transcutaneous bone conduction device 300 according to an embodiment that includes an external device 340 (corresponding to, for example, element 140B of FIG. 1B) and an implantable component 350 (corresponding to, for example, element 150 of FIG. 1B). The transcutaneous bone conduction device 300 of FIG. 3 is a passive transcutaneous bone conduction device in that a vibratory electromagnetic actuator 342 is located in the external device 340. Vibratory electromagnetic actuator 342 is located in housing 344 of the external component, and is coupled to plate 346. Plate 346 may be in the form of a permanent magnet and/or in another form that generates and/or is reactive to a magnetic field, or otherwise permits the establishment of magnetic attraction between the external device 340 and the implantable component 350 sufficient to hold the external device 340 against the skin of the recipient.

In an exemplary embodiment, the vibratory electromagnetic actuator 342 is a device that converts electrical signals into vibration. In operation, sound input element 126 converts sound into electrical signals. Specifically, the transcutaneous bone conduction device 300 provides these electrical signals to vibratory actuator 342, or to a sound processor (not shown) that processes the electrical signals, and then provides those processed signals to vibratory electromagnetic actuator 342. The vibratory electromagnetic actuator 342 converts the electrical signals (processed or unprocessed) into vibrations. Because vibratory electromagnetic actuator 342 is mechanically coupled to plate 346, the vibrations are transferred from the vibratory actuator 342 to plate 346. Implanted plate assembly 352 is part of the implantable component 350, and is made of a ferromagnetic material that may be in the form of a permanent magnet, that generates and/or is reactive to a magnetic field, or otherwise permits the establishment of a magnetic attraction between the external device 340 and the implantable component 350 sufficient to hold the external device 340 against the skin of the recipient. Accordingly, vibrations produced by the vibratory electromagnetic actuator 342 of the external device 340 are transferred from plate 346 across the skin to plate 355 of plate assembly 352. This can be accomplished as a result of mechanical conduction of the vibrations through the skin, resulting from the external device 340 being in direct contact with the skin and/or from the magnetic field between the two plates. These vibrations are transferred without penetrating the skin with a solid object such as an abutment as detailed herein with respect to a percutaneous bone conduction device.

As may be seen, the implanted plate assembly 352 is substantially rigidly attached to a bone fixture 341 in this embodiment. Plate screw 356 is used to secure plate assembly 352 to bone fixture 341. The portions of plate screw 356 that interface with the bone fixture 341 substantially correspond to an abutment screw discussed in some additional detail below, thus permitting plate screw 356 to readily fit into an existing bone fixture used in a percutaneous bone conduction device. In an exemplary embodiment, plate screw 356 is configured so that the same tools and procedures that are used to install and/or remove an abutment screw (described below) from bone fixture 341 can be used to install and/or remove plate screw 356 from the bone fixture 341 (and thus the plate assembly 352).

Figure 4:
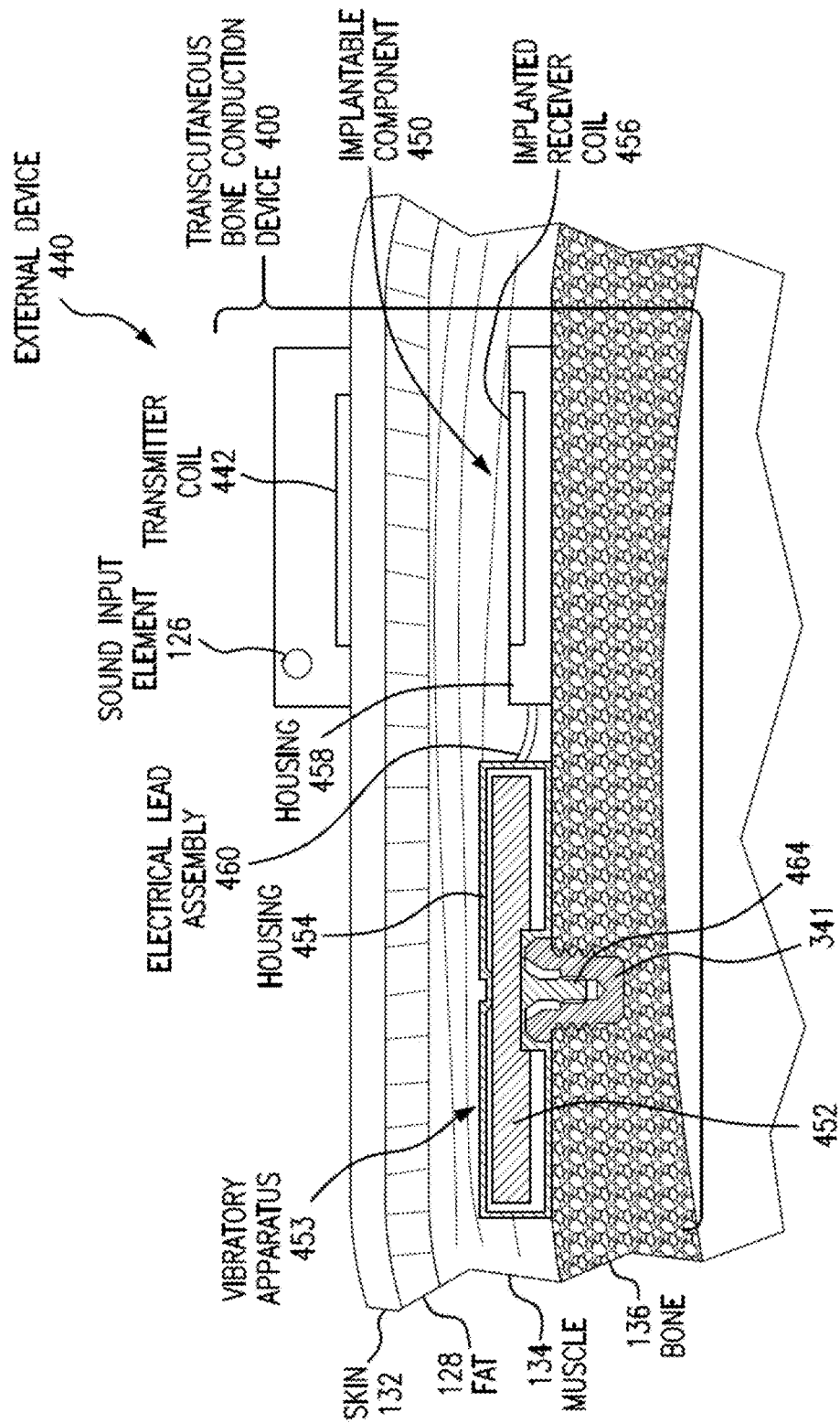
FIG. 4 is a schematic diagram conceptually illustrating an active transcutaneous bone conduction device in accordance with at least some exemplary embodiments.

FIG. 4 depicts an exemplary embodiment of a transcutaneous bone conduction device 400 according to another embodiment that includes an external device 440 (corresponding to, for example, element 140B of FIG. 1B) and an implantable component 450 (corresponding to, for example, element 150 of FIG. 1B). The transcutaneous bone conduction device 400 of FIG. 4 is an active transcutaneous bone conduction device in that the vibratory actuator 452 is located in the implantable component 450. Specifically, a vibratory element in the form of vibratory actuator 452 is located in housing 454 of the implantable component 450. In an exemplary embodiment, much like the vibratory actuator 342 described above with respect to transcutaneous bone conduction device 300, the vibratory actuator 452 is a device that converts electrical signals into vibration.

External component 440 includes a sound input element 126 that converts sound into electrical signals. Specifically, the transcutaneous bone conduction device 400 provides these electrical signals to vibratory electromagnetic actuator 452, or to a sound processor (not shown) that processes the electrical signals, and then provides those processed signals to the implantable component 450 through the skin of the recipient via a magnetic inductance link. In this regard, a transmitter coil 442 of the external component 440 transmits these signals to implanted receiver coil 456 located in housing 458 of the implantable component 450. Components (not shown) in the housing 458, such as, for example, a signal generator or an implanted sound processor, then generate electrical signals to be delivered to vibratory actuator 452 via electrical lead assembly 460. The vibratory electromagnetic actuator 452 converts the electrical signals into vibrations.

The vibratory electromagnetic actuator 452 is mechanically coupled to the housing 454. Housing 454 and vibratory actuator 452 collectively form a vibratory element 453. The housing 454 is substantially rigidly attached to bone fixture 341.

Some exemplary features of the vibratory electromagnetic actuator usable in some embodiments of the bone conduction devices detailed herein and/or variations thereof will now be described in terms of a vibratory electromagnetic actuator used in the context of the percutaneous bone conduction device of FIG. 1A. It is noted that any and/or all of these features and/or variations thereof may be utilized in transcutaneous bone conduction devices such as those of FIGS. 1B, 3 and 4 and/or other types of prostheses and/or medical devices and/or other devices, at least with respect to enabling utilitarian performance thereof. It is also noted that while the embodiments detailed herein are detailed with respect to an electromagnetic actuator, the teachings associated therewith are equally applicable to electromagnetic transducers that receive vibrations and output a signal indicative of the vibrations, at least unless otherwise noted. In this regard, it is noted that use of the term actuator herein also corresponds to transducer, and vice-versa, unless otherwise noted.

Figure 5:
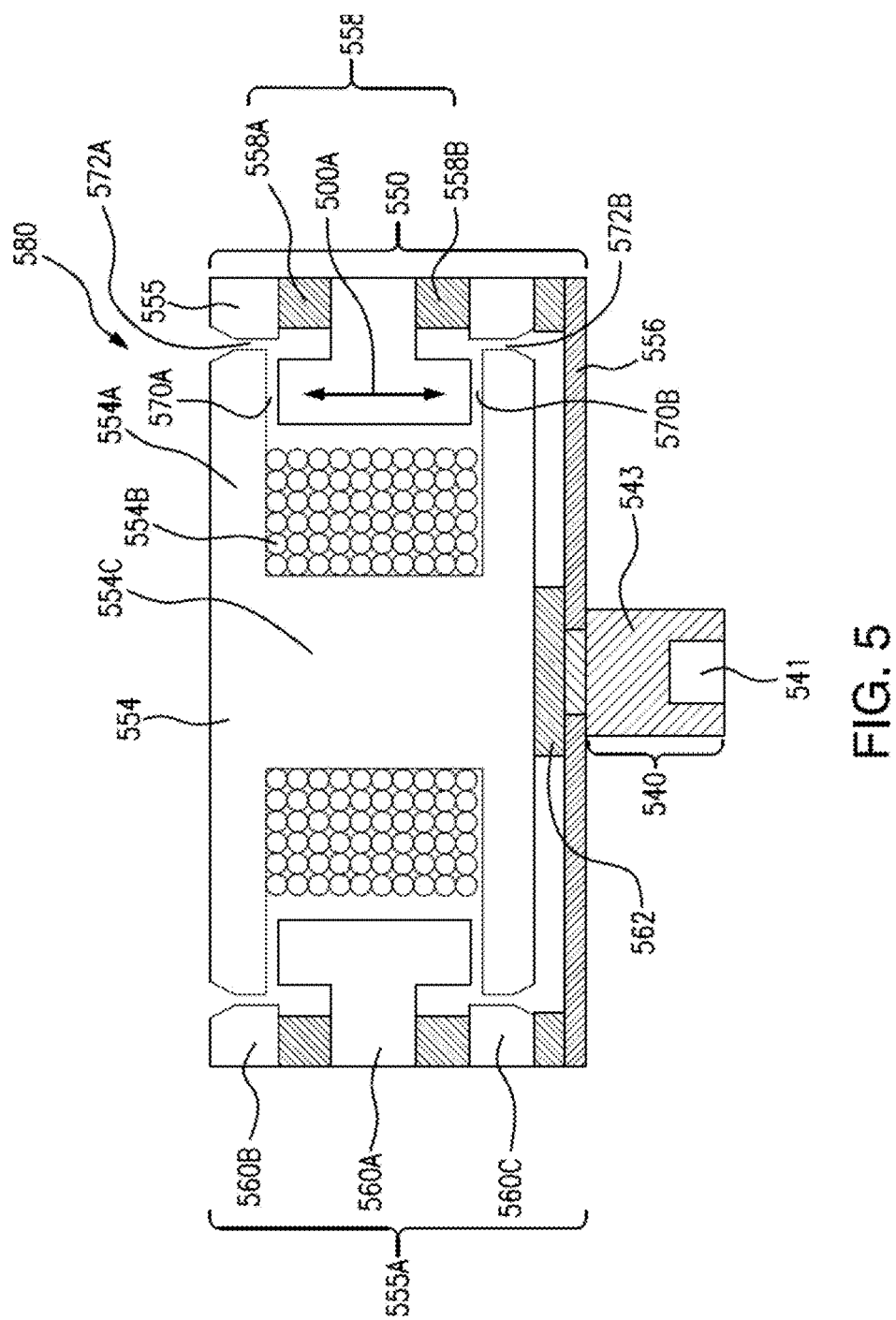
FIG. 5 is a cross-sectional view of an example of a vibratory actuator-coupling assembly of the bone conduction device of FIG. 2.

FIG. 5 is a cross-sectional view of a vibratory actuator-coupling assembly 580, which can correspond to vibratory actuator-coupling assembly 280 detailed above. The vibratory actuator-coupling assembly 580 includes a vibratory electromagnetic actuator 550 and a coupling assembly 540. Coupling assembly 540 includes a coupling 541 mounted on coupling shaft 543. Additional details pertaining to the coupling assembly are described further below with respect to the embodiment of FIG. 6A.

As illustrated in FIG. 5, vibratory electromagnetic actuator 550 includes a bobbin assembly 554 and a counterweight assembly 555. As illustrated, bobbin assembly 554 includes a bobbin 554A and a coil 554B that is wrapped around a core 554C of bobbin 554A. In the illustrated embodiment, bobbin assembly 554 is radially symmetrical.

Counterweight assembly 555 includes spring 556, permanent magnets 558A and 558B, yokes 560A, 560B and 560C, and spacer 562. Spacer 562 provides a connective support between spring 556 and the other elements of counterweight assembly 555 just detailed. Spring 556 connects bobbin assembly 554 via spacer 524 to the rest of counterweight assembly 555, and permits counterweight assembly 555 to move relative to bobbin assembly 554 upon interaction of a dynamic magnetic flux, produced by bobbin assembly 554.

Coil 554B, in particular, may be energized with an alternating current to create the dynamic magnetic flux about coil 554B. Conversely, permanent magnets 558A and 558B generate a static magnetic flux. These permanent magnets 558A and 558B are part of counterweight assembly 555, which also includes yokes 560A, 560B and 560C. The yokes 560A, 560B and 560C can be made of a soft iron in some embodiments.

As may be seen, vibratory electromagnetic actuator 550 includes two axial air gaps 570A and 570B that are located between bobbin assembly 554 and counterweight assembly 555. With respect to a radially symmetrical bobbin assembly 554 and counterweight assembly 555, such as that detailed in FIG. 5, air gaps 570A and 570B extend in the direction of relative movement between bobbin assembly 554 and counterweight assembly 555, indicated by arrow 500A.

Further as may be seen in FIG. 5, the vibratory electromagnetic actuator 550 includes two radial air gaps 572A and 572B that are located between bobbin assembly 554 and counterweight assembly 555. With respect to a radially symmetrical bobbin assembly 554 and counterweight assembly 555, the air gap extends about the direction of relative movement between bobbin assembly 554 and counterweight assembly 555. As may be seen in FIG. 5, the permanent magnets 558A and 558B are arranged such that their respective south poles face each other and their respective north poles face away from each other. It is noted that in an alternate embodiment, the reverse can be the case (respective north poles face towards each other and respective south poles face away from each other).

In the electromagnetic actuator of FIG. 5, the radial air gaps 572A and 572B close static magnetic flux between the bobbin 554A and the yokes 560B and 560C, respectively. Further, axial air gaps 570A and 570B close the static and dynamic magnetic flux between the bobbin 554A and the yoke 560A. Accordingly, in the radially symmetrical device of FIG. 5, there are a total of four (4) air gaps.

It is noted that the electromagnetic actuator of FIG. 5 is a balanced actuator. In alternate configuration a balanced actuator can be achieved by adding additional axial air gaps above and below the outside of bobbin 554B (and in some variations thereof, the radial air gaps are not present due to the addition of the additional axial air gaps). In such an alternate configuration, the yokes 560B and 560C are reconfigured to extend up and over the outside of bobbin 554B (the geometry of the permanent magnets 558A and 558B and/or the yoke 560A might also be reconfigured to achieve utility of the actuator).

Some embodiments of a balanced electromagnetic transducer will now be described that utilize fewer air gaps than the configuration of FIG. 5 and the alternate variations as described above. In some exemplary embodiments, the electromagnetic actuator (balanced and/or unbalanced, as detailed below) is achieved by providing functionality to a resilient element, such as by way of example and not by way of limitation, a spring, beyond that which is normally associated therewith. Embodiments detailed herein are detailed with respect to a spring. It is noted, however, that in alternate embodiments of these embodiments and/or variations thereof, the disclosure of spring also corresponds to the disclosure of a resilient element. More particularly, not only does the spring provide resilient elasticity concomitant with the traditional use of the spring, but the spring also provides a conduit for magnetic flux (static and/or dynamic). In an exemplary embodiment utilizing a spring having such functionality, one or more of the above mentioned air gaps with respect to the embodiment of FIG. 5 (e.g. the radial air gaps) are eliminated and/or one or more of the soft iron parts utilized in that embodiment are not utilized in this exemplary embodiment.

More particularly, it is noted that the balance electromagnetic actuator of FIG. 5 relies on at least four air gaps (while the embodiment of FIG. 5 is depicted as including two axial air gaps and two radial air gaps, other balance electromagnetic actuators utilize four axial air gaps). An exemplary embodiment includes a spring having dual functionality as a traditional spring, on the one hand, and a conduit for magnetic flux, on the other hand, such that at least one or two of the air gaps of the embodiment of FIG. 5 can eliminated. Functionality according to a "traditional spring" includes, for example, an device that elastically deforms/moves from its unloaded position when pushed or pulled or pressed (i.e., subjected to load) and then returns to its original shape/returns to is unloaded position when the pushing, pulling or pressing is removed (load is removed).

In this regard, in some embodiments, there is an electromagnetic actuator that is balanced that has only two air gaps (both axial air gaps) owing to the fact that the spring(s) replaces two of the radial air gaps. That is, the magnetic flux is conducted through spring(s) instead of through air gaps. An exemplary embodiment of such will now be described, followed by some exemplary descriptions of some alternate embodiments.

Figure 6A:
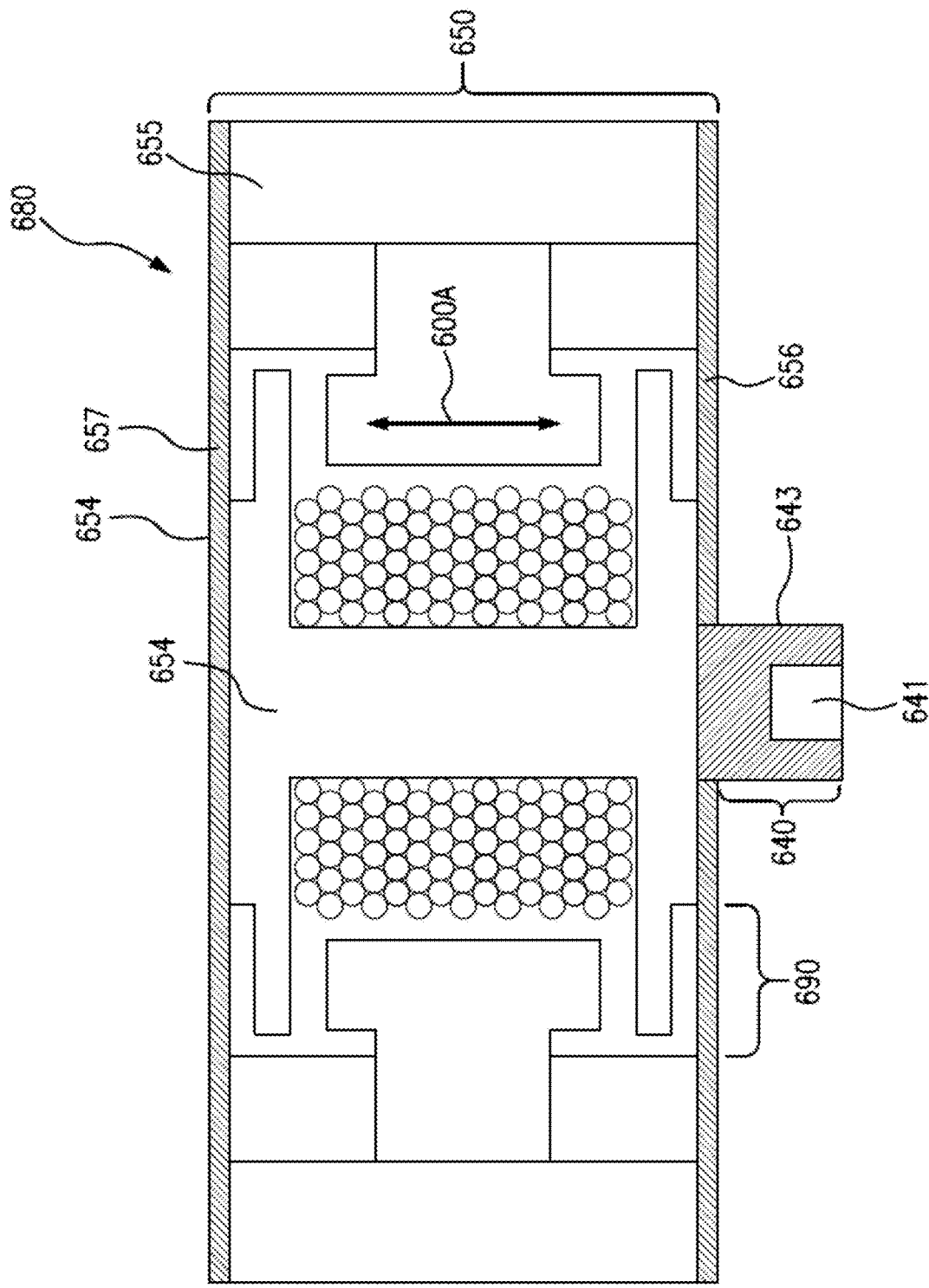
FIG. 6A is a cross-sectional view of an embodiment of a vibratory actuator-coupling assembly of the bone conduction device of FIG. 2.

FIG. 6A is a cross-sectional view of a vibratory actuator-coupling assembly 680, which can correspond to vibratory actuator-coupling assembly 280 detailed above.

Coupling assembly 640 includes a coupling 641 in the form of a snap coupling configured to "snap couple" to an anchor system on the recipient. As noted above with reference to FIG. 1, the anchor system may include an abutment that is attached to a fixture screw implanted into the recipient's skull and extending percutaneously through the skin so that snap coupling 341 can snap couple to a coupling of the abutment of the anchor system. In the embodiment depicted in FIG. 6A, coupling 641 is located at a distal end-relative to housing 242 if vibratory actuator-coupling assembly 680 were installed in bone conduction device 200 of FIG. 2 (i.e., element 680 being substituted for element 280 of FIG. 2)—of a coupling shaft 643 of coupling assembly 640. In an embodiment, coupling 641 corresponds to coupling described in U.S. patent application Ser. No. 12/177,091 assigned to Cochlear Limited. In yet other embodiments, alternate couplings can be used.

Coupling assembly 640 is mechanically coupled to vibratory electromagnetic actuator 650 configured to convert electrical signals into vibrations. In an exemplary embodiment, vibratory electromagnetic actuator 650 (and/or any vibratory electromagnetic actuator detailed herein and/or variations thereof) corresponds to vibratory electromagnetic actuator 250 or vibratory electromechanical actuator 342 or vibratory electromechanical actuator 452 detailed above, and, accordingly, in some embodiments, the teachings detailed above and/or variations thereof with respect to such actuators are included in the genus of devices, genus of systems and/or genus of methods of utilizing the vibratory electromagnetic actuator 650 and/or any vibratory electromagnetic actuator detailed herein and/or variations thereof. This is further detailed below.

In operation, sound input element 126A (FIG. 1A) converts sound into electrical signals. As noted above, the bone conduction device provides these electrical signals to a sound processor which processes the signals and provides the processed signals to the vibratory electromagnetic actuator 650 (and/or any other electromagnetic actuator detailed herein and/or variations thereof—it is noted that unless otherwise specified, any teaching herein concerning a given embodiment is applicable to any variation thereof and/or any other embodiment and/or variations thereof), which then converts the electrical signals (processed or unprocessed) into vibrations. Because vibratory electromagnetic actuator 650 is mechanically coupled to coupling assembly 640, the vibrations are transferred from vibratory electromagnetic actuator 650 to coupling assembly 640 and then to the recipient via the anchor system (not shown).

As noted, the teachings detailed herein and/or variations thereof with respect to any given electromagnetic transducer are not only applicable to a percutaneous bone conduction device such as that according to the embodiment of FIG. 2, but also to a transcutaneous bone conduction device such as those according to embodiments of FIG. 3 and FIG. 4. In this regard, the electromagnetic transducers detailed herein and/or variations thereof can be substituted for the vibratory actuator 342 of the embodiment of FIG. 3 and the vibratory actuator 452 of the embodiment of FIG. 4. Accordingly, some embodiments include an active transcutaneous bone conduction device having the electromagnetic transducers detailed herein and/or variations thereof. Also, some embodiments include a passive transcutaneous bone conduction device having the electromagnetic transducers detailed herein and/or variations thereof. It is further again noted that other medical devices and/or other devices can utilize the electromagnetic transducers detailed herein and/or variations thereof.

Figure 6B:
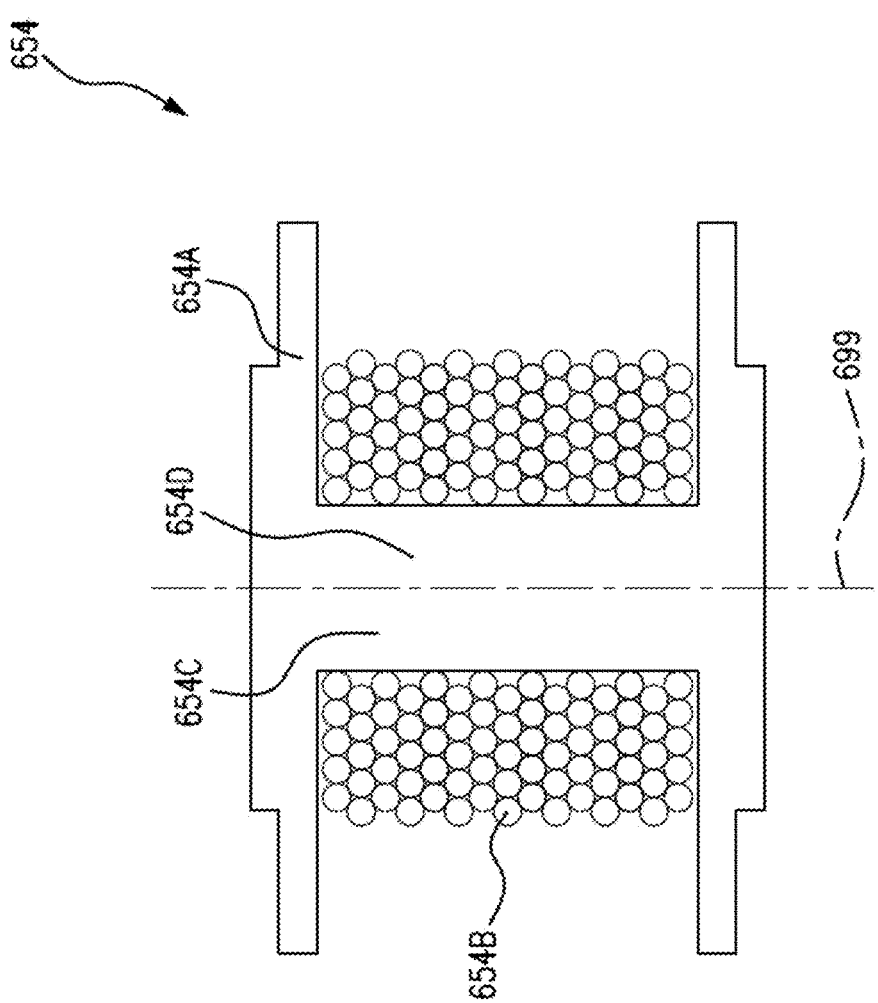
FIG. 6B is a cross-sectional view of the bobbin assembly of the vibratory actuator-coupling assembly of FIG. 3A.

As illustrated in FIG. 6A, vibratory electromagnetic actuator 650 includes a bobbin assembly 654, a counterweight assembly 655 and coupling assembly 640. For ease of visualization, FIG. 6B depicts bobbin assembly 654 separately. As illustrated, bobbin assembly 654 includes a bobbin 654A and a coil 654B that is wrapped around a core 654C of bobbin 654A. In the illustrated embodiment, bobbin assembly 654 is radially symmetrical (i.e., symmetrical about the longitudinal axis 699.

Figure 6C:
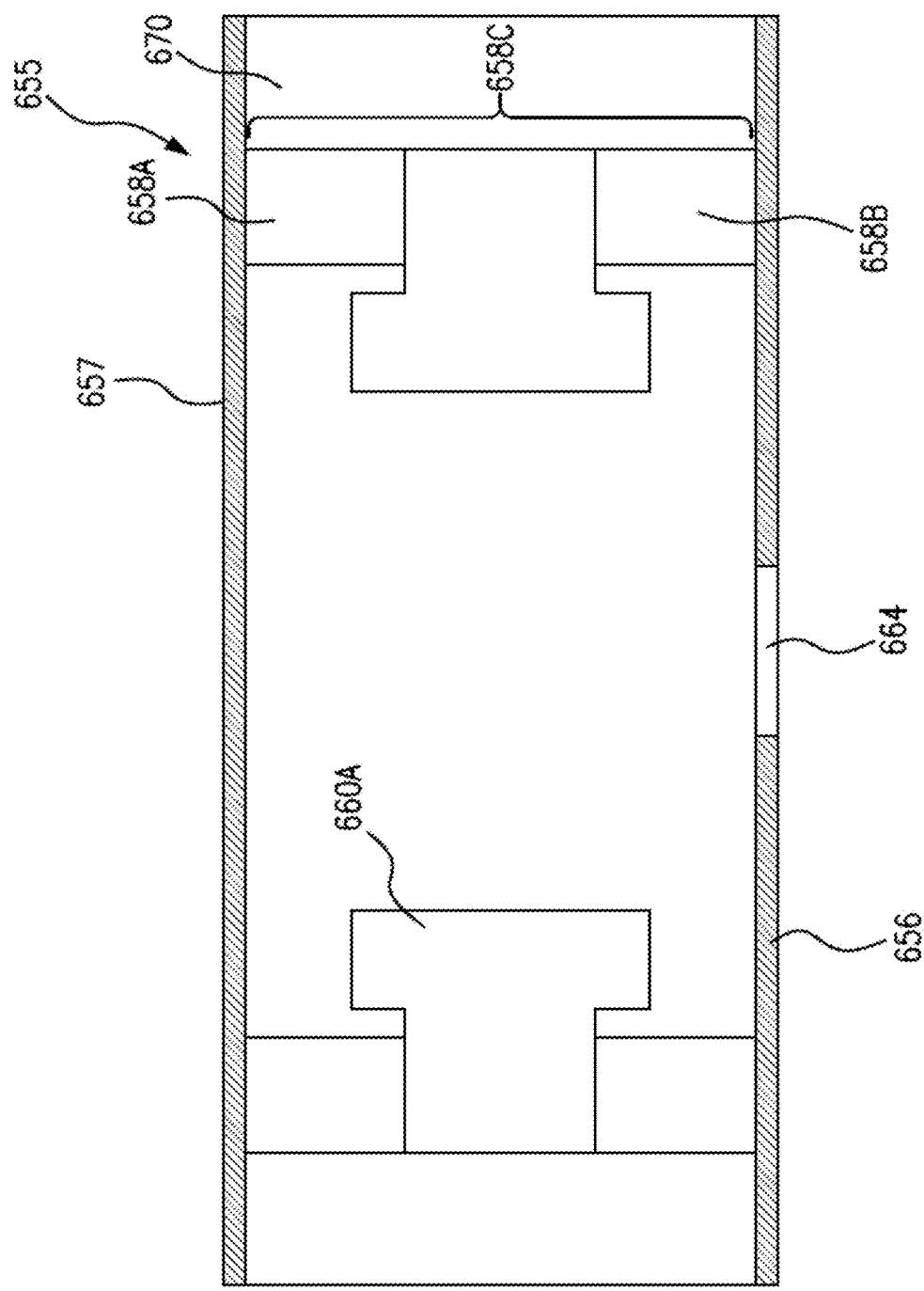
FIG. 6C is a cross-sectional view of the counterweight assembly of the vibratory actuator-coupling assembly of FIG. 3A.

FIG. 6C illustrates counterweight assembly 655 separately, for ease of visualization. As illustrated, counterweight assembly 655 includes springs 656 and 657, permanent magnets 658A and 658B, yoke 660A, and counterweight mass 670. Springs 656 and 657 connect bobbin assembly 654 to the rest of counterweight assembly 655, and permit counterweight assembly 655 to move relative to bobbin assembly 654 upon interaction of a dynamic magnetic flux, produced by bobbin assembly 654. In this regard, with reference back to FIG. 6A, spring 656 includes a flexible section 690 that is not directly connected to any component of the bobbin assembly 654 or to any component of the counterweight assembly 655 that flexes, as will be further detailed below. Along these lines, spring 656 can be directly adhesively bonded, riveted, bolted, welded, etc., directly to the bobbin assembly 654 and/or to any component of the counterweight assembly 655 so as to hold the components together/in contact with one another such that embodiments detailed herein and/or variations thereof can be practiced. Any device, system or method that can be utilized to connect the components of the vibratory actuator-coupling assembly can be utilized in at least some of the embodiments detailed herein and/or variations thereof.

As can be seen, the two permanent magnets 658A and 658B respectively directly contact the springs 656 and 657. That is, there is no yoke or other component (e.g., in the form of a ring) interposed between the magnets and the springs. Accordingly, the magnetic flux generated by the magnets flows directly into the springs without passing through an intermediary component or without passing through a gap. However, it is noted that in an alternate embodiment, there can be an intermediary component, such as a yoke or the like. Further, in some embodiments, there can be a gap between the magnets and the springs.

The dynamic magnetic flux is produced by energizing coil 654B with an alternating current. The static magnetic flux is produced by permanent magnets 658A and 658B of counterweight assembly 655, as will be described in greater detail below. In this regard, counterweight assembly 655 is a static magnetic field generator and bobbin assembly 654 is a dynamic magnetic field generator. As may be seen in FIGS. 6A and 6C, hole 664 in spring 656 provides a feature that permits coupling assembly 641 to be rigidly connected to bobbin assembly 654.

It is noted that while embodiments presented herein are described with respect to a bone conduction device where counterweight assembly 655 includes permanent magnets 658A and 658B that surround coil 654b and moves relative to coupling assembly 640 during vibration of vibratory electromagnetic actuator 650, in other embodiments, the coil may be located on the counterweight assembly 655 as well, thus adding weight to the counterweight assembly 655 (the additional weight being the weight of the coil).

As noted, bobbin assembly 654 is configured to generate a dynamic magnetic flux when energized by an electric current. In this exemplary embodiment, bobbin 654A is made of a soft iron. Coil 654B may be energized with an alternating current to create the dynamic magnetic flux about coil 654B. The iron of bobbin 654A is conducive to the establishment of a magnetic conduction path for the dynamic magnetic flux. Conversely, counterweight assembly 655, as a result of permanent magnets 658A and 658B, in combination with yoke 660A and springs 656 (this feature being described in greater detail below), at least the yoke, in some embodiments, being made from soft iron, generate, due to the permanent magnets, a static magnetic flux. The soft iron of the bobbin and yokes may be of a type that increases the magnetic coupling of the respective magnetic fields, thereby providing a magnetic conduction path for the respective magnetic fields.

Figure 7:
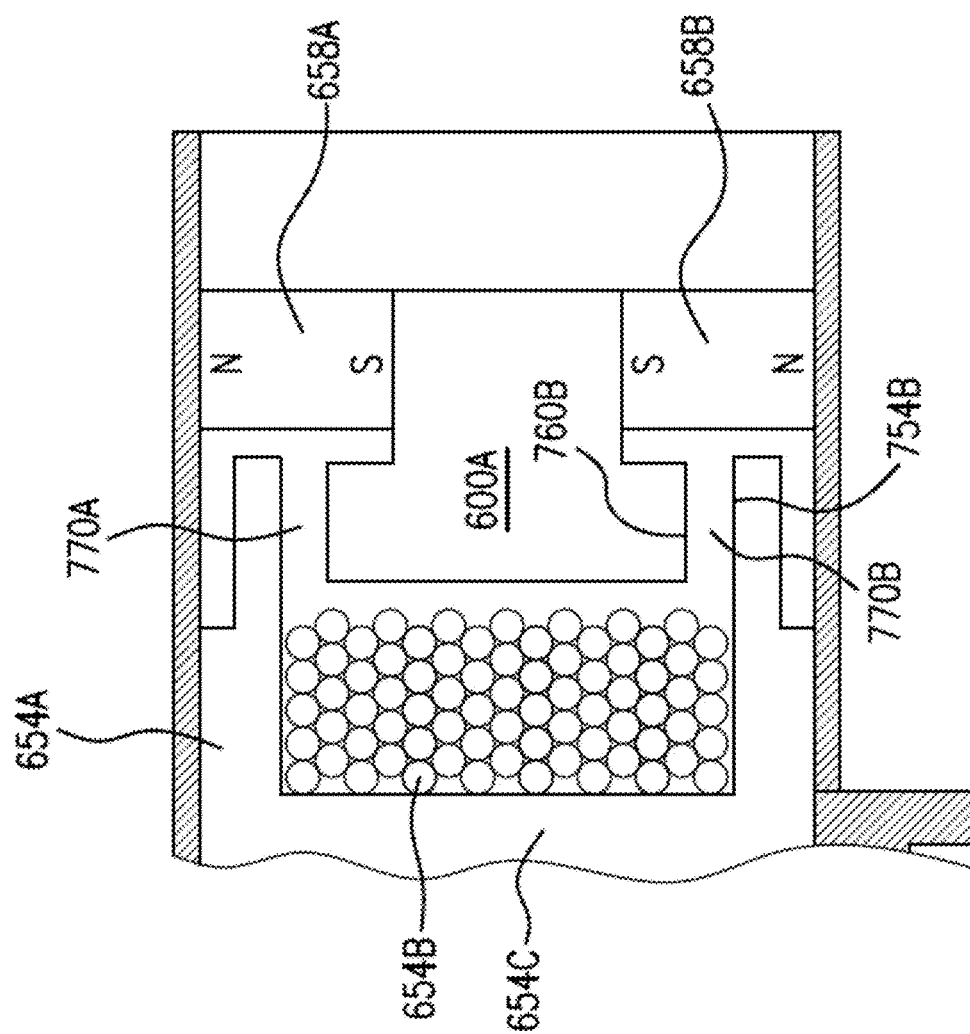
FIG. 7 is a schematic diagram of a portion of the vibratory actuator-coupling assembly of FIG. 6A.

FIG. 7 depicts a portion of FIG. 6A. As may be seen, vibratory electromagnetic actuator 650 includes two axial air gaps 770A and 770B that are located between bobbin assembly 654 and counterweight assembly 655. As used herein, the phrase "axial air gap" refers to an air gap that has at least a component that extends on a plane normal to the direction of primary relative movement (represented by arrow 600A in FIG. 6A-more on this below) between bobbin assembly 654 and counterweight assembly 655 such that the air gap is bounded by the bobbin assembly 654 and counterweight assembly 655 in the direction of relative movement between the two.

Accordingly, the phrase "axial air gap" is not limited to an annular air gap, and encompasses air gaps that are formed by straight walls of the components (which may be present in embodiments utilizing bar magnets and bobbins that have a non-circular (e.g. square) core surface). With respect to a radially symmetrical bobbin assembly 654 and counterweight assembly 655, cross-sections of which are depicted in FIGS. 6A-7, air gaps 770A and 770B extend in the direction of relative movement between bobbin assembly 654 and counterweight assembly 655, air gaps 770A and 770B are bounded as detailed above in the "axial" direction. With respect to FIG. 7, the boundaries of axial air gap 770B are defined by surface 754B of bobbin 654A and surface 760B of yoke 660A.

It is noted that the primary direction of relative motion of the counterweight assembly of the electromagnetic transducer is parallel to the longitudinal direction of the electromagnetic transducer, and with respect to utilization of the transducers in a bone conduction device, normal to the tangent of the surface of the bone 136 (or, more accurately, an extrapolated surface of the bone 136) local to the bone fixtures. It is noted that by "primary direction of relative motion," it is recognized that the counterweight assembly may move inward towards the longitudinal axis of the electromagnetic actuator owing to the flexing of the springs (providing, at least, that the spring does not stretch outward, in which case it may move outward or not move in this dimension at all), but that most of the movement is normal to this direction.

Further as may be seen in FIG. 7, in contrast to the device of FIG. 5, the vibratory electromagnetic actuator 650 includes no radial air gaps located, for example, between bobbin assembly 654 and counterweight assembly 655. As used herein, the phrase "radial air gap" refers to an air gap that has at least a component that extends on a plane normal to the direction of relative movement between bobbin assembly 654 and counterweight assembly 655 such that the air gap is bounded by bobbin assembly 654 and counterweight assembly 655 in a direction normal to the primary direction of relative movement between the two (represented by arrow 600A in FIG. 6A). Accordingly, in some exemplary embodiments, due to the feature of the conductive springs 656 and 657, the radial air gaps of the configuration of FIG. 5 are not utilized in the embodiment of FIG. 6A and variations thereof, and, in some embodiments and variations thereof, there are no additional axial air gaps than those depicted in FIG. 6A.

As can be seen in FIG. 7, the permanent magnets 658A and 658B are arranged such that their respective south poles face each other and their respective north poles face away from each other. It is noted that in other embodiments, the respective south poles may face away from each other and the respective north poles may face each other.

Figure 8A:
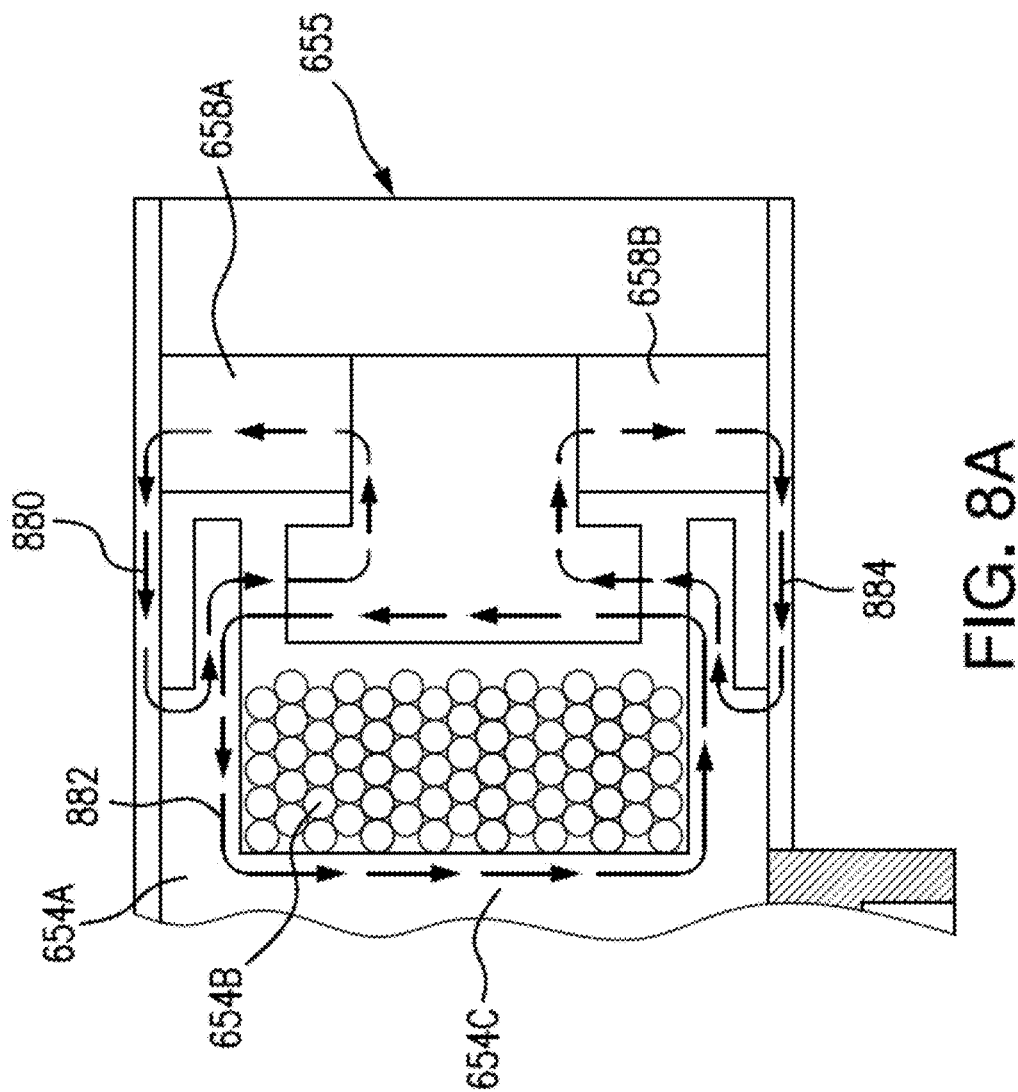

FIG. 8A is a schematic diagram detailing the respective static magnetic flux 880 and static magnetic flux 884 of permanent magnets 658A and 658B, and dynamic magnetic flux 882 of coil 654B in vibratory actuator-coupling assembly 680 when coil 654B is energized according to a first current direction and when bobbin assembly 654 and counterweight assembly 655 are at a balance point with respect to magnetically induced relative movement between the two (hereinafter, the "balance point"). That is, while it is to be understood that the counterweight assembly 655 moves in an oscillatory manner relative to the bobbin assembly 654 when the coil 654B is energized, there is an equilibrium point at the fixed location corresponding to the balance point at which the counterweight assembly 654 returns to relative to the bobbin assembly 654 when the coil 654B is not energized.

FIG. 8B is a schematic diagram detailing the respective static magnetic flux 880 and static magnetic flux 884 of permanent magnets 658A and 658B, and dynamic magnetic flux 886 of coil 654B in vibratory actuator-coupling assembly 680 when coil 654B is energized according to a second current direction (a direction opposite the first current direction) and when bobbin assembly 654 and counterweight assembly 655 are at a balance point with respect to magnetically induced relative movement between the two.

It is noted that FIGS. 8A and 8B do not depict the magnitude/scale of the magnetic fluxes. In this regard, it is noted that in some embodiments, at the moment that coil 654B is energized and when bobbin assembly 654 and counterweight assembly 655 are at the balance point, relatively little, if any, static magnetic flux flows through the core 654C of the bobbin 654A/the space 654D (see FIG. 6B) in the coil 654B (the space 654D being formed as a result of the coil 654B being wound about, and at least partially filled by, the core 654C of the bobbin 654A). Accordingly, FIGS. 8A and 8B depict this fact. However, during operation, the amount of static magnetic flux that flows through the core increases as the bobbin assembly 654 travels away from the balance point (both downward and upward away from the balance point) and decreases as the bobbin assembly 654 travels towards the balance point (both downward and upward towards the balance point). Still, the amount that travels through the core is minimal compared to the amount the travels through the respective air gaps. In this regard, static magnetic flux circuits 880 and 884 as depicted in FIG. 8A represent an ideal static magnetic flux path, where it is to be understood that magnetic flux, albeit relatively limited quantities, can also travel outside this ideal path.

As can be seen from FIGS. 8A and 8B, the static magnetic flux and the dynamic magnetic flux all cross the same air gaps, and there are no air gaps crossed by the static magnetic flux that are not cross by the dynamic magnetic flux, at least with respect to the ideal paths of the static magnetic flux and the dynamic magnetic flux.

It is noted that the directions and paths of the static magnetic flux and dynamic magnetic flux are representative of some exemplary embodiments, and in other embodiments, the directions and/or paths of the fluxes can vary from those depicted.

As may be seen from FIGS. 8A and 8B, axial air gaps 770A and 770B close static magnetic flux circuits 880 and 884. It is noted that the phrase "air gap" refers to a gap between the component that produces a static magnetic field and a component that produces a dynamic magnetic field where there is a relatively high reluctance but magnetic flux still flows through the gap. The air gap closes the magnetic field. In an exemplary embodiment, the air gaps are gaps in which little to no material having substantial magnetic aspects is located in the air gap. Accordingly, an air gap is not limited to a gap that is filled by air.

Still with reference to FIGS. 8A and 8B, it is noted that static magnetic flux circuits 880 and 884 each constitute closed flux paths/closed circuits. These paths/circuits are considered herein to be "local circuits" in that they are local to the individual permanent magnets that generate the circuit. As can be seen, each closed static magnetic flux path depicted in FIGS. 8A and 8B travels across no more than one air gap. That said, it is noted that in some embodiments or in potentially all embodiments, there is a static magnetic flux that travels across both air gaps. Such a scenario can exist in the case of trace flux and/or in the case of movement of the counterweight assembly 655 from the balance point, where some of the flux from one magnet travels through one air gap and some flux travels through another air gap. Without being bound by theory, such can exist in the scenario where the static magnetic flux also travels through the core of the bobbin. Still, even in such a scenario, there is a closed static magnetic flux path that travels across only one air gap. The path, however, is considered herein to be a "global" circuit as it extends outside the local circuit owing to, for example, its travels through the core of the bobbin.

FIGS. 8A and 8B clearly depict that the static magnetic flux generated by the counterweight assembly 655 travels across only two air gaps. This is as contrasted to the embodiment of FIG. 5, where the generated static magnetic flux crosses four air gaps. In this regard, an exemplary embodiment includes a balanced electromagnetic transducer where only two air gaps are present.

As can be seen from the figures, the dynamic magnetic flux also crosses both air gaps. In an exemplary embodiment, neither the dynamic magnetic flux nor the static magnetic flux crosses an air gap at the other does not cross.

Figure 9A:
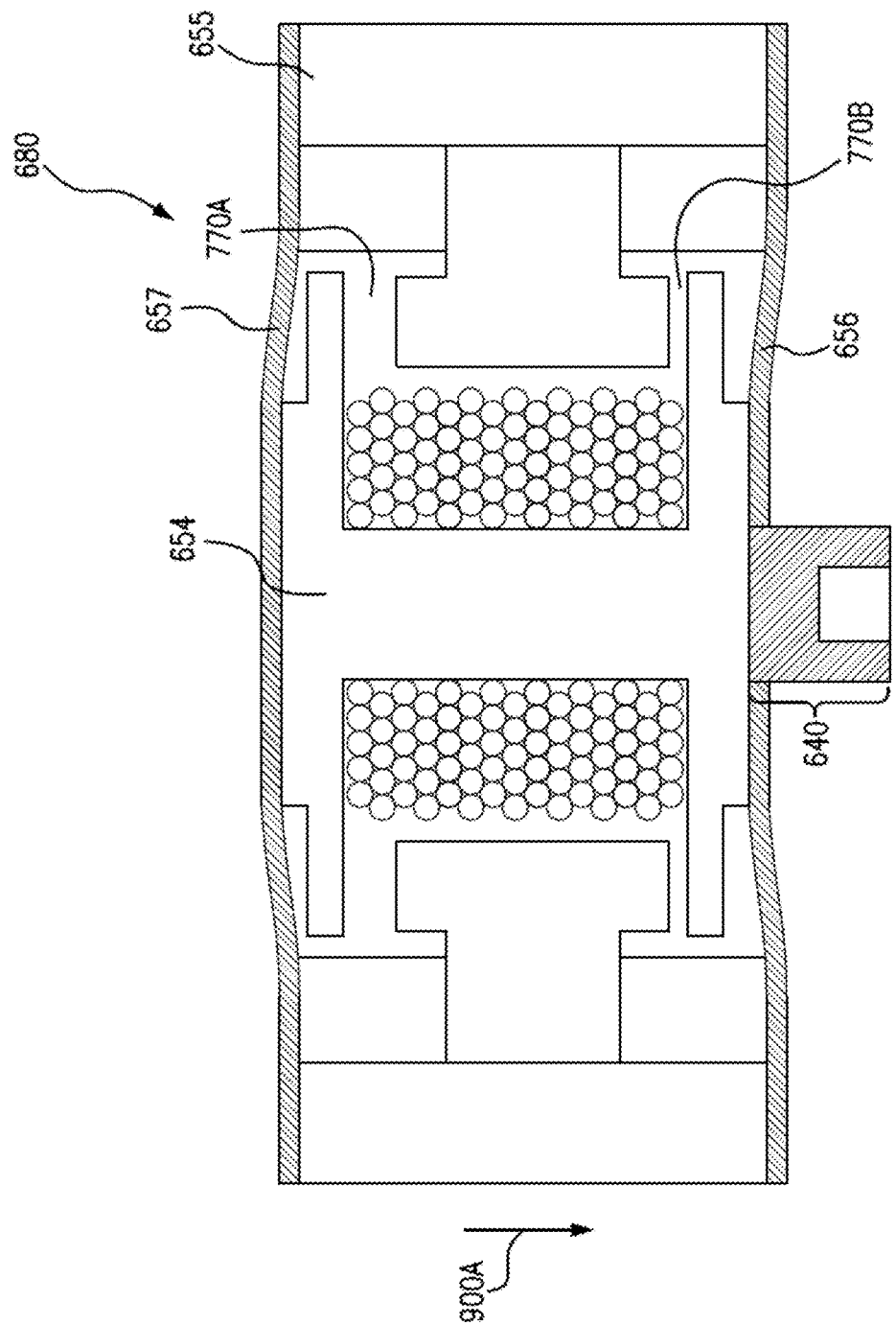
FIG. 9A is a schematic diagram depicting movement of the counterweight assembly relative to the bobbin assembly of the vibratory actuator-coupling assembly of FIG. 6A.

Referring now to FIG. 9A, the depicted magnetic fluxes 880, 882 and 884 of FIG. 8A will magnetically induce movement of counterweight assembly 655 downward (represented by the direction of arrow 900*a* in FIG. 9A) relative to bobbin assembly 654 so that vibratory actuator-coupling assembly 680 will ultimately correspond to the configuration depicted in FIG. 9A. More specifically, vibratory electromagnetic actuator 650 of FIG. 6A is configured such that during operation of vibratory electromagnetic actuator 650 (and thus operation of bone conduction device 200), an effective amount of the dynamic magnetic flux 882 and an effective amount of the static magnetic flux (flux 880, flux 884 and/or a combination of flux 880 and 884) flow through at least one of axial air gaps 770A and 770B sufficient to generate substantial relative movement between counterweight assembly 655 and bobbin assembly 654.

As used herein, the phrase "effective amount of flux" refers to a flux that produces a magnetic force that impacts the performance of vibratory electromagnetic actuator 650, as opposed to trace flux, which may be capable of detection by sensitive equipment but has no substantial impact (e.g., the efficiency is minimally impacted) on the performance of the vibratory electromagnetic actuator. That is, the trace flux will typically not result in vibrations being generated by the electromagnetic actuators detailed herein and/or typically will not result in the generation electrical signals in the absence of vibration inputted into the transducer.

Further, as may be seen in FIGS. 8A and 8B, the static magnetic fluxes enter bobbin 654A substantially only at locations lying on and parallel to a tangent line of the path of the dynamic magnetic fluxes 882.

As may be seen from FIGS. 8A and 8B, the dynamic magnetic flux is directed to flow within the area sandwiched by the springs 656 and 657. In particular, no substantial amount of the dynamic magnetic flux 882 or 886 passes through or into springs 656. Further, no substantial amount of the dynamic magnetic flux 882 or 886 passes through the two permanent magnets 658A and 658B of counterweight assembly 655. Moreover, as may be seen from the FIGs., the static magnetic fluxes (880, 884 and/or a combination of the two) is produced by no more than two permanent magnets 658A and 658B.

It is noted that the schematics of FIGS. 8A and 8B represent respective instantaneous snapshots while the counterweight assembly 655 is moving in opposite directions (FIG. 8A being downward movement, FIG. 8B being upward movement), but both when the bobbin assembly 654 and counterweight assembly 655 are at the balance point.

As counterweight assembly 655 moves downward relative to bobbin assembly 654, as depicted in FIG. 9A, the span of axial air gap 770A increases and the span of axial air gap 770B decreases. This has the effect of substantially reducing the amount of effective static magnetic flux through axial air gap 770A and increasing the amount of effective static magnetic flux through axial air gap 770B. However, in some embodiments, the amount of effective static magnetic flux through springs 656 and 657 collectively substantially remains about the same as compared to the flux when counterweight assembly 655 and bobbin assembly 654 are at the balance point. (Conversely, as detailed below, in other embodiments the amount is different.) Without being limited by theory, this is believed to be the case because the deflection of the springs 656 and 657 is within parameters that do not result in a significant change in spring orientation that substantially impacts the amount of effective static magnetic flux through the springs. That is, the springs do not substantially impact the flow of magnetic flux.

Upon reversal of the direction of the dynamic magnetic flux, the dynamic magnetic flux will flow in the opposite direction about coil 654B. However, the general directions of the static magnetic flux will not change. Accordingly, such reversal will magnetically induce movement of counterweight assembly 655 upward (represented by the direction of arrow 900B in FIG. 9B) relative to bobbin assembly 654 so that vibratory actuator-coupling assembly 680 will ultimately correspond to the configuration depicted in FIG. 9B. As counterweight assembly 655 moves upward relative to bobbin assembly 654, the span of axial air gap 770B increases and the span of axial air gap 770A decreases. This has the effect of reducing the amount of effective static magnetic flux through axial air gap 770B and increasing the amount of effective static magnetic flux through axial air gap 770A. However, the amount of effective static magnetic flux through the springs 656 does not change due to a change in the span of the axial air gaps as a result of the displacement of the counterweight assembly 655 relative to the bobbin assembly 654 for the reasons detailed above with respect to downward movement of counterweight assembly 655 relative to bobbin assembly 654.

Figure 9B:
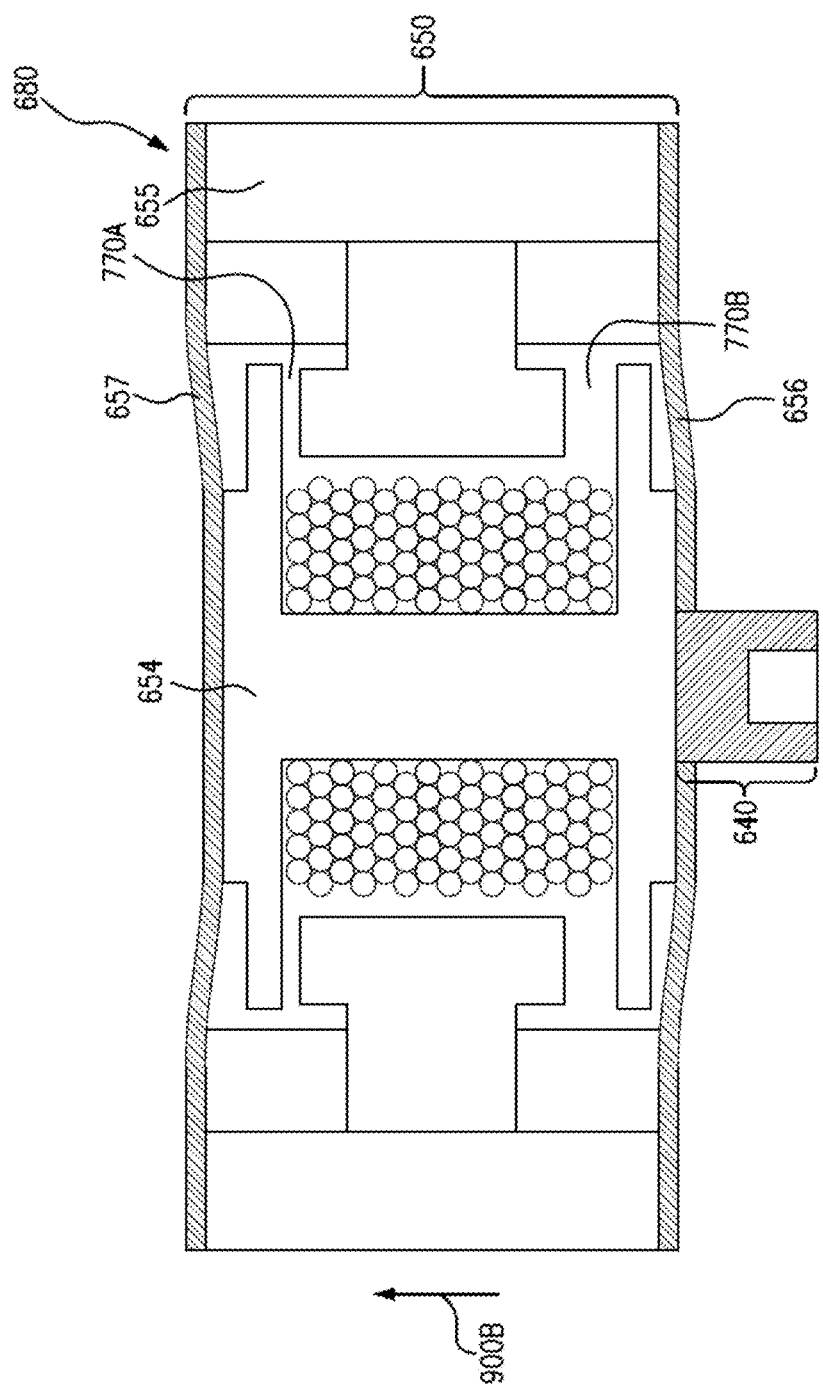
FIG. 9B is a schematic diagram depicting movement of the counterweight assembly relative to the bobbin assembly of the vibratory actuator-coupling assembly of FIG. 6A in the opposite direction of that depicted in FIG. 9A.

As can be seen from FIGS. 9A and 9B, the springs 656 and 657 deform with transduction of the transducer (e.g., actuation of the actuator). Accordingly, at least a portion of the static magnetic flux flows through solid material that deforms during transduction by the electromagnetic transducer. This as contrasted to the flow of static magnetic flux through, for example, the yokes of the embodiment of FIG. 5, where the yokes do not deform during actuation (transduction).

Referring back to FIG. 5, it can be seen that the embodiments thereof utilizes yokes 560B and 560C to establish the radial air gaps between the yokes and the bobbin assembly 354. That is, the embodiment of FIG. 5 utilizes three separate yokes (including yoke 560A). Conversely, the embodiment of FIG. 6A utilizes only one yoke (it is noted that the depictions of FIGS. 6A to 6C are cross-sectional views of a rotationally symmetric vibratory electromagnetic actuator, and thus yoke 660A is in the form of a ring). Note further that in the case of a balanced actuator that utilizes only axial air gaps, it has been heretofore known to utilize yokes that extend above and below (with respect to the orientation of FIG. 5) the bobbin assembly. Accordingly, an exemplary embodiment provides for a balance electromagnetic actuator having fewer yokes.

Note further that the reduction of such components can have utility in that manufacturing tolerance buildup is not as significant of a factor as it might otherwise have been. That is, in the embodiment of FIG. 6A, tolerance buildup affecting the axial air gaps could be limited to the tolerances of the permanent magnet 658B (or permanent magnet 658A) and the yoke 600A. This can have utility in that the size of the axial air gaps can be reduced relative to that which would be utilized to account for tolerance buildup with respect to the embodiment of FIG. 5. This is because there would be less tolerance uncertainty in the embodiment of FIG. 6A.

In some embodiments of the embodiment of FIG. 6A, it is relatively easier to align the various components of the actuator as compared to the implementation of embodiments according to FIG. 5. The potential for tilting of the counterweight assembly components relative to the bobbin assembly components and/or vice-versa is lower relative to that associated with embodiments according to FIG. 5. Such tilting can cause the air gaps, especially the radial air gaps, to collapse or otherwise be reduced in width, such that a deleterious effect on the performance of the actuator results. Along these lines, embodiments according to FIG. 6A need not account for as much tilt relative to one another as embodiments corresponding to FIG. 5 to avoid contact (such as contact while the actuators are vibrating). Still further, because of the reduced span of the flexible portion of the springs relative to embodiments corresponding to FIG. 5, the assemblies are less likely to tilt relative to one another/the assemblies are more resistant to tilting (i.e., for a given force that causes tilting, the embodiment of FIG. 6A tilts less than the embodiment of FIG. 5). Accordingly, the axial air gaps can be less wide in embodiments corresponding to FIG. 6A than in the embodiments corresponding to FIG. 5, all other things being equal. This can have utility in that the relative efficiency of the actuator can be greater than it otherwise might have been.

Accordingly, in an exemplary embodiment, there is an electromagnetic transducer that is configured such that an angle of tilt between the bobbin assembly and the counterweight assembly is about 50%, 55%, 60%, 65%, 70%, 75%, 80%, 85%, 90% or 95% and/or any value or range of values therebetween in about 1% increments (e.g., about 56%, about 88% to about 94%, etc.) for a given tilt force, of that which would be present in an electromagnetic transducer according to the embodiment of FIG. 5 and variations thereof, all other things being equal.

Still further, it is noted that the substitution of the springs for the air gaps also reduces or otherwise eliminates any need to control or otherwise adjusts the size of those air gaps during manufacturing, if only because those air gaps are no longer present. In this regard, with respect to FIG. 5, it is clear that a high degree of concentricity must exist with respect to the bobbin assembly and the counterweight assembly with respect to the radial air gaps. Tolerance buildups alone create difficulty in manufacturing the actuator. Further, there is a high degree of precision required to fit the bobbin assembly into the counterweight assembly. With respect to actuators that utilize four axial air gaps, the tolerance buildups create difficulty in manufacturing the actuator. Because of the reduction in the number of air gaps according to the embodiment of FIG. 6 as compared to that of FIG. 5 and the variations thereof, the number of "controlled dimensions" that impact performance of the actuator are reduced, at least as compared to an actuator having four air gaps, all other things being equal.

Additionally, it is noted that in some embodiments utilizing a spring to close the static magnetic flux, larger axial air gaps can be utilized than those of the embodiment of FIG. 5, all other things being equal. In an exemplary embodiment, this can enable a larger tilt angle between the counterweight assembly and the bobbin assembly without having one component contact the other component as compared to that according to the embodiment of FIG. 5, all other things being equal. More specifically, in an exemplary embodiment, there is an electromagnetic transducer that is configured such that an angle of tilt between the bobbin assembly and the counterweight assembly resulting in contact between the two components, as referenced from the same relative positions (e.g., at the balance point, the top of the transduction motion, the bottom of the transduction motion, etc.) is about 105%, 110%, 115%, 120%, 125%, 130%, 135%, 140%, 145% or 150% and/or any value or range of values therebetween in about 1% increments (e.g., about 116%, about 121% to about 138%, etc.) of that which would be present in an electromagnetic transducer according to the embodiment of FIG. 5 and variations thereof, all other things being equal.

The embodiments of FIGS. 6A-9B detailed above include the use of two separate springs 656 and 657 as conduits of the static magnetic flux and no radial air gaps. In an alternate embodiment, only one spring is used (either the top or the bottom spring) as a conduit of static magnetic flux (but two or more springs may be present—the additional springs being utilized for their traditional resilient purposes), and in the place of the other spring, a radial air gap located between bobbin assembly 654 and counterweight assembly 655 is utilized to close the static magnetic flux. It is noted that in an alternate embodiment, two or more springs can be utilized as conduits for static magnetic flux along with one or two or more radial air gaps.

Figure 10:
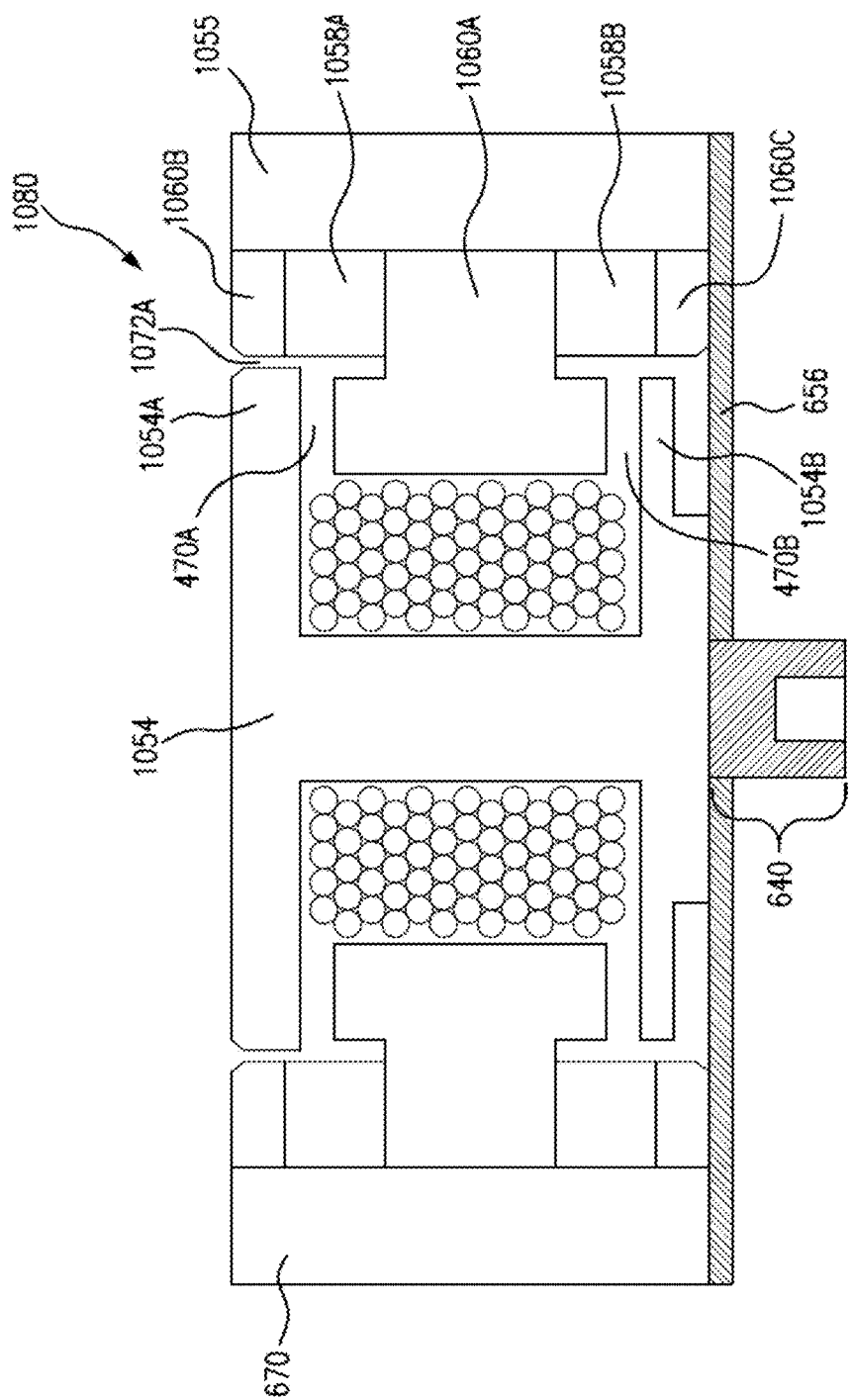
FIG. 10 is a cross-sectional view of an alternate embodiment of a vibratory actuator-coupling assembly of the bone conduction device of FIG. 2.

More particularly, FIG. 10 depicts an alternate embodiment of a vibratory actuator-coupling assembly 1080, that utilizes both a spring 656 and a radial air gap 1072A to close the static magnetic flux, where like reference numbers correspond to the components detailed above. As can be seen, bobbin assembly 1054 includes a bobbin that has arms 1054A and 1054B that are different from one another, with arm 1054B corresponding to the bottom arm of the bobbin 654A of FIG. 6A. However, arm 1054A extends further in the lateral direction than arm 1054B, and arm 1054A is "thicker" in the longitudinal direction than arm 1054B, at least with respect to the portions closest to counterweight assembly 1055.

As can be seen, permanent magnets 1058A and 1058B are of a different geometry than the permanent magnets of the embodiment of FIG. 6A. More particularly, in the embodiment depicted in FIG. 10, the permanent magnets 1058A and 1058A are shorter than the permanent magnets of FIG. 6A. Also, the permanent magnets 1058A and 1058B are of the same configuration, although in other embodiments, different configurations can be utilized. In this regard, depending on the path of the magnetic fluxes, different sized permanent magnets (i.e., magnets of different strength) can be utilized to obtain a balanced vibratory actuator.

Referring still to FIG. 10, it can be seen that yokes 1060B and 1060C have been added in addition to yoke 1060A (which corresponds to yoke 660A of FIG. 6A). The magnetic flux generated by permanent magnet 1058B flows through yoke 1060A and bobbin assembly 1054 and spring 656 in a manner substantially the same as that detailed above with respect to the embodiment of FIGS. 6A-9B, with the exception that the flux also flows through yoke 1060C. With regard to the flow of flux through yoke 1060C, the flux flows in a substantially linear manner therethrough (i.e., vertically into and out of yoke 1060C). Conversely, the magnetic flux generated by permanent magnet 1058A flows through yoke 1060B and bobbin assembly 1054A in a manner more akin to the flux of permanent magnet 558A of FIG. 5. In at least general terms, the flux enters yoke 1060B in a vertical direction, and then arcs to a generally horizontal direction to leave the yoke 1060B and enter arm 1054A of bobbin assembly 1054 across radial air gap 1072A. In this regard, radial air gap 1072A generally corresponds to the radial air gap between yoke 560B and bobbin 554A of FIG. 5. The flux then arcs from the horizontal direction to the vertical direction to flow into yoke 1060A across axial air gap 470A. (It is noted that the just described flux flows would be reversed for magnets having an opposite polarity than that which would result in the just described flow. In some embodiments any direction of magnetic flux flow can be utilized, providing that the teachings detailed herein and/or variations thereof can be practiced.)

It is noted that in the embodiment of FIG. 10, a number of the components are depicted as being symmetrical and/or are identical to one another (albeit some are reversed). However, in other embodiments the configurations of the components can be varied. By way of example only and not by way of limitation, because of the presence of radial air gap 1072A at the "top" of the actuator and the absence of such an air gap at the "bottom" of the actuator (while there is a gap, the gap is relatively much larger than the radial air gap 1072A at the top (although in other embodiments, this is not the case) and little to no magnetic flux flows through that gap (instead the flux flows through the spring), and thus it is not an air gap), there may be utilitarian value in utilizing a permanent magnet 1058A that is stronger than permanent magnet 1058B and/or utilizing a yoke 1060B that is different from yoke 1060C, etc., at least if such results in a balanced actuator. Indeed, in some embodiments, the bottom yoke 1060C might be eliminated, and an elongated permanent magnet 1058B and/or the geometry of yoke 1060A being substituted in its place. With regard to the latter scenario, while the embodiment of yoke 1060A is depicted as being symmetrical, other embodiments can include a yoke that is not symmetrical, at least in order to compensate for any flux path discrepancies resulting from utilizing the spring 656 on the bottom and the radial air gap 1072A on the top.

It is noted that the distance spanning the radial air gap 1060B can be set during design so as to result in a utilitarian balanced actuator. Alternatively, or in addition to this, the properties of the spring 656 can be set during design to achieve such a balanced actuator. (Exemplary properties of the spring 656 that can be set during design are described below.) In this regard, owing to the fact that there is no corresponding radial air gap at the bottom of the actuator, in an exemplary embodiment, there is a relationship between the distance of the air gap 1072A and the thickness of the spring 656 that exists such that with respect to other parameters, a balance actuator is achieved.

While the embodiment of FIG. 10 includes a radial air gap located at the top but not at the bottom, in an alternative embodiment the radial air gap and the corresponding componentry is located at the bottom instead of the top (and the spring and corresponding componentry is located at the top).

As noted above, the embodiment of FIG. 10 utilizes yokes positioned at both the north and south Poles of the permanent magnets, as opposed to the embodiment of FIGS. 6A, which utilizes a yoke only at the north or south poles of the permanent magnets. In an exemplary embodiment, yokes can be positioned on both sides of the permanent magnets (i.e., interposed between the permanent magnets and the respective springs, along with a yoke (or more than one yoke) interposed between the two permanent magnets. Any configuration and/or flux path flow that can be utilized to practice embodiments detailed herein and/or variations thereof can be utilized in some embodiments.

Referring back to FIG. 6A, because of the elimination of corresponding air gaps via use of springs 656 and 657 to close the static magnetic flux, the tendency of such eliminated air gaps to collapse is correspondingly effectively eliminated, and, in an exemplary embodiment, the spring constant need not be as high as might be the case in embodiments that utilize four axial air gaps, such as that detailed above with respect to FIG. 5 and variations thereof.

As can be seen from the embodiments illustrated in the figures, all permanent magnets of counterweight assembly 655 that are configured to generate the static magnetic fluxes 880 and 884 are located to the sides of the bobbin assembly 655. Along these lines, such permanent magnets may be annular permanent magnets with respective interior diameters that are greater than the maximum outer diameter of the bobbin 654A, when measured on the plane normal to the direction (represented by arrow 900A in FIG. 9A) of the generated substantial relative movement of the counterweight assembly 655 relative to the bobbin assembly 654, as illustrated in FIGS. 9A and 9B. Conversely, in an alternate embodiment, some or all of the permanent magnets of counterweight assembly 655 that are configured to generate the static magnetic fluxes are located above and/or below the bobbin assembly 655.

In some embodiments, the configuration of the counterweight assembly 655 reduces or eliminates the inaccuracy of the distance (span) between faces of the components forming the air gaps that exists due to the permissible tolerances of the dimensions of the permanent magnets. In this regard, in some embodiments, the respective spans of the axial air gaps 770A and 770B, when measured when the bobbin assembly 654 and the counterweight assembly 655 are at the balance point, are not dependent on the thicknesses of the permanent magnets 658A and 658B as compared to the embodiment of FIG. 5 and/or variations thereof, all other things being equal.

It is noted that while the surfaces creating the radial air gap of FIG. 10 are depicted as uniformly flat, in other embodiments, the surfaces may be partitioned into a number of smaller mating surfaces. It is further noted that the use of radial air gap 1072A permits relative ease of inspection of the radial air gaps from the outside of the vibratory electromagnetic actuator 650, in comparison to, for example absence of the radial air gap.

Figure 11:
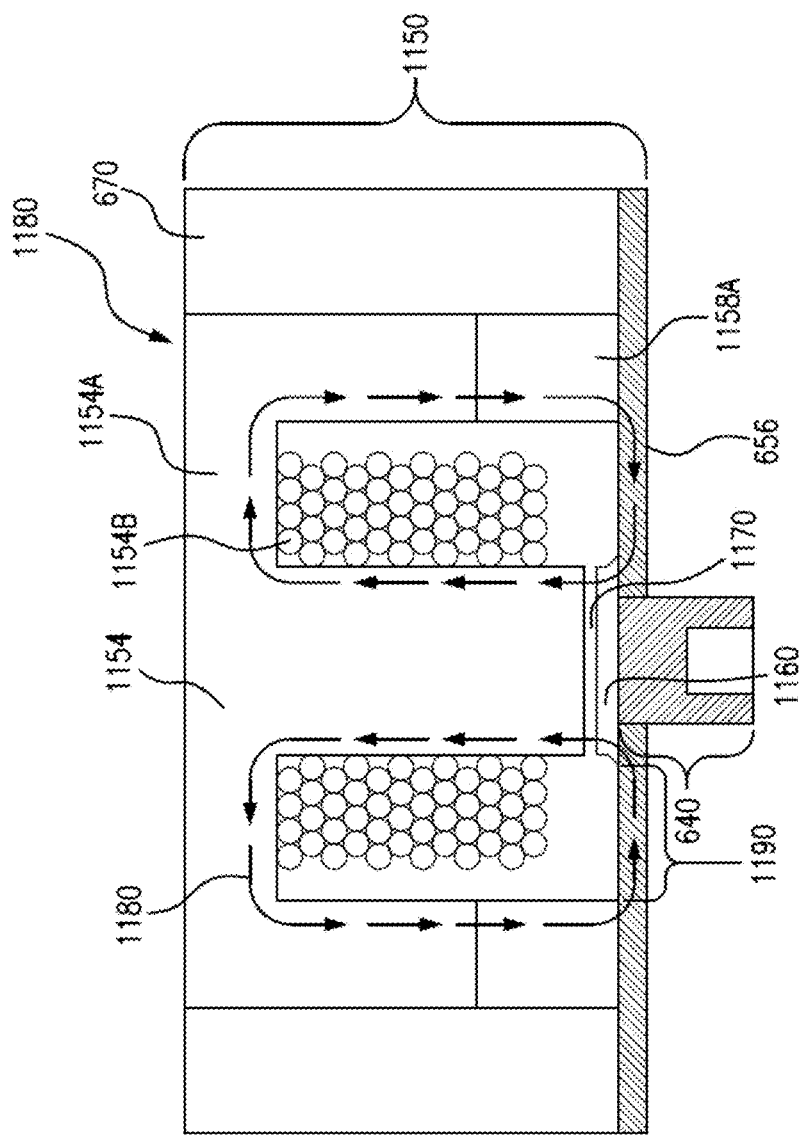
FIG. 11 is a cross-sectional view of an alternate embodiment of a vibratory actuator-coupling assembly of the bone conduction device of FIG. 2.

FIG. 11 depicts an exemplary alternate embodiment of a vibratory actuator, one that is unbalanced, as will now be described.

FIG. 11 is a cross-sectional view of a vibratory actuator-coupling assembly 1180, which can correspond to vibratory actuator-coupling assembly 280 detailed above. Like reference numbers corresponding to elements detailed above will not be addressed.

As illustrated in FIG. 11, vibratory electromagnetic actuator 1150 includes a bobbin assembly 1154 connected to coupling assembly 640 via spring 656. Reference numeral 1190 indicates the flexible section of the spring 656, a section of the spring which flexes because, in this embodiment, it is not directly connected to any component of the bobbin assembly or to any component of the yoke 1160. It is noted that in some embodiments, yoke 1160 can flex to a certain degree, and thus those sections of spring 655 that are connected to the flexing portions of yoke 1160 also flex. Accordingly, section 1190 can extend into the section attached to yoke 1160 in some embodiments. It can be seen that mass 670 is attached to bobbin 1154A of bobbin assembly 1154. In the embedment of FIG. 11, the bobbin assembly 1154 also functionally serves as a counterweight assembly. (It is noted that the embodiments detailed above likewise can be configured in alternate variations such that the bobbin assembly, or at least portions thereof, functionally correspond to the counterweight.)

Spring 656 permits the bobbin assembly 1154 and mass 670 to move relative to yoke 1160 and coupling assembly 640, which is connected thereto, upon interaction of a dynamic magnetic flux, produced by bobbin assembly 1154 upon energizement of coils 1154B. More particularly, a dynamic magnetic flux is produced by energizing coil 1154B with an alternating current. The dynamic magnetic flux is not shown, but it parallels the static magnetic flux 1180 produced by permanent magnet 1158A of the bobbin assembly. That is, in an exemplary embodiment, the dynamic magnetic flux, if depicted, would be located at the same place as the depicted static magnetic flux 1180, with the exception that the arrow heads would change direction depending on the alternation of the current.

In this regard, bobbin assembly 1154 is both a static magnetic field generator and a dynamic magnetic field generator.

The functionality and configuration of the elements of the embodiment of FIG. 11 (and FIG. 12 detailed below) can correspond to that of the corresponding functional elements of one or more or all of the other embodiments detailed herein.

Vibratory electromagnetic actuator 1150 includes a single axial air gap 1170 that is located between bobbin assembly 1154 and yoke 1160. In this regard, the spring 656 is utilized to close both the static and dynamic magnetic flux, and both fluxes are closed through the same air gap 1170 (and thus a single air gap 1170).

It is noted that the directions and paths of the static magnetic fluxes (and thus by description above, the dynamic magnetic fluxes) are representative of some exemplary embodiments, and in other embodiments, the directions and/or paths of the fluxes can vary from those depicted.

As noted above, coupling assembly 640 is attached (either directly or indirectly) to yoke 1160. Without being bound by theory, yoke 1160, in some embodiments, channels the fluxes into and/or out of (depending on the alternation of the current and/or the polarity direction of the permanent magnet 1158A) the bobbin assembly so as to achieve utilitarian functionality of the vibratory electromagnetic actuator 1150. It is noted that in an alternate embodiment, yoke 1160 is not present (i.e., the fluxes enter and/or exit or at least substantially enter and/or exit the spring 656 from/to the bobbin assembly 1154).

Figure 12:
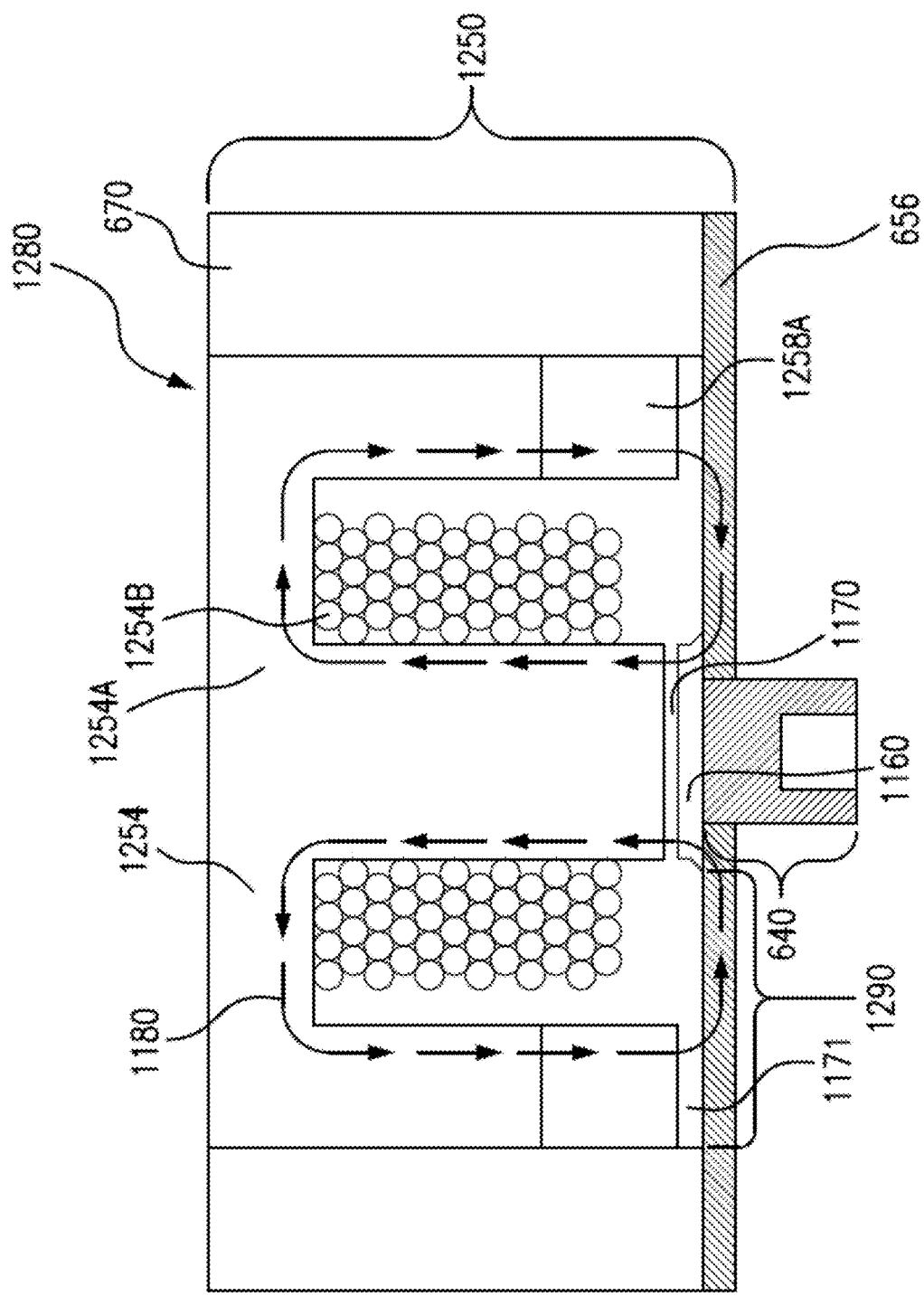
FIG. 12 is a cross-sectional view of an alternate embodiment of a vibratory actuator-coupling assembly of the bone conduction device of FIG. 2.

As can be seen, the flux enters and/or exits magnet 1158A directly from or to spring 656. Conversely in an alternate embodiment this is not the case. In this regard, FIG. 12 depicts an alternate embodiment of a vibratory electromagnetic actuator 1250 of a vibratory actuator-coupling assembly 1280, where the fluxes enter and/or exit a further axial air gap 1171. Reference numeral 1290 indicates the flexible section of the spring 655, corresponding to flexible section 1190 detailed above.

Still with reference to FIG. 12, it can be seen that the gap between the yoke 1160 and the bobbin 1254 is smaller than the gap between spring 656 and permanent magnet 1258A. This is done to account for tilting of the bobbin assembly/counterweight assembly relative to the coupling assembly 640. In this regard, the distance moved as a result of relative tilting between the assemblies of the vibratory actuator-coupling assembly 1280 will typically be greater with increasing distance away from the longitudinal axis. In this regard, the larger gap between the permanent magnet 1258A and spring 656 as compared to the gap between the yoke 1160 and the bobbin 1254 accounts for this phenomenon, thus reducing and/or eliminating the likelihood that these components contact each other during tilting. In some exemplary embodiments, in an un-energized actuator, the gap between the yoke 1160 and the bobbin 1254 is about 60 microns, and the gap between the spring 656 and the permanent magnet 1258A is about 250 microns. That said, in an alternate embodiment, because of the resilient nature of the spring 656, in an exemplary embodiment, the width of the gaps may be equal. Without being bound by theory, in an exemplary embodiment, the resiliency of the spring 656 reduces and/or eliminates potential deleterious effects of contact between the spring and the permanent magnet. Of course, with respect to the embodiment of FIG. 11, where the permanent magnet 1158A is secured to spring 656, there is no gap between these two components at all. Accordingly, in an exemplary embodiment, there is a transducer where there is no meaningful discrepancy between the widths of the air gaps during operation thereof.

In view of the above, embodiments detailed herein and/or variations thereof can enable a method of transducing energy. In an exemplary embodiment of this method there is the action of moving the counterweight assembly 655 relative to the bobbin assembly 654A in an oscillatory manner. This action is such that during the movement of the two assemblies relative to one another, there is interaction of a dynamic magnetic flux and a static magnetic flux (e.g. at the air gaps). An exemplary method further includes the action of directing the static magnetic flux along a closed circuit that in its totality extends across one or more air gaps. In an exemplary embodiment, this action is such that all of the one or more air gaps have respective widths that vary while the static magnetic flux is so directed and interacting with the dynamic magnetic flux. This action is further qualified by the fact that if there is more than one air gap present in the closed-circuit (e.g., the embodiment of FIG. 12, as compared to for example the embodiment of FIG. 6A or the embodiment of FIG. 11), a rate of change of variation of the width of one of the air gaps of the closed-circuit is different from that of at least one of the other air gaps of the closed-circuit. Along these lines, it can be seen from FIG. 12 that the air gap between the spring and the permanent magnet will vary in width at a different rate than that of the air gap between the yoke and the bobbin. This is in contrast to, for example, the embodiment of FIG. 5, where the closed static magnetic flux crosses two air gaps, where the width of one of the air gaps (i.e. the radial air gap) does not vary while the static magnetic flux interacts with the dynamic magnetic flux. Further, in an exemplary embodiment, the amount of width variation of the air gap between the spring and the permanent magnet will vary by a different amount than that of the air gap between the yoke and the bobbin.

At least some embodiments detailed herein and/or variations thereof enable a method to be practiced where static magnetic flux is directed along a path that extends through a solid body while the solid body flexes (e.g., the embodiment of FIGS. 6A, 10, 11 and 12).

It is noted that some exemplary embodiments include any device, system and/or method where static and/or magnetic flux travels through a spring in a manner that eliminates an air gap due to the use of the spring in such a manner. Along these lines, it is noted that unless otherwise specified, any of the specific teachings detailed herein and/or variations thereof can be applicable to any of the embodiments detailed herein and/or variations thereof unless otherwise specified.

The elimination of some or all of the radial and/or axial air gaps via the use of, for example, a spring to close the magnetic flux, can make the actuator more efficient as compared to other actuators that instead utilize corresponding radial and/or axial air gaps. In this regard, air gaps can present substantial magnetic reluctances. The relative reduction and/or elimination of such magnetic reluctance to make the actuator more efficient relative to an actuator utilizing such air gaps. In an exemplary embodiment, this can permit smaller permanent magnets to be used/weaker permanent magnets to be used while obtaining the same efficacy as an actuator utilizing such air gaps, all other things being equal.

In an exemplary embodiment, the mass of the permanent magnets and/or strength of the permanent magnets, all other things being equal, is about 50%, 55%, 60%, 65%, 70%, 75%, 80%, 85%, 90% or about 95%, and/or is about any value or range of values therebetween in about 1% increments (e.g., 61%, 66% to 94%, etc.) of that for an actuator utilizing such air gaps, all other things being equal.

Different performance parameters can be obtained by varying design parameters of a given actuator, and thus obtaining an actuator having such design parameters. For example, varying the mechanical stiffness of the springs (k) varies the resonance frequency of the actuator. Varying the magnetic flux conductive properties of the springs varying the amount of magnetic flux that can be conducted by the springs. In some exemplary embodiments of balance electromagnetic actuators detailed herein and/or variations thereof, one or more or all of the springs only effectively conduct static magnetic flux. That is, little to no dynamic magnetic flux is conducted by the spring(s) (any dynamic magnetic flux conducted by the springs only amounts to trace amounts of flux). In an exemplary embodiment, the springs are made of a material that have a high saturation flux density, and the magnetic permeability of the material is generally unspecified (e.g. it can be within a range from and including low to high permeability, at least providing that the spring has a sufficiently high saturation flux density to accept the static magnetic flux, which does not vary, in contrast to the dynamic magnetic flux).

Without being bound by theory, it is believed that in at least some exemplary embodiments, embodiments of the electromagnetic transducers utilizing springs as flux conduits detailed herein and/or variations thereof can be designed based on an understanding that while the spring(s) constitute bottlenecks for the static magnetic flux, these are bottlenecks that do not change with performance of the transducer. That is, designing the actuators can be optimized and rendered more efficient than those of, for example, the embodiment of FIG. 5 and variations thereof, provided that this understanding is taken into account. Along these lines, because a given flux saturation of the spring does not vary with movement of the counterweight assembly (i.e. changing widths of the axial air gaps), once the amount of expected static magnetic flux is determined, the spring can be designed to account for the static magnetic flux, with the knowledge that the expected static magnetic flux will not vary with respect to operational extremes of the transducer. Put another way, the static magnetic flux generated by the permanent magnets is constant. It is the fact that the path has variables that vary with operation of the transducer (i.e., the air gaps) that impart uncertainty into expected static magnetic flux values. By replacing at least some of the air gaps with the springs, this uncertainty is reduced. That is, the amount of static magnetic flux that a given spring of a given geometry can accept and still enable the transducer to operate in a utilitarian manner is fixed. It does not change with operation of the transducer. Accordingly, any need to address this "uncertainty" during the design process is not present with respect to transducers utilizing springs to close the static magnetic flux. Additionally, without being bound by theory, by saturating the springs with static magnetic flux, dynamic magnetic flux is less likely to travel therethrough, and this it is more likely to retained sandwiched between the springs.

Moreover, the use of springs as conduits of the static magnetic flux avoid the possibility of "air gap collapse" because there is no air gaps to collapse. In this regard, the magnetic reluctance through a spring is generally constant, and, in contrast, the reluctance across an air gap varies with the width of the air gap. Still further, with respect to radial air gaps that have widths that do not vary, there is still a change in the reluctance across such gaps (e.g., due to imperfections in the alignment of the counterweight assembly and the bobbin assembly, movement away from the alignment during movement of the counterweight assembly upward and/or downward relative to the bobbin assembly, etc.). Accordingly, the reluctance across a spring does not change as much as the change reluctance across even a radial air gap.

In some exemplary embodiments, the effective spring thickness and/or the effective spring radius are varied during design so as to obtain utilitarian spring stiffnesses and utilitarian spring magnetic flux property. By effective spring thickness, it is meant the thickness of a cross-section of the flexible portion of the spring lying on a plane parallel to and lying on the longitudinal axis of the actuator (i.e., the axis aligned with the direction of movement of the bobbin assembly (counterweight assembly) relative to the bobbin assembly). By effective spring radius, it is meant the distance from the longitudinal axis to the location at which the spring contacts structure of the bobbin/counterweight assembly (where it no longer flexes), adjusted for the fact that the area around the longitudinal axis does not flex (due to, for example, the coupling 640 and/or the yoke 1160). That is, the term "effective" addresses the fact that there are portions of the spring that are present but do not flex during energizement of the actuator. By varying the effective spring thickness and the effective spring radius, a wide range of spring stiffnesses can be achieved for a wide range of magnetic fluxes that travel through the spring. In this regard, if a spring thickness of, for example 0.3 mm is utilitarian to achieve a utilitarian magnetic flux therethrough, the effective radius of the spring can be varied (e.g., by varying the distance of the flexible section 1190 during design to obtain a utilitarian spring stiffness for that thickness without substantially impacting the utilitarian nature of the magnetic flux, and visa-versa.

It is noted at this time that in an exemplary embodiment, the thicknesses of the springs of the embodiments detailed herein and/or variations thereof can be about 0.05 mm, 0.1 mm, 0.15 mm, 0.2 mm, 0.25 mm, 0.3 mm, 0.35 mm or about 0.4 mm or any value or range of values between these values in 0.01 mm increments (e.g., about 0.22 mm, about 0.17 mm to about 0.33 mm, etc.). Any spring thickness that can enable the teachings detailed herein and/or variations thereof to be practiced can be utilized in some embodiments. Further in this regard any spring geometry can be utilized as well. Along these lines, while a spring having a circular circumference has been the focus of the embodiments detailed herein, springs having a square circumference, a rectangular circumference, or an oval circumference etc., can be utilized in some embodiments.

It is noted that in an exemplary embodiment, the diameters of the electromagnetic transducers according to the embodiments herein and/or variations thereof can be about 8 mm with respect to the balance transducers and about 11 mm with respect to the unbalanced transducers. In some exemplary embodiments, the diameters of the electromagnetic transducers can be about 6 mm, 7 mm, 8 mm, 9 mm, 10 mm, 11 mm, 12 mm or about 13 mm in length and/or a length of any value or range of values therebetween in about 0.1 mm increments (e.g., about 7.8 mm, 6.7 mm to about 11.2 mm, etc.).

It further noted that in an exemplary embodiment, the seismic mass of the transducers detailed herein and/or variations thereof, totals about 6 g, and the amount of that mass made up by the permanent magnets corresponds to about 0.3 g. By seismic mass, it is meant the mass of the components that move relative to the portions of the transducer that are fixed to the much more massive object into which were from which the vibrations travel. Accordingly in an exemplary embodiment, the ratio of the mass of the permanent magnets to the total seismic mass of the transducer is about 0.01, 0.02, 0.03, 0.04, 0.05, 0.06, 0.07, 0.08, 0.09, or about 0.10 or any value or range of values therebetween in about 0.002 increments (e.g., about 0.053, about 0.041 to about 0.064, etc.).

Without being bound by theory, in an exemplary embodiment, utilization of the springs as a conduit for the magnetic flux enables the permanent magnets to be made smaller, as the flux generated by those permanent magnets is more efficiently conducted through the components of the transducer. In this regard, air gaps present a feature that frustrates, to an extent, the efficient conduction of the flux through the transducer. The elimination of the air gaps by replacement thereof by the springs enables smaller (e.g., less powerful magnets to be used) as compared to the transducer that utilizes air gaps instead of springs to close the magnetic field, all other things being.

An exemplary embodiment includes placing holes through one or more or all of the springs of the actuator to "fine-tune" the stiffness and/or magnetic flux properties of the spring(s). Accordingly, an exemplary embodiment includes springs having holes (circular, oval, arcuate etc.) therethrough. Some embodiments of these exemplary embodiments include through holes while other embodiments of these exemplary embodiments include tools that do not pass all the way through the spring. Accordingly by varying the depth of these holes, the stiffness and/or magnetic flux properties can be further fine-tuned. It is therefore noted that a method of manufacture of the actuators detailed herein and/or variations thereof includes fine-tuning the stiffness and/or magnetic flux properties of a spring along these lines.

In at least some exemplary embodiments, the actuators in general, and the springs in particular, are configured such that during all operating conditions (e.g., such as those conditions pertaining to the operation of a bone conduction device to talk a hearing percept), the springs remain magnetically saturated. In an exemplary embodiment, this enables the magnetic flux passing through the springs to be substantially if not completely independent of the respective magnetic field. Accordingly, an exemplary embodiment is such that the magnetic flux through the springs does not substantially vary with variations in the axial air gap size during operation (e.g., during utilization of the actuator in a bone conduction device to invoke a hearing percept). In an exemplary embodiment, this provides utility in that the risk of air gap collapse is reduced as compared to actuators that do not have such features, where air gap collapse can occur when the magnetic force is stronger than the restoring mechanical spring force.

In an exemplary embodiment, the spring is made out of materials that have a relatively high yield strength or otherwise can withstand the stresses exposed to the spring during normal operation of the vibratory actuators (e.g. such as utilization of the actuators in a bone conduction device to invoke a hearing percept), and also a relatively high magnetic induction. By way of example only and not by way of limitation, materials having yield stresses of about 400, 450, 475, 500, 515, 525, 530, 535, 540, 545, 550, 555, 560, 565, 570, 575, 580, 600, 625, 650 and/or about 700 MPa and/or any value or range of values therebetween in at least .1 MPa increments (e.g., 523.7 MPa, 515-585 MPa, etc.) can be used for the spring. Also by way of example only and not by way of limitation, materials having magnetic flux saturation of about 0.5 T, 0.6 T, 0.7 T, 0.8 T, 0.9 T, 1.0 T, 1.1 T, 1.2 T, 1.3 T, 1.4 T, 1.5 T, 1.6 T, 1.7 T, 1.8 T, 1.9 T, 2.0 T, 2.1 T, 2.2 T, 2.3 T, 2.4 T and/or 2.5 T and/or any value or range of values therebetween in at least 0.01 T increments can be used for the spring. An exemplary material is Hiperco® Alloy 27.

It is noted that in some embodiments, the static flux through the springs 656 and/or 657 is substantially constant (including constant) through the range of movements of the counterweight assembly 655 relative to the bobbin assembly 654. Without being bound by theory, it is believed that this is due to magnetic flux saturation, where by limiting the flux density, the magnetic force is correspondingly limited. This can prevent and/or otherwise reduce the risk of axial air gap collapse relative to a transducer utilizing air gaps to close the static magnetic flux, all other things being equal.

In an exemplary embodiment, the springs are configured and dimensioned such that the reluctance across one spring is effectively the same as the reluctance across the other spring through the range of movements of the counterweight assembly relative to the bobbin assembly. In an exemplary embodiment utilizing a spring and a radial air gap (e.g., according to the embodiment of FIG. 10), the spring and the radial air gap are configured and dimensioned such that the reluctance across the spring is effectively the same as the reluctance across the air gap through the range of movements of the counterweight assembly relative to the bobbin assembly. Accordingly, to the extent that reluctance varies in some embodiments, in some embodiments, as reluctance varies in one spring, the reluctance will vary in the same way at the other spring. Also accordingly, to the extent that reluctance varies in some embodiments, in some embodiments, as reluctance varies in one spring, the reluctance will vary in the same way at the radial air gap, and vice versa.

Figure 13A:
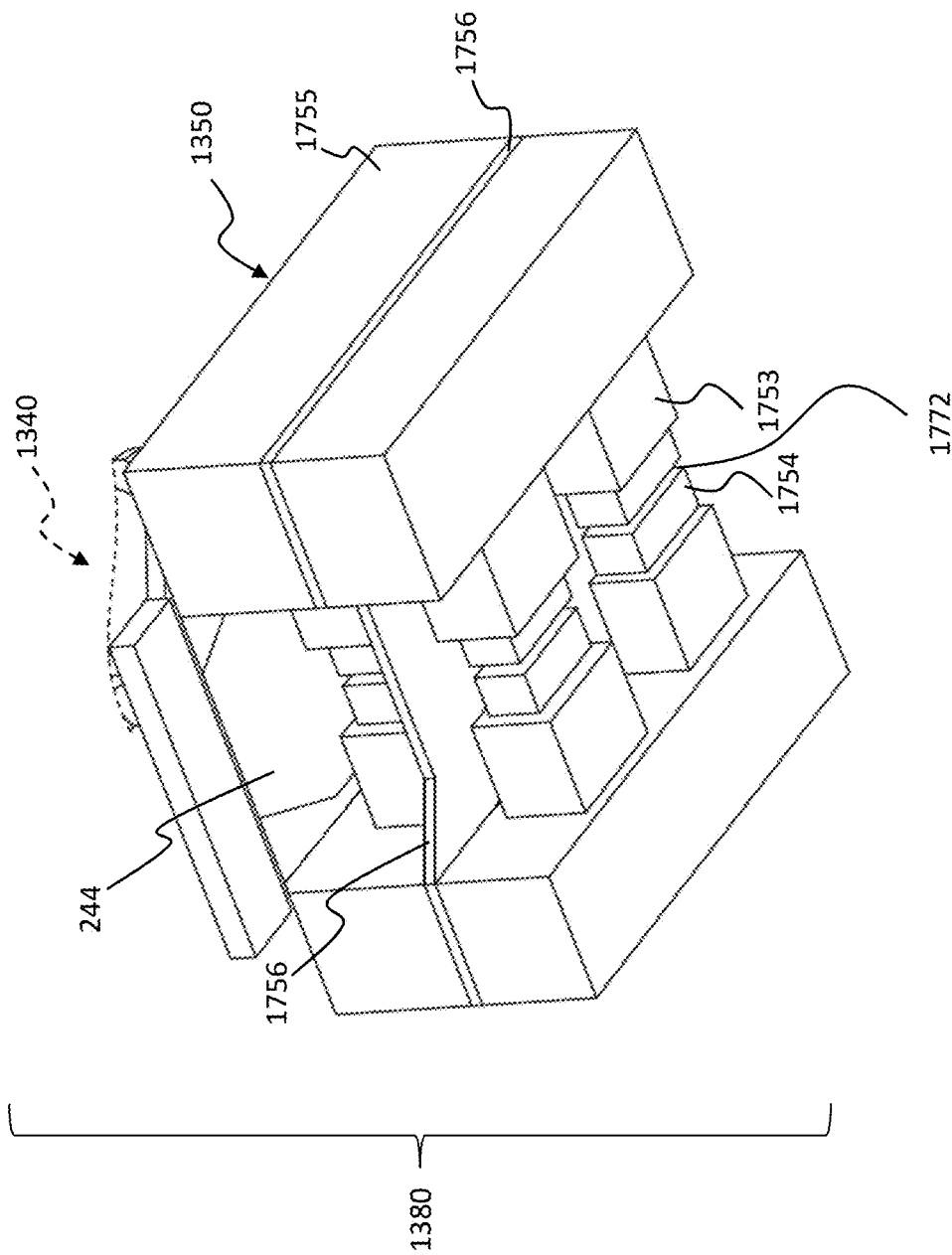
FIG. 13A is an isometric view from the bottom of another exemplary embodiment of a vibratory actuator-coupling assembly according to an exemplary embodiment.
Figure 13B:
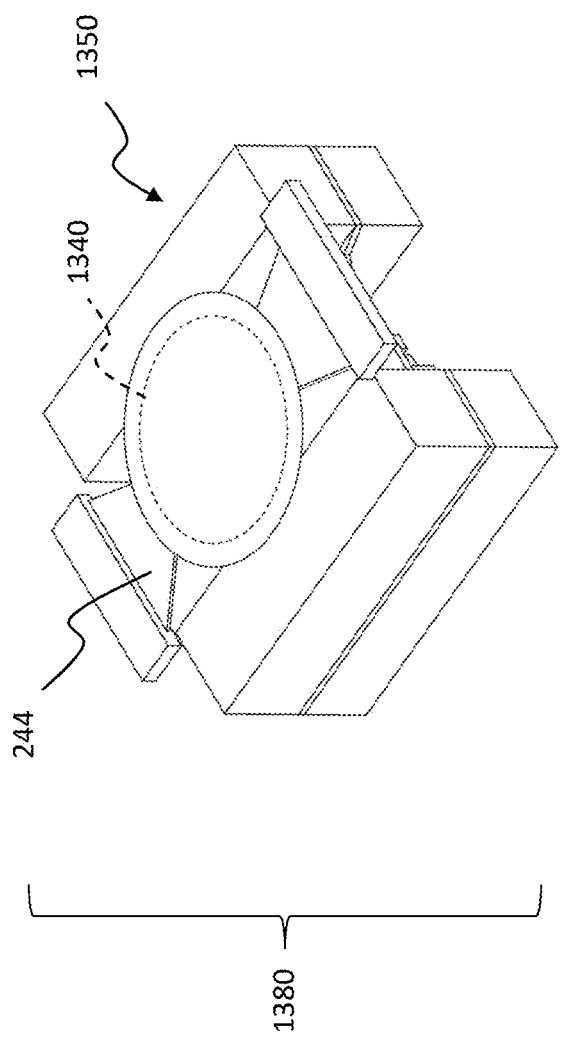
FIG. 13B is an isometric view from the top of the embodiment of FIG. 13A.

FIGS. 13A and 13B are isometric views of a vibratory actuator-coupling assembly 1380, which can correspond to vibratory actuator-coupling assembly 280 detailed above, where the vibratory electromagnetic actuator 1350 thereof can be used as the transducers of the active transcutaneous bone conduction device or the passive transcutaneous bone conduction device detailed above with some modification. Briefly, the embodiment of FIGS. 13A and 13B include an electromagnetic circuit including four (4) air gaps. In some embodiments, there are only 4 air gaps, no more, no less. The electromagnetic circuit includes four different magnetic flow paths, two for static magnetic flux, and two for dynamic magnetic flux. The static flow is essentially horizontal in two planes, upper and lower. The dynamic paths are essentially vertical in two planes, front and back. The two dynamic flux paths are separated from each other. In some exemplary embodiments, this enables the dynamic fluxes to be adjusted or otherwise set for different frequencies, one for high frequencies and one for lower frequencies. Both circuits can work for all frequencies. Each static magnetic flux can be generated by a plurality of magnets. In an exemplary embodiment, the same two magnets are utilized to generate both of the static magnetic fluxes. Indeed, in some embodiments, the same single magnet can be used to generate two or more fields. That said, in some embodiments, each static magnetic flux is respectively generated by respective different magnets. Any arrangement of magnets can generate the magnetic fluxes can be used in some embodiments. The dynamic flow paths do not pass through the permanent magnets in some embodiments.

More specifically, the vibratory actuator-coupling assembly 1380 includes a vibratory electromagnetic actuator 1350 and a coupling assembly 1340, which can correspond to coupling assembly 240 above. As illustrated in FIGS. 13A and 13B, vibratory electromagnetic actuator 1350 includes a plurality of bobbin assemblies established by yokes 1754 and coils 1753 that are wrapped around the yokes 1754 and a counterweight assembly that includes a counterweight 1755, although in other embodiments, a counterweight is not utilized, and the yokes that are utilized to conduct the magnetic fluxes are sufficient for the counterweight (the yokes that conduct a magnetic fluxes are described below).

Figure 14:
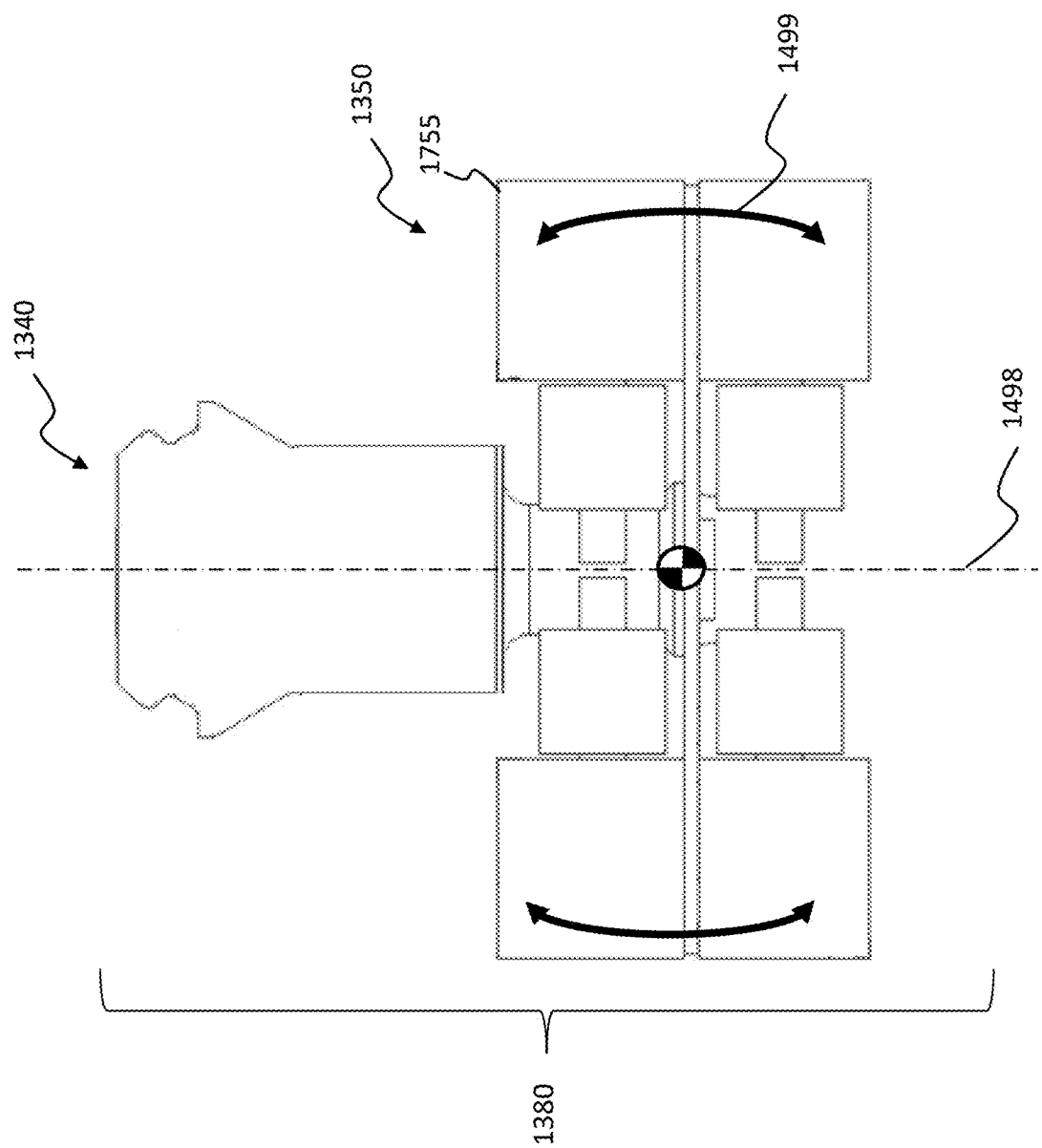
FIG. 14 is a side view of the embodiment of FIG. 13A.
Figure 15:
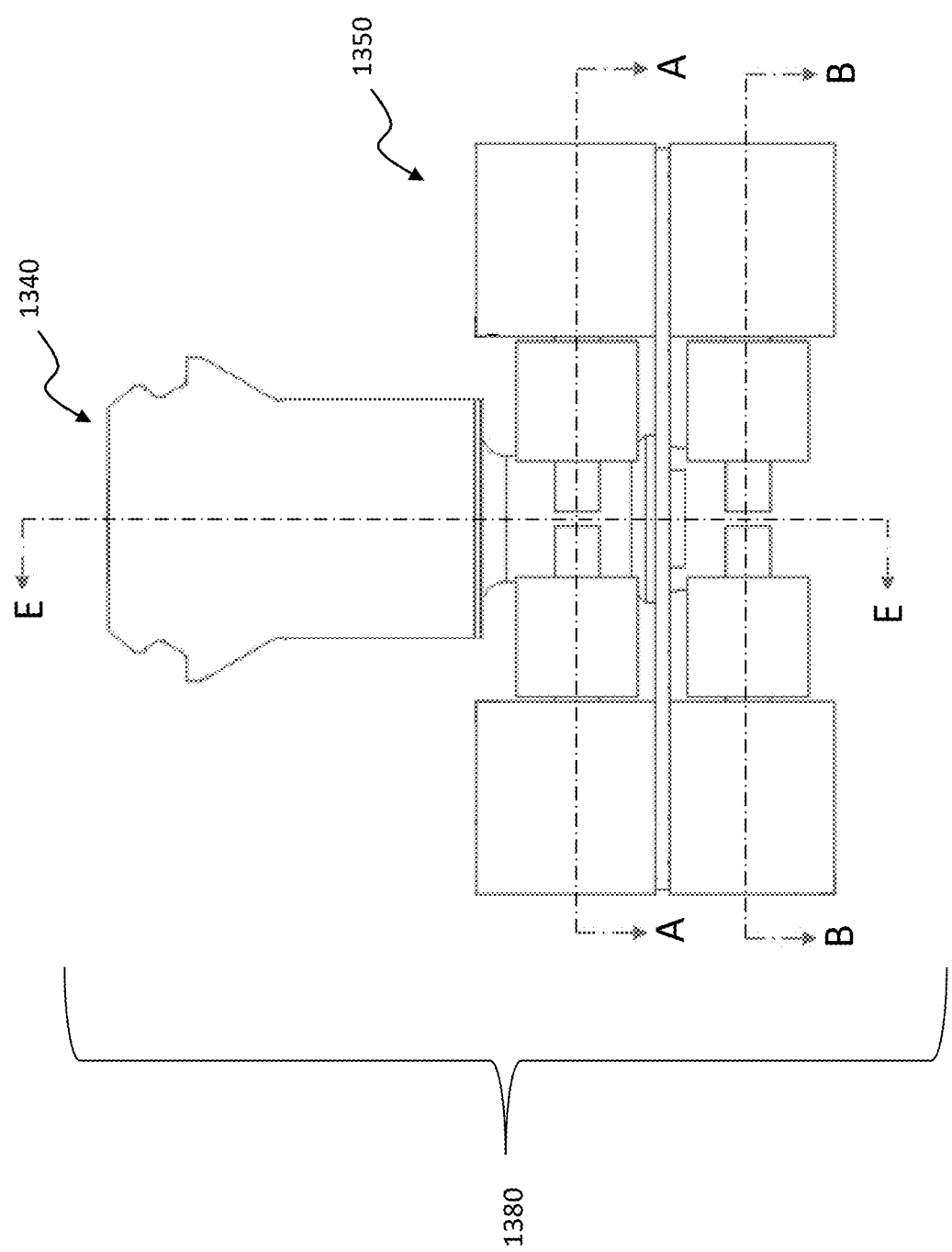
FIG. 15 is another side view of the embodiment of FIG. 13A.
Figure 16:
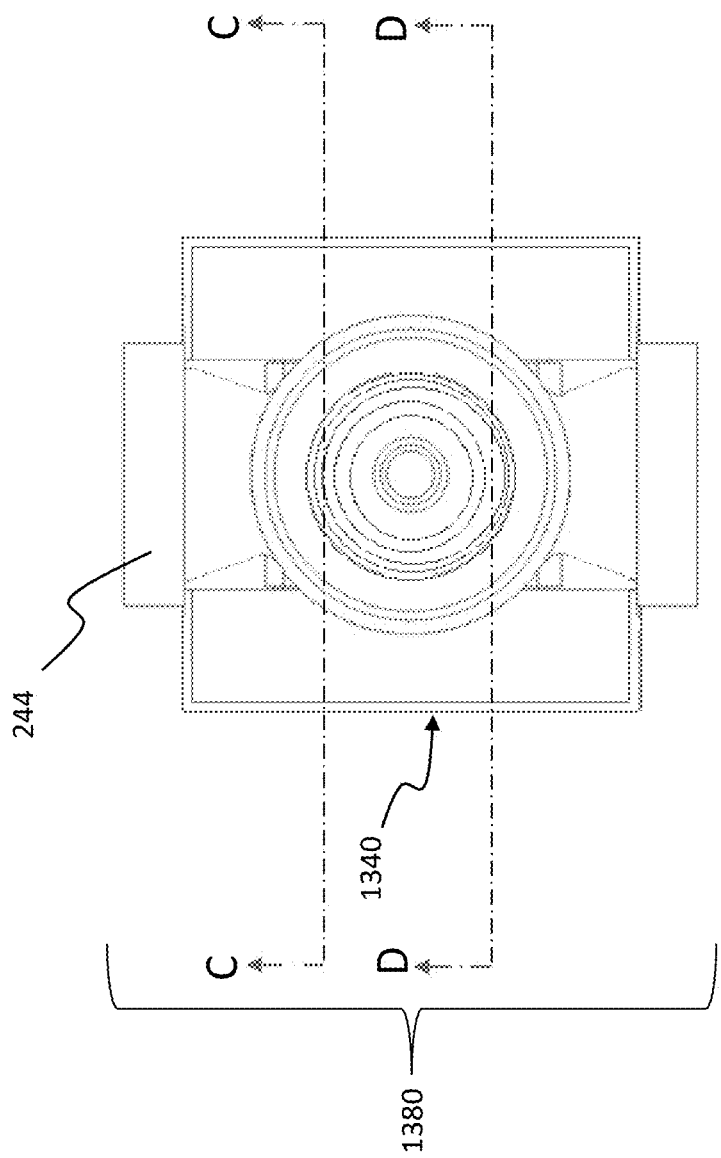
FIG. 16 is a top view of the embodiment of FIG. 13A.

FIG. 14 depicts a side view of the vibratory actuator-coupling assembly 1380. Superimposed thereon are arrows 1499. Arrows 1499 depict the movement of the counterweight assembly in general, and the counterweight 1755 in particular, during transduction. In this regard, instead of moving upward and downward as is the case with respect to the counterweight assembly of the embodiment of FIG. 5, for example, the counterweight assembly of the vibratory actuator-coupling assembly 1380 moves in a rotating manner about the center of rotation indicated by the circle in FIG. 14. Thus, the counterweight assembly has both an up-and-down component to the movement during transduction and an inboard-and-outboard component to the movement during transduction. In the embodiment of FIG. 14, the up-and-down component is the major component of the movement, and the inboard-and-outboard component is the minor component of the movement. This is because the amount of movement in the inboard direction (from the static position (the position in FIG. 14)) (i.e., the movement in the X axis with respect to the frame of reference of FIG. 14) is less than the amount of movement in the upward or downward direction (i.e., the Y axis with respect to the frame of reference of FIG. 14), both from the static position. FIGS. 15 and 16 present side views of the vibratory actuator-coupling assembly 1380, superimposed upon which are cross-section indicators for sections A-A, B-B, C-C, D-D and E-E. Some additional details and operating features of the vibratory actuator-coupling assembly 1380 will now be described with respect to these cross-sections.

Figure 17A:
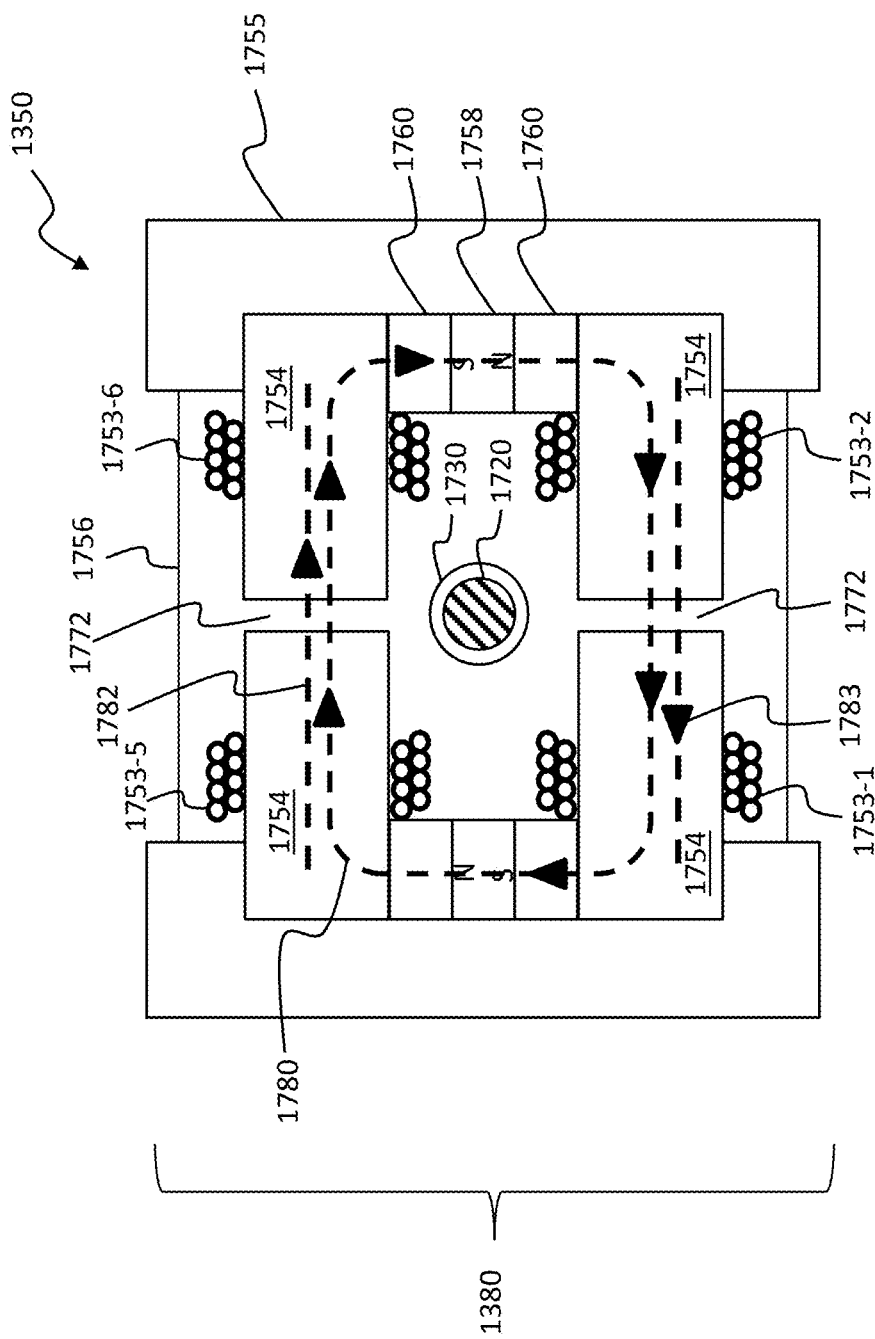
FIGS. 17A-17E are cross-sectional views of the embodiment of FIG. 13A.
Figure 17B:
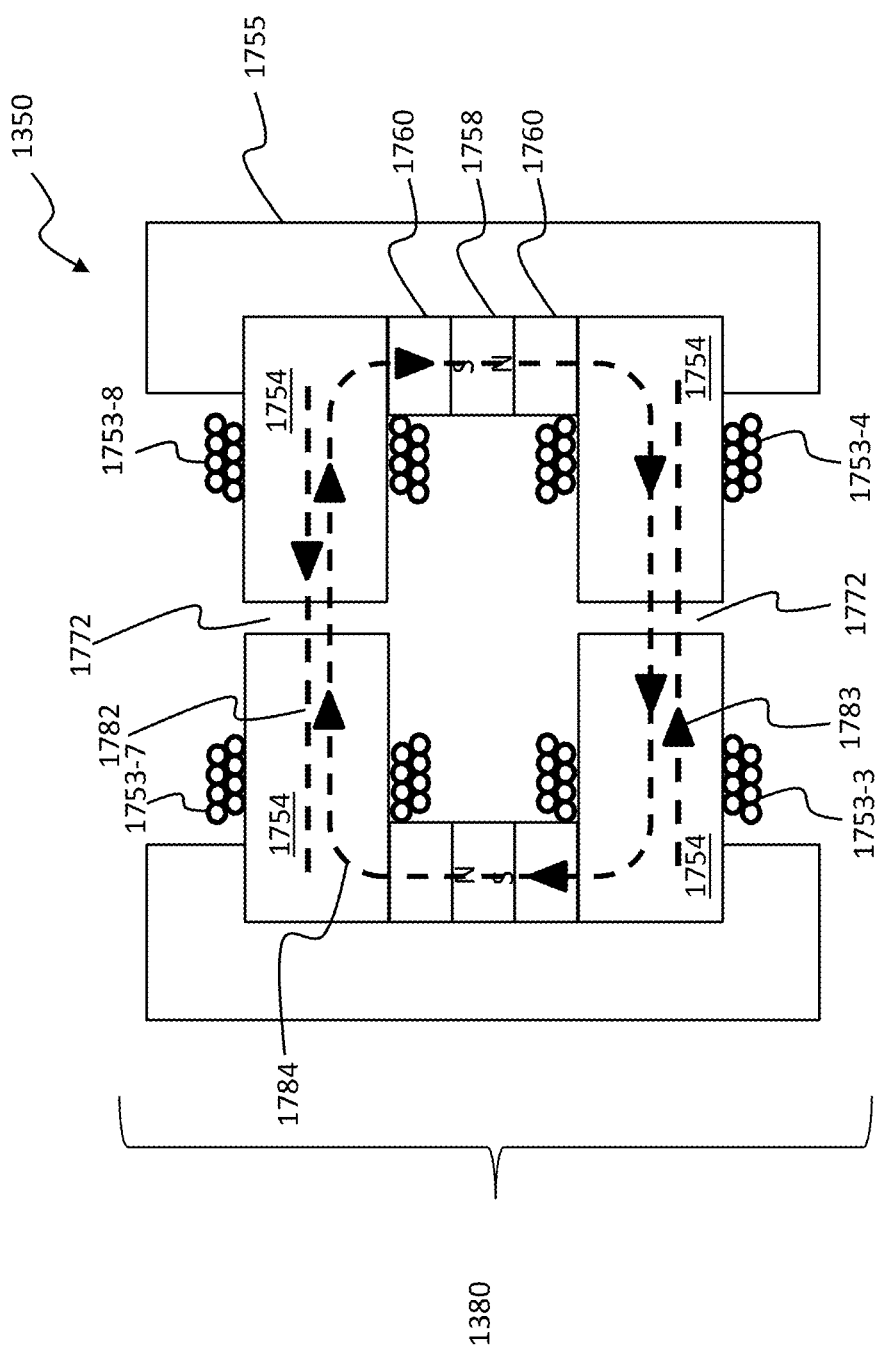

FIG. 17A depicts a cross-section A-A of FIG. 15, and FIG. 17B depicts a cross-section BB of FIG. 15. As can be seen, the vibratory electromagnetic actuator 1350 includes permanent magnets 1758, yokes 1760, and yokes 1754, along with coils 1753-5, 1753-6, 1753-1 and 1853-2 (hereinafter, coils 1753 unless a specific coil is being referred to in the discussion) which are respectively wound about respective yokes 1754, the just mentioned coils corresponding to the coils on the top portion of the vibratory electromagnetic actuator (top with respect to FIG. 14). Also as can be seen, the vibratory electromagnetic actuator 1350 includes coils 1753-7, 1753-8, 1753-3 and 1753-4, the just mentioned coils corresponding to the coils on the bottom of the vibratory electromagnetic actuator (bottom with respect to FIG. 14). In an exemplary embodiment, the respective coils, yokes, and magnets that establish the top static magnetic flux (magnetic flux 1784) are aligned with the respective coils, yokes and magnets that establish the bottom static magnetic flux (magnetic flux 1780). In this regard, the components that establish the top magnetic flux are mirror images of the components that establish the bottom magnetic flux, and are symmetrical about a plane that is normal to the longitudinal axis, and have respective locations (e.g., the most inboard and topmost portion of the yoke 1754 closest to the longitudinal axis, the most outboard and topmost portion of the yoke 1754 closest to the longitudinal axis, etc.) that are all located the same distance away from the longitudinal axis 1498 and the same distance away from the aforementioned plane. However, as will be noted below, in some exemplary embodiments, the components are not symmetrical. By way of example only and not by way of limitation, the coils 1753 can have different configurations.

It is briefly noted that with respect to the term top and bottom as used in reference to FIG. 14, the top corresponds to the portion of the vibratory actuator-coupling assembly that is closer to the skin than the bottom portion when the vibratory actuator-coupling assembly is attached to the percutaneous abutment which is attached to the recipient. This is the opposite of what is depicted in FIG. 5.

Spring 1756 connects a first portion of the counterweight assembly to the second portion of the counterweight assembly (i.e., with respect to the frame of reference of FIG. 17A, the left counterweight portion and the right counterweight portion) and permits movement of the left and right portions relative to one another in a symmetrical fashion about the longitudinal axis 1498 of the vibratory actuator-coupling assembly 1380 during transduction.

The coils 1753 can be energized in a manner that will be described in greater detail below with an alternating current to create the dynamic magnetic flux 1782 and dynamic magnetic flux 1783, which can be more clearly seen in FIGS. 17C and D, and will be described below. Conversely, respective permanent magnets 1758 generate the static magnetic flux 1780 and the static magnetic flux 1784 as can be seen. The two static magnetic fluxes 1780 and 1784 are respectively conducted via the respective yokes 1760 and 1754, and cross air gaps 1772. The two static magnetic fluxes travel in planes normal to the longitudinal axis 1498 of the assembly, and the two dynamic magnetic fluxes travel in planes that are parallel to the longitudinal axis 1498. With respect to the embodiment of FIGS. 15 and 16, it is noted that some of the components depicted in FIGS. 17A and 17B that conduct the static magnetic fluxes are separate components with respect to the respective static magnetic fluxes, while the same components are used to generate both fluxes. However, in some other embodiments, different components are used to generate the fluxes. That is, the components that generate the static magnetic flux 1780 depicted in FIG. 17A can instead be different than the components that generate the static magnetic flux 1784 depicted in FIG. 17B. Still, as seen in the figures, it is possible that some components can be shared between the separate static magnetic fluxes, such as the yokes or magnets. Any arrangement that can enable the teachings detailed herein and/or variations thereof to be practiced can be utilized in at least some exemplary embodiments.

It is also noted that with respect to the embodiment of FIGS. 15 and 16, the components that generate and conduct the dynamic magnetic fluxes are separate components with respect to the respective dynamic magnetic fluxes. That is, the components that generate the dynamic magnetic flux 1782 depicted in FIG. 17A are different than the components that generate the dynamic magnetic flux 1783 depicted in FIG. 17B. Any arrangement that can enable the teachings detailed herein and/or variations thereof to be practiced can be utilized in at least some exemplary embodiments.

As can be seen, the static magnetic fluxes can share the same components as the dynamic magnetic fluxes.

Figure 17C:
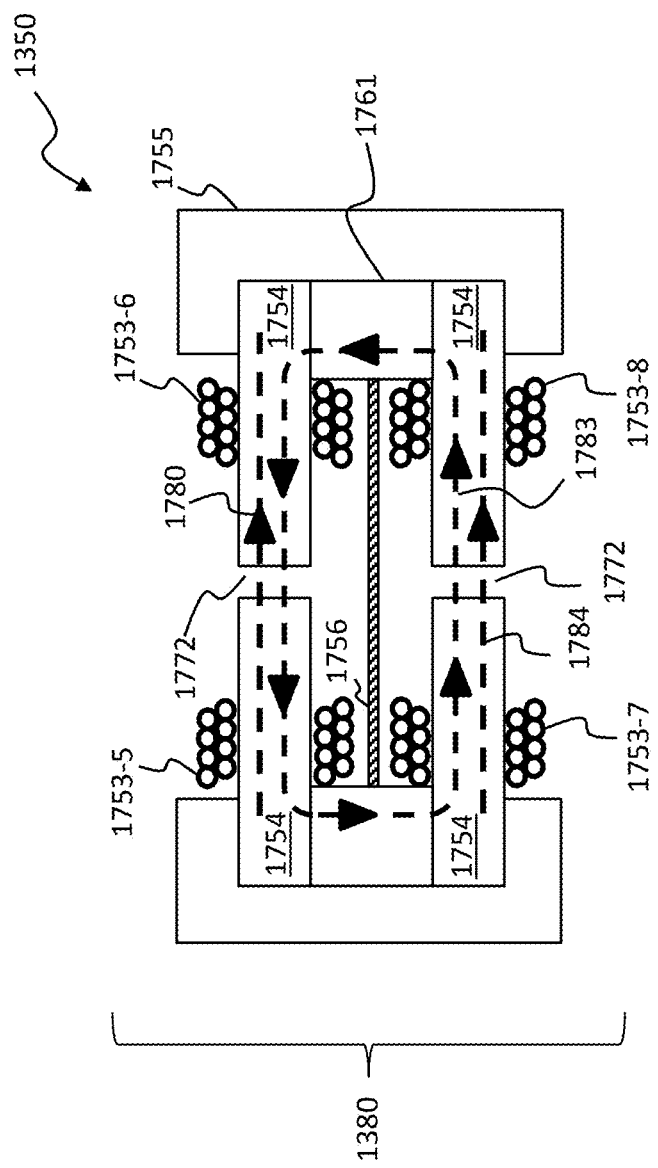
Figure 17D:
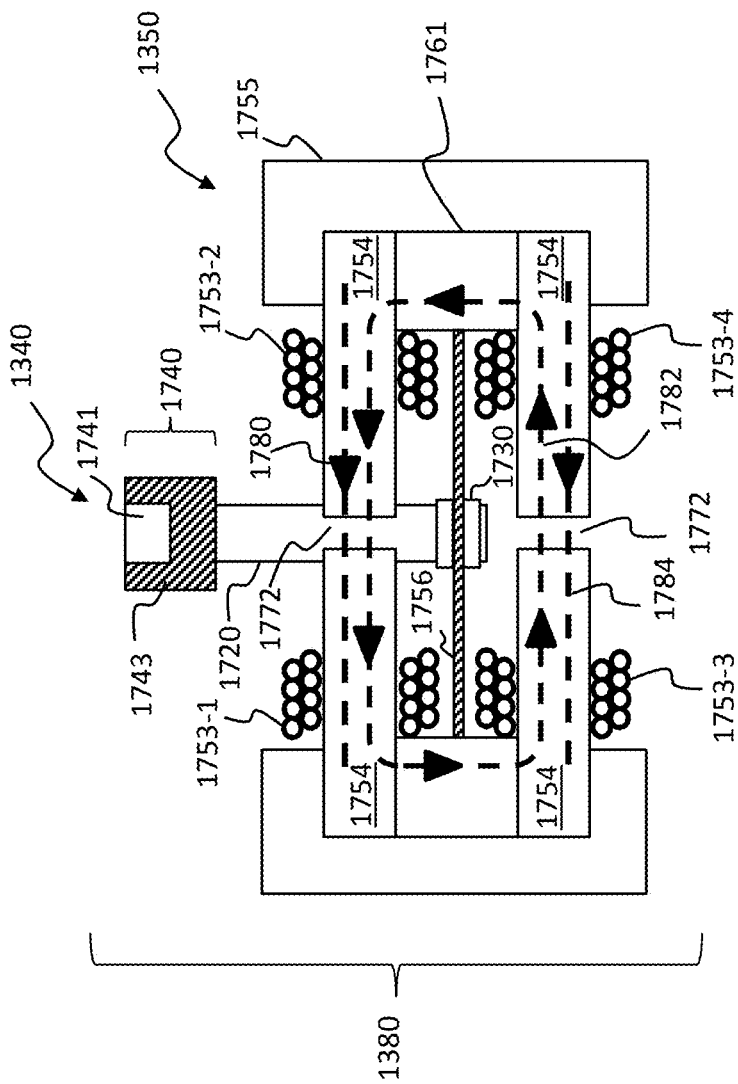

While FIGS. 17A and 17B depict section cuts through the vibratory actuator-coupling assembly that are normal to the longitudinal axis 1498, FIGS. 17C and 17D are section cuts through the vibratory actuator-coupling assembly that are parallel to the longitudinal axis 1498, respectively corresponding to sections CC and DD. FIGS. 17C and 17D depict yokes 1761, which respective yokes conducted the respective static magnetic fluxes. FIGS. 17C and 17D also depict coils 1753-5, 1753.6, 1753-7, 1753-8, 1753-1, 1753-2, 1753-3 and 1753-4, were like reference numbers for the coils in these latter figures correspond to the like reference numbers for coils in FIGS. 17A and 17B (and FIG. 17E).

FIG. 17D also depicts connecting rod 1720 that extends from coupling assembly 1740 to spring 1756, and is connected thereto by nuts 1730. The connecting rod 1720 transfers the force from the seismic mass to the coupling assembly 1740 to provide the oscillatory force to impart vibrations to the recipient.

FIG. 17C depicts a first dynamic magnetic flux 1783, and FIG. 17D depicts a second dynamic magnetic flux 1782, those fluxes flowing in the planes of those figures. Also as can be seen, the top static magnetic flux 1780 and the bottom static magnetic flux 1784 are depicted as lines owing to the fact that the planes in which the static magnetic fluxes flow are normal to the plane in which FIGS. 17C and 17D lie. (The opposite of what is depicted in FIGS. 17A and 17B, where the dynamic magnetic fluxes are depicted as lines owing to the fact that the planes in which those magnetic fluxes flow are normal to the planes in which those figures lie, and where the static magnetic fluxes are depicted as circuits owing to the fact that the planes in which those magnetic fluxes flow are on the planes in which those figures lie.)

In an exemplary embodiment, the respective coils and yokes that establish the first dynamic magnetic flux (magnetic flux 1783) are aligned with the respective coils and yokes that establish the second dynamic magnetic flux (magnetic flux 1782). In this regard, the components that establish the first dynamic magnetic flux are mirror images of the components that establish the second dynamic magnetic flux, and are symmetrical about a plane lying on the longitudinal axis 1498 are all located the same distance away from the longitudinal axis 1498 and the aforementioned plane. That said, in some alternate embodiments, as will be described below, the components are not symmetrical. By way of example only and not by way of limitation, again as will be described in greater detail below, the coils 1753 can be different for the first dynamic magnetic flux and the second dynamic magnetic flux.

Figure 18A:
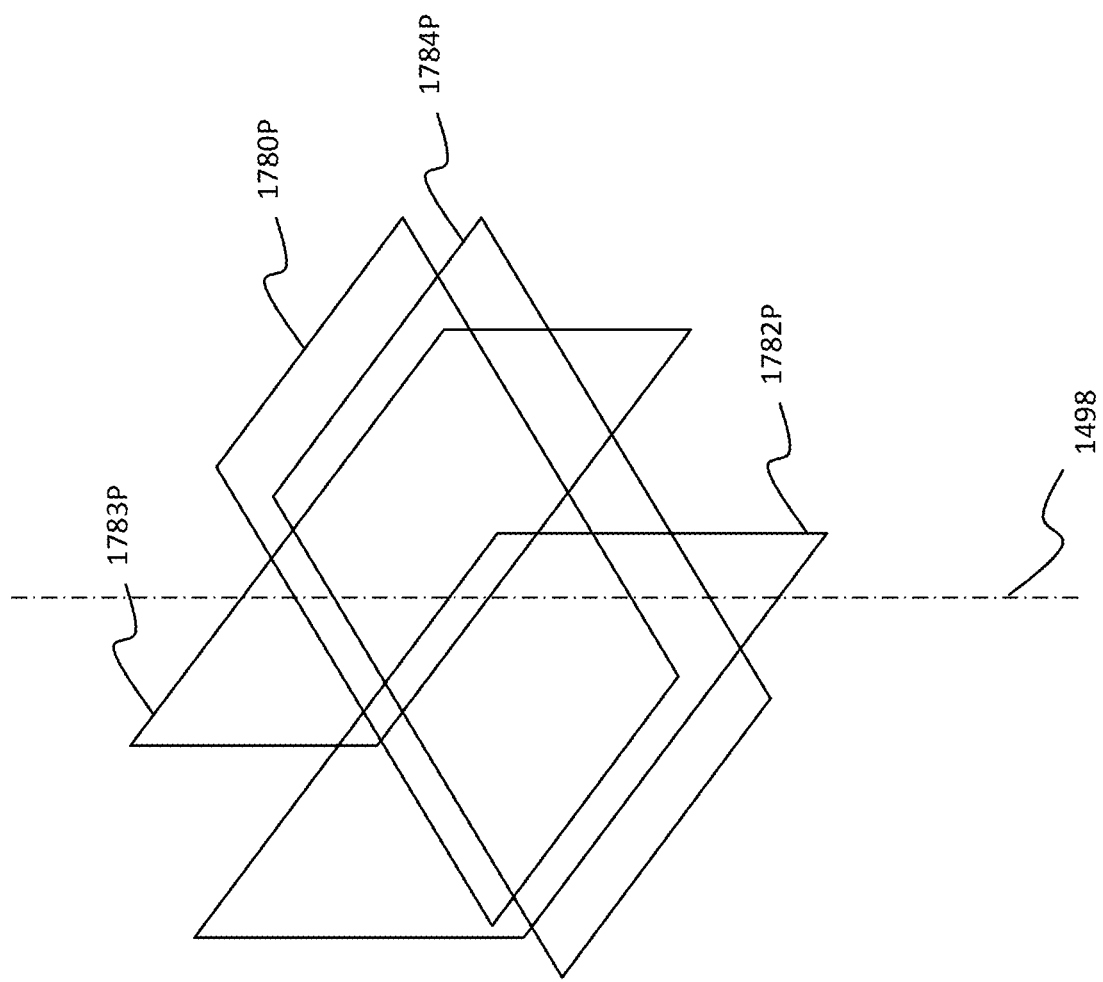
FIGS. 18A and 18B are conceptual representations of the planes in which the various static magnetic fluxes and the dynamic magnetic fluxes flow.
Figure 18B:
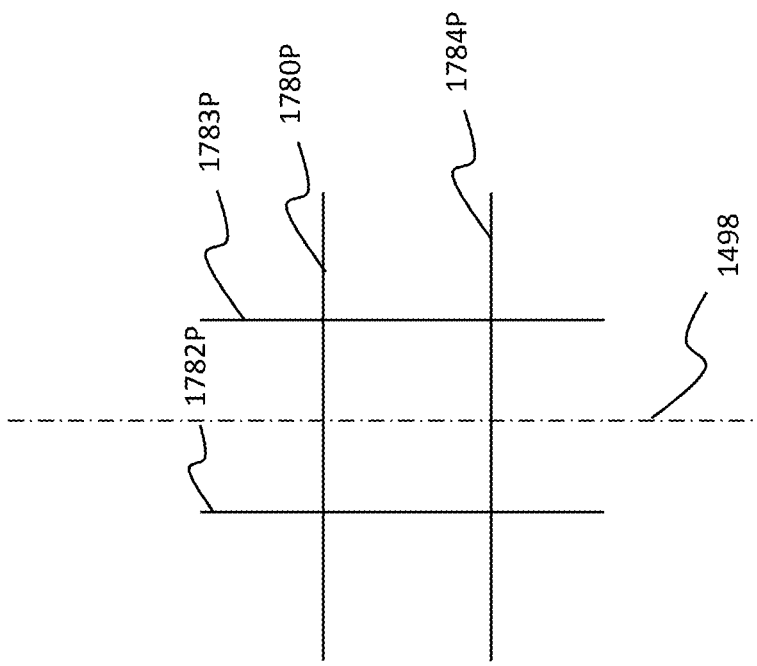

FIGS. 18A and 18B depict the planes in which the static magnetic fluxes and the dynamic magnetic fluxes travel, where the orientations of the planes correspond to FIGS. 13B and 14, respectively. Plane 1782P is the plane of flux 1782, plane 1783P is the plane of flux 1783, plane 1780P is the plane of flux 1780, and plane 1784P is the plane of flux 1784.

It is noted that in contrast to the embodiment of FIG. 5 above, the components that generate the static magnetic flux and the dynamic magnetic flux are all part of the counterweight assembly, whereas in the embodiment of FIG. 5, the components that generate the dynamic magnetic flux are part of a static assembly that does not move during transduction or actuation (relative to the recipient when fixed to the recipient).

Figure 17E:
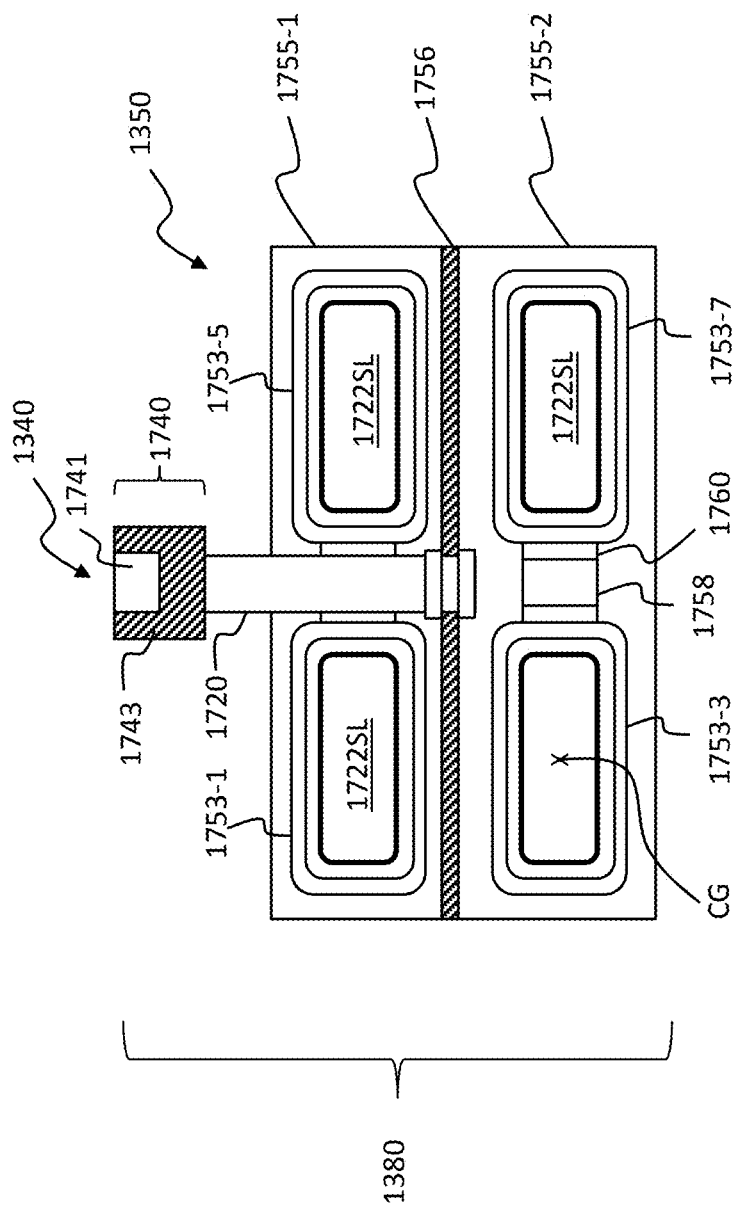

As can be seen, vibratory electromagnetic actuator 1350 includes four (4) air gaps 1722 in total. All of these air gaps are perpendicular to the longitudinal axis 1498 (where the frame of reference here is the direction of magnetic flux flow across the air gaps—the surfaces that establish the airgaps are all parallel to the longitudinal axis 1498). FIG. 17E depicts surfaces 1722L that form one side of all of the 4 air gaps. That is, FIG. 17E depicts a cross-sectional view taken along section E-E of FIG. 15. This shows surfaces 1722SL (L for left counterweight portion), which surfaces make up one side of the airgaps 1722, where there is corresponding right surfaces making up the other side of the airgaps.

It is briefly noted that the length and height of the surfaces 1722SL can be about 1.5 to 3 mm and 0.5 to 2 mm, respectively (e.g., 2.25 mm by 1.25 mm, etc.) or any value or range of values therebetween in about 0.01 mm increments. Also, the distance across the air gaps 1722 is about 30 to about 200 microns (the airgap width) or any value or range of values therebetween in about 1 micron increments (e.g., 75, 100, 150, 50 to 177 microns, etc.). In view of these latter dimensions, it is to be understood that the motion within the airgap will be relatively small during transduction of the actuator. In an exemplary embodiment, the amount of motion will correspond to about 5% to about 25% of the at rest/static distance of the airgap. That is the airgap will expand by about 5% to about 25% of the at rest width and will contract by about 5% to about 25% of the at rest width. The amount of expansion and contraction can be relative to the frequency at which the transducer is vibrating. For frequencies of about 4000 Hz, the change in the width of the airgap will be about 1 μm or less. For frequencies of about 600 to 1000 Hz, the aforementioned percentages can be applicable. In an exemplary embodiment, the resonant frequency of the transducer will be about 700 to about 800 Hz.

In the electromagnetic actuator of FIG. 14 and the related figures, the air gaps close static magnetic fluxes and the dynamic magnetic fluxes between the left portion and the right portion of the counterweight assembly.

It is noted that the electromagnetic actuator of FIG. 14 is a balanced actuator. In alternate configuration a balanced actuator can be achieved by adding additional axial air gaps or removing some air gaps (which would potentially require adjusting the locations/configurations of the springs and the connecting components, etc., and could also potentially require passing the dynamic magnetic flux through one or more of the permanent magnets). As will be described below, embodiments utilizing the concept of the orthogonal fluxes include unbalanced actuators as well.

It is noted that in some exemplary embodiments, one or more of the features described above with respect to the embodiments of FIGS. 5-12 are utilized with or otherwise found in vibratory actuator-coupling assemblies that utilize the orthogonal fluxes. Thus, in an exemplary embodiment, there is a vibratory electromagnetic actuator that utilizes the orthogonal fluxes detailed herein (whether two static magnetic fluxes and two dynamic magnetic fluxes, more than two static magnetic fluxes (3, 4, 5, 6, 7, 8, 9, 10, or more), fewer than two static magnetic fluxes, more than two dynamic magnetic fluxes (3, 4, 5, 6, 7, 8, 9, 10, or more), or fewer than two dynamic magnetic fluxes.

In view of the above, it can be seen that in some embodiments, there is an electromagnetic transducer, such as the vibratory electromagnetic actuator 1350 above, comprising a plurality of static flux paths (e.g., the paths of fluxes 1780 and 1784, traveling on planes 1780P and 1784P), and a plurality of dynamic flux paths (e.g., the paths of fluxes 1782 and 1783, traveling on planes 1782P and 1783P). The actuator has at least two of the plurality of static flux paths lie in respective first planes parallel and offset from one another (e.g., offset in the direction of axis 1498, by, for example, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 80, 90 or 100 mm or more or less or in any value or range of values between any of these numbers in about 0.01 mm increments (e.g., the planes are anywhere from 4.43 mm to 12.12 mm away from each other, 10.10 mm away from each other, etc.). These later ranges, such as the hundred millimeters are unlikely to be utilized for a hearing prosthesis, but could be utilized for other prosthetic devices or other nonmedical device devices. It is noted that in some exemplary embodiments, such as with respect to micro-actuators, the planes are anywhere from 0.001 mm to 1 mm away from each other within a range of values of 0.0001 mm increments or the planes are located within a range of numbers therebetween in the 0.001 mm increments.

The actuator can also be configured such that at least two of the plurality of dynamic flux paths lie in respective second planes parallel and offset from one another (e.g., offset in the direction normal to the axis 1498, by, for example, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 80, 90, or 100 mm or more or less or in any value or range of values between any of these numbers in about 0.01 mm increments (e.g., the planes are anywhere from 5.41 mm to 11.11 mm away from each other, 12.11 mm away from each other, etc.). It is noted that in some exemplary embodiments, such as with respect to micro-actuators, the planes are anywhere from 0.001 mm to 1 mm away from each other within a range of values of 0.0001 mm increments or the planes are located within a range of numbers therebetween in the 0.001 mm increments. In an exemplary embodiment, the first planes and the second planes are arrayed so as to establish at least a general tic-tac-toe lattice, as can be seen in FIG. 18B.

It is also noted that while the planes of the static magnetic flux are represented as being orthogonal to the longitudinal axis 1498, in some alternative embodiments, the planes of the static magnetic flux are parallel to the longitudinal axis 1498, and the planes of the dynamic magnetic flux are orthogonal to the longitudinal axis 1498. It is also noted that in at least some exemplary embodiments, a first plane can include a first static magnetic flux path, and a second plane parallel to the first plane can include a first dynamic magnetic flux path, and a third plane can include a second static magnetic flux path, and a fourth plane parallel to the third plane can include a second dynamic magnetic flux path, where the first and third planes are orthogonal to one another. It is also noted that while the embodiments detailed above depict planes that are normal one another, in some alternate embodiments, the planes are angled relative to one another less than or more than 90 degrees. Any arrangement that will enable the teachings detailed herein can be utilized in at least some exemplary embodiments.

Figure 18C:
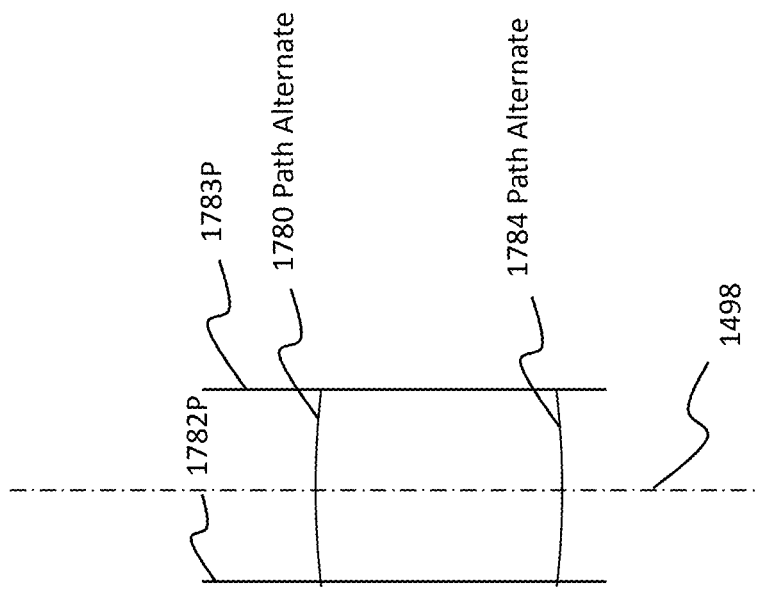
FIG. 18C is another conceptual representation of the path of the static magnetic fluxes and the dynamic magnetic fluxes.

It is also noted that in at least some exemplary embodiments, the flux paths do not travel on flat plains per se. In an exemplary embodiment, the flux paths can travel through a yoke assembly and/or a yoke and magnet assembly that has a past that varies in three dimensions instead of just two dimensions. By way of example only and not by way of limitation, FIG. 18C presents such an exemplary arrangement, where 1780 Path Alternate is the path through which flux 1780 travels, and 1784 Path Alternate is the path through which flux 1784 travels, where the frame of reference of FIG. 18 C corresponds to FIG. 14. It can be understood that planes 1782P and 1783P can instead be replaced with comparable configurations as well. Any arrangement that will enable the teachings detailed herein can be utilized in at least some exemplary embodiments.

Also, in an exemplary embodiment, the aforementioned electromagnetic transducer can be configured such that a first static flux path of the plurality of static flux paths travels in the same clock direction as a second of the static flux path of the plurality of static flux paths, as shown with respect to FIGS. 17A and 17B, and a first dynamic flux path of the plurality of dynamic flux paths travels in an opposite clock direction as a second of the dynamic flux path of the plurality of dynamic flux paths when the first and second dynamic flux paths are energized at the same time, as seen in FIGS. 17C and 17D. By "clock path," it is meant the clockwise direction or the counterclockwise direction, were all directions are gauged from the same reference point (e.g., looking at the same side of the clock). In some exemplary embodiments, the aforementioned electromagnetic transducer is such that the respective first planes and respective second planes are symmetrical about a first reference plane parallel to and lying on a longitudinal axis of the transducer. In this regard, with respect to FIG. 18B, the plane extending into and out of the page normal to the extent of the page would be this first reference plane. In an exemplary embodiment, the aforementioned electromagnetic transducer is configured such that the respective first planes and respective second planes are orthogonal to a first reference plane parallel to and lying on a longitudinal axis of the transducer, where this reference plane is the plane of the page of FIG. 18B.

Also, in an exemplary embodiment, the electromagnetic transducer further comprises an air gap (e.g., air gap 1722) across which at least one of the plurality of dynamic flux paths and at least one of the plurality of static flux paths cross and those paths interact with each other so as to cause transduction. In this exemplary embodiment, the angular orientation of the facing surfaces (1722SL and the respective opposite surfaces of the right side) that establish the air gap changes relative to one another during transduction. Also, in an exemplary embodiment, the facing surfaces that establish the air gap extend in a plane that is parallel to a major direction of movement of a seismic mass of the electromagnetic transducer (the direction of the longitudinal axis 1498).

Figure 19:
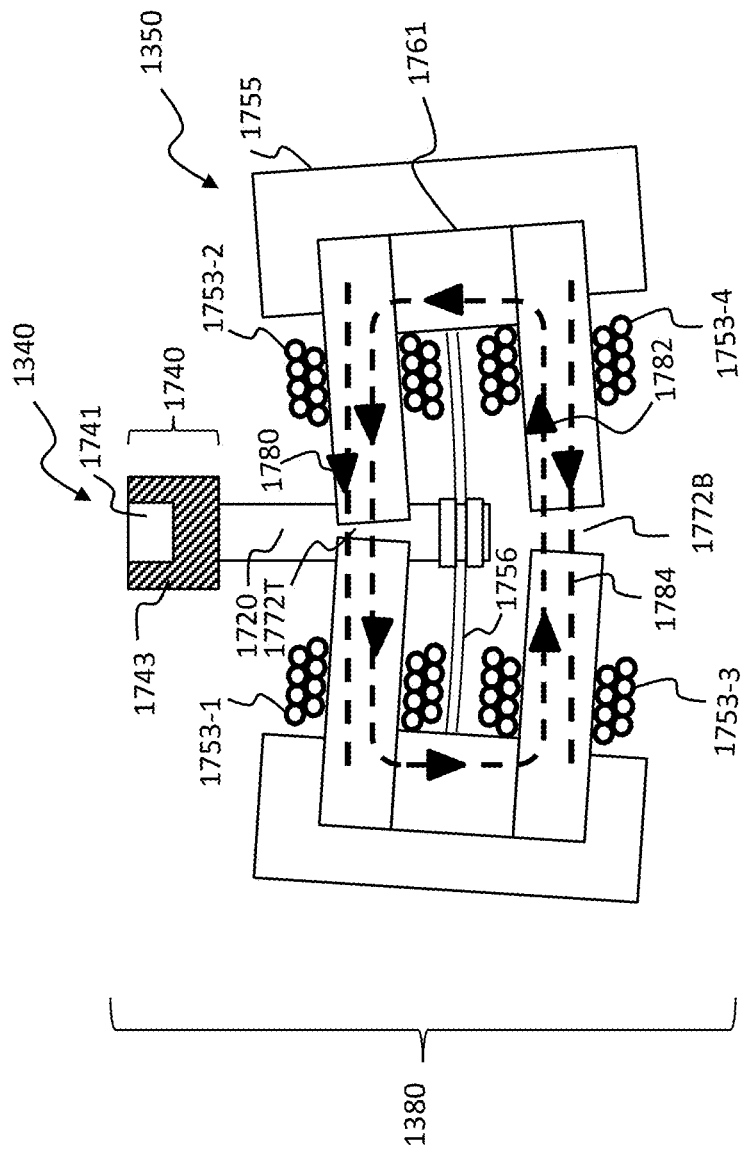
FIGS. 19 and 20 depict movement of the transducer during transduction.
Figure 20:
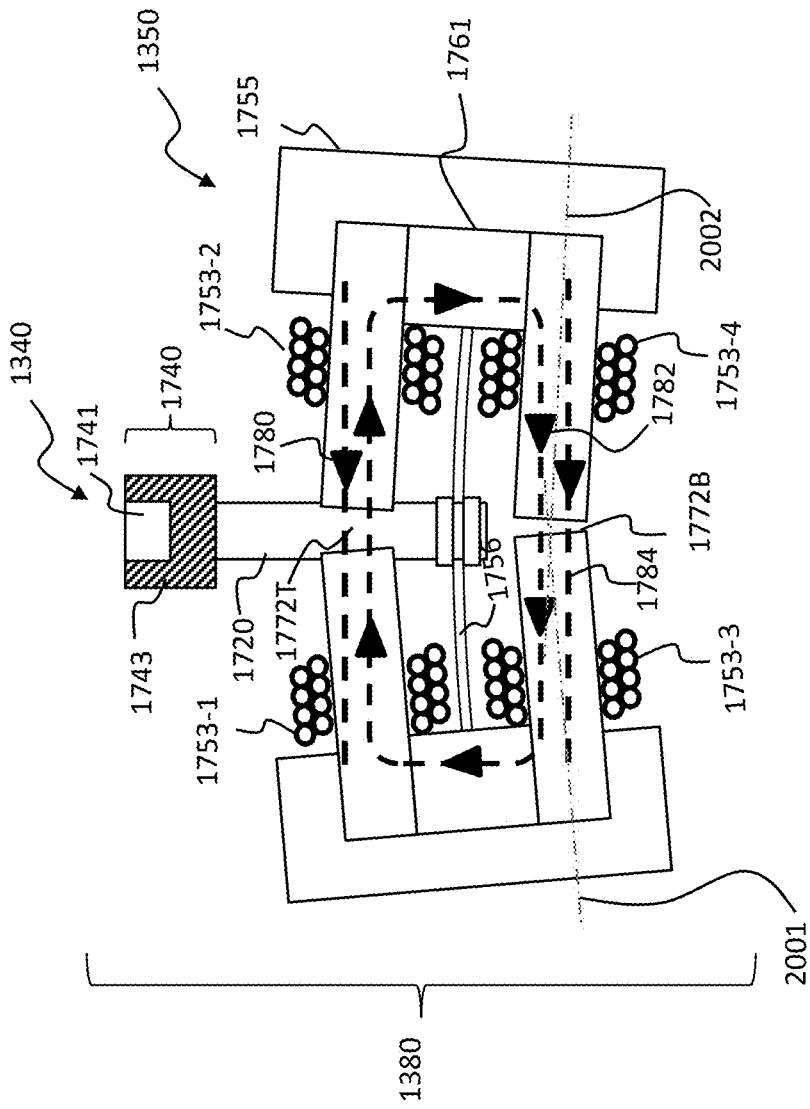

With respect to the aforementioned angular orientation changes, FIGS. 19 and 20 depict this change with reference to the cross-sectional view of FIG. 17D, with FIG. 19 depicting the major movement direction upward and FIG. 20 depicting the major movement direction downward (both with respect to the at rest/non-energized position of FIG. 17D (although FIG. 17D does depict the dynamic magnetic flux 1782—the locational features represented in FIG. 17D represent the moment that the transducer is energized from a non-energized state, and thus movement has not commenced due to the interactions of the dynamic and static magnetic fluxes). In both figures, there is a movement in the minor direction inboard (relative to the at rest/non-energized position). Note that in FIG. 20, the direction of the dynamic magnetic flux 1782 is reversed from that in FIG. 19. While not shown, the direction of the dynamic magnetic flux 1783 would also be reversed in FIG. 20 relative to that which would be the case in FIG. 19. As can be seen, the angles of the surfaces that establish the air gaps changes relative to one another. Also, as can be seen, the distance from a center plane of the surfaces of the air gap changes. The surfaces of the top air gap, 1722T move away from each other relative to their at rest position, and the surfaces of the bottom air gap, 1722B, move towards each other relative to their at rest position. It is noted that with respect to various dimensions of movement with respect to the air gaps, movement is measured from the geometric center of the surfaces of the air gap (FIG. 17E depicts the geometric center GC of one of the surfaces). For example, while the tops of the surfaces move more than the bottoms of the surfaces away from each other in FIG. 20 vis-à-vis air gap 1722T, an apples to apples comparison with movement can be made relative to the bottom air gap 1722B if the geometric center is used. In this regard, in an exemplary embodiment, the air gaps are such that the distance between the geometric centers of the services that establish their gaps increase and decrease respectively, by the same amount, during transduction. Also, in an exemplary embodiment, the angular change increases and decreases by the same amount for all the air gaps, during transduction. That said, in an alternate embodiment, where, for example, the transducer is not symmetric about the plane normal to the longitudinal axis 1498, the amount of change in the distance between the geometric centers of the surfaces can be different between the top air gap and the bottom air gap and/or the amount of change in the angular orientation between the surfaces can be different between the top air gap in the bottom air gap.

It is noted that while the surfaces establishing the air gaps are planar and are parallel to each other when the transducer is in the at-rest position, in an alternate embodiment, the surfaces are obliquely angled relative to one another in the at-rest position.

Thus, as can be seen, in an exemplary embodiment, both the angular orientation of the surfaces that establish the air gap and the distance between the respective geometric centers of the surfaces that establish their gap changes during transduction, albeit in this exemplary embodiment, the angular orientation increases for both the top and the bottom air gaps while the distance increases for one and decreases for the other during transduction.

Corollary to the above, it is to be noted that not only do the services that establish the air gap changed relative to one another, the surfaces also change relative to an axis parallel to a major direction of movement of a seismic mass of the electromagnetic transducer (e.g., the longitudinal axis 1498). That said, in some exemplary embodiments, it can be that only one of the two services change its angular orientation relative to the aforementioned axis.

As seen from the above, an exemplary embodiment includes a prosthesis comprising an electromagnetic actuator including two dynamic magnetic flux circuits that are mechanically connected to each other, wherein the prosthesis is configured to be at least one of implanted in or worn on a human. Such embodiments are seen in FIGS. 17A and 17B, where the structure that establishes the circuit of the dynamic magnetic flux 1782 is mechanically connected to the structure that establishes the circuit of the dynamic magnetic flux 1783. This as opposed to an electromagnetic actuator that includes a plurality of dynamic magnetic flux circuits that are not mechanically connected to each other.

In an exemplary embodiment of this embodiment that includes the dynamic magnetic flux circuits that are mechanically coupled to one another, the actuator includes a spring (e.g., spring 1756) that supports components (e.g., yokes 1754) that establish a plurality of air gaps of the transducer across which at least one of the two dynamic flux circuits extends. Further, the transducer is configured such that the varying magnetic field across the plurality of air gaps causes the spring and the components that establish the plurality of air gaps to act collectively as a bender. This feature is seen in FIGS. 19 and 20. In this regard, piezoelectric benders are known in the art, which "flap" when energized from a de-energized state or when de-energized from an energized state. Thus, the embodiments detailed above act as a bender when the actuator is energized with an alternating current through the coils.

In an exemplary embodiment, there is an electromagnetic transducer, comprising a first static magnetic flux circuit generated by at least one permanent magnet, and a plurality of dynamic magnetic flux circuits, wherein at least two of the plurality of dynamic flux circuits interact with the static magnetic flux circuit to enable transduction. This as opposed to, for example, only one dynamic flux interacting with only one static flux to enable transduction, or two separate dynamic fluxes respectively but separately interacting with two separate static fluxes (which is different that the embodiments described above, where two separate dynamic fluxes both interact with both separate static fluxes).

Consistent with the teachings detailed above, in an exemplary embodiment, the actuator includes at least one static magnetic flux that extends in a circuit in a plane that is normal to the respective planes in which the two dynamic flux circuits extend. Also, in an exemplary embodiment, the two dynamic flux circuits are magnetically decoupled from each other.

Figure 21:
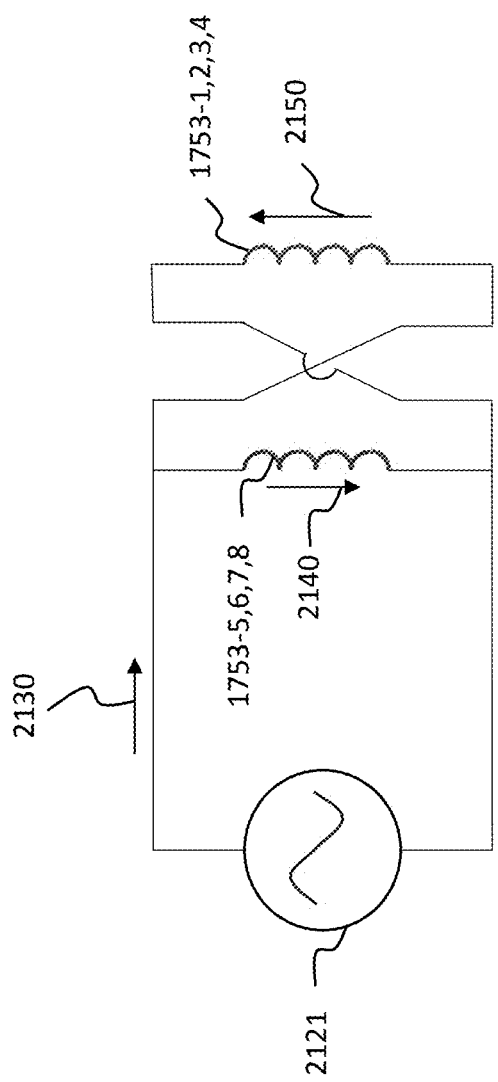
FIG. 21 is an exemplary electrical schematic according to an exemplary embodiment.

Still further, in an exemplary embodiment of the above prosthesis, the prosthesis includes sensor that captures energy in an environment and outputs an electrical signal to the actuator. Also, the prosthesis is configured such that a first of the two dynamic flux circuits is established by a plurality of first coils electrically arranged in series with one another and a second of the two dynamic flux circuits is established by a plurality of second coils electrically arranged in series with one another, and the prosthesis is configured such that upon output of an electrical signal to the actuator, for the outputted signal, the dynamic magnetic flux generated by the first of the two dynamic flux circuits travels in a direction counter to the direction of travel of the dynamic magnetic flux generated by the second of the two dynamic flux circuits. This latter feature is seen by comparing FIGS. 17C and 17D. The former feature is depicted in FIG. 21, which depicts an electrical circuit diagram that includes a signal generator 2121 that outputs a signal in the direction of arrow 2130 during a first phase of current production. As can be seen, the first coils are coils 1753-5, 6,7 and 8 and the second coils are coils 1753-1, 2, 3, and 4, where the arrows 2140 and 2150 represent the direction of current flow. During the second phase of current production, the direction of current is reversed, and thus the arrows of FIG. 21 are reversed, thus resulting in an alternating current, and thus changing the direction of current flow through the coils to achieve the change in dynamic magnetic flux direction represented by comparing FIGS. 19 and 22 each other. As can be seen, the two dynamic magnetic flux circuits are energized by the same source (source 2121). Here, an impedance of the electrical system of which the two circuits are apart is the sum of the impedance of a first of the two dynamic magnetic flux circuits and a second of the two dynamic magnetic flux circuits.

Briefly, it is noted that when no current is running in the coils, the respective static fluxes in the air gaps generates equal forces in the two top airgaps 1722T and two bottom airgaps 1722B. The mechanical spring 1756 is stronger than the magnetic forces, keeping the airgaps in a stable equilibrium. This is the equilibrium in FIGS. 17A-D and FIGS. 13-16 (again, where the activation of the coils is at the inception with respect to the former figures, so there is no movement-movement is about to begin in these figures). With respect to FIG. 17A, when current is running in positive direction, the dynamic fluxes from all coils are directed in the same direction as the upper static flux. The total flux in the upper airgaps is increased and the magnetic force is increased causing the upper airgaps to decrease and the counter weights to move upwards (major direction). In FIG. 17B, when current is running in positive direction the dynamic fluxes from all the coils are directed in the opposite direction as the lower static flux. The total flux in the lower airgaps is decreased and the magnetic force is decreased causing the lower airgaps to increase and the counter weights to move upwards. In FIG. 17C, when current is running in positive direction the coils 1753-5, 6, 7 and 8 create a flux in the same direction as the upper static flux and in the opposite direction as the lower static flux. In FIG. 17D, when current is running in positive direction the coils 1753-1, 2, 3 and 4 create a flux in the same direction as the upper static flux and in the opposite direction as the lower static flux. When current is running in negative direction (e.g., arrow 2121 reverses direction) in all the coils the just describe situation is reversed ultimately resulting in the counter weights moving downwards (major direction).

It is briefly noted that in an exemplary embodiment, a first of the two dynamic flux circuits is tuned for a higher frequency response (here, in an exemplary embodiment, the circuit established by coils 1753-1, 2, 3 and 4) than a second of the plurality of dynamic flux circuits (here, in an exemplary embodiment, the circuit established by coils 1753-5, 6, 7 and 8), the frequency response of the first of the two dynamic flux circuits being about X times that of the second of the two dynamic flux circuits, where X can be 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 or more or any value or range of values therebetween in about 0.05 increments. Additional details of this will be described below.

In an exemplary embodiment, there is a hearing prosthesis, comprising an electromagnetic actuator, such as an actuator corresponding to the transducer of FIGS. 13A-21 above, and a sound capture apparatus, wherein the sound capture apparatus is configured to transduce sounds in at least a first range of 300 Hz to 4000 Hz. In this embodiment, relative to the first range, the actuator is optimized for performance at, relative to the first range, both a low frequency and a high frequency. This as compared to, for example, the transducers of FIGS. 5 to 12 above which are optimized to only one frequency. In this exemplary embodiment, the sound capture apparatus outputs an electrical signal, and the prosthesis is configured to actuate the actuator based on the electrical signal. This can be directly, or indirectly—there could be an amplifier in between the microphone and the actuator, there could be a sound processor. In this embodiment, the prosthesis is configured such that a first of two dynamic flux circuits and a second of two dynamic flux circuits are arranged, relative to the output of the electrical signal, in parallel. Again, this is relative, and thus even if there is an amplifier or a sound processor in between, the flux circuits are relative to that ultimate signal. In this exemplary embodiment, the two dynamic magnetic flux circuits interact with a same static magnetic flux circuit to actuate the actuator. Also, consistent with the above-noted optimization, in some embodiments, the prosthesis is configured such that a first of two dynamic flux circuits and a second of two dynamic flux circuits are tuned to different frequencies, so as to optimize the performance at both the low frequency and the high frequency. In an exemplary embodiment, the frequencies tuned are, respectively, within a first range of 500 to 800 Hz and within a second range of 800 to 2000 Hz. In an exemplary embodiment, the range is A to B and B to C, wherein A is any value between 100 Hz and 1000 Hz in 1 Hz increments, B is any value between 500 Hz and 1500 Hz in 1 Hz increments, and C is any value between 700 Hz to 3000 Hz in 1 Hz increments.

Tuning can be achieved by having different numbers of turns of the coils. In this regard, in an exemplary embodiment, there is a transducer including a plurality of dynamic flux circuits (e.g., that of flux 1782 and flux 1783). In this embodiment, a first of the plurality of dynamic flux circuits is established by one or more coils collectively having a first total number of coil turns. For example, coils 1753-5, 6, 7 and 8, which establish flux 1783, can have Y number of turns in total (i.e., add up all the turns of each separate coil, and the total number of turns is Y). Further, a second of the plurality of dynamic flux circuits is established by other one or more coils collectively having a second total number of coil turns. For example, coils 1753-1, 2, 3, and 4, which establish flux 1782, can have Z number of turns. In this embodiment, the first total number of coil turns is less than the second total number of coils (i.e., Y<Z). This can enable, for example, the first of the plurality of dynamic flux circuits to be tuned for a higher frequency response than the second of the plurality of dynamic flux circuits (all other things being equal (e.g., coil wire diameter, coil wire composition, yoke makeup, etc.). In an exemplary embodiment of this exemplary embodiment, the first of the plurality of dynamic flux circuits is tuned to a high frequency response (e.g., that of flux 1783), and the second of the plurality of dynamic flux circuits (e.g., that of flux 1782) is tuned to a low frequency response. In some embodiments, this is achieved by having a different number of turns for the coils collectively. That said, in some alternate embodiments, this is achieved by having the turns of the coil(s) of the first of the plurality of dynamic flux circuits being thicker than the turns of the coil(s) of the second of the plurality of dynamic flux circuits (again, all other things being equal).

In some embodiments, both the number of turns and the thickness of the turns can be different, to further maximize the effects of tuning.

It is noted that in at least some exemplary embodiments, there is utilitarian value with respect to obtaining a low residence peak of the transducer so as to avoid distortion. In an exemplary embodiment, high output at high frequencies can be utilitarian (however, it is less utilitarian if the frequencies are very high). In this regard, there is utilitarian value with respect to having a resonance frequency between 600 to 900 Hz.

With the teachings detailed herein, it is possible to obtain a transducer that has a residence peak that is smooth by tuning the separate dynamic magnetic fluxes to different frequencies. According to at least some embodiments, as noted above, to tune the dynamic magnetic flux for low frequencies, a relatively thicker wire and a relatively high number of coil turns are utilized (the relative being to those of the dynamic magnetic flux for the higher frequencies). To tune the dynamic magnetic flux for high frequencies, a relatively thinner wire in a relatively low number of coil turns are utilized (the relative being to those of the dynamic magnetic flux for the lower frequencies. It is noted that for low frequencies, the impedance in the wires that make up the coils is lower than that of the coils that make up the higher frequencies. Indeed, in at least some instances, for the higher frequencies, many coil turns is not as utilitarian as fewer coil turns. This can be because, in at least some instances, impedance increases dramatically (relative to having fewer turns and/or thinner wire, all other things being equal), and the output goes down. However, in at least some exemplary embodiments, there is still utilitarian value with respect to having a large current going through the coils. Accordingly, by making the respective paths of the dynamic magnetic fluxes separate, the components that generate fluxes can be different so as to achieve the tuning for different frequencies.

In an exemplary embodiment, for the low frequency side, in an exemplary embodiment, the wire has a diameter of 600 to 100 μm and the number of coil turns can be about 100 to 300 or any value or range of values therebetween in increments of 1 (e.g., about 125, about 200, about 222, etc.). Still further, in an exemplary embodiment, for the high frequency side, the wire has a diameter of about 40 to 60 μm, and the number of turns is between about 30 to about 150 or any value or range of values therebetween in 1 increments (e.g., about 50, about 75, about 100, etc.).

Figure 22:
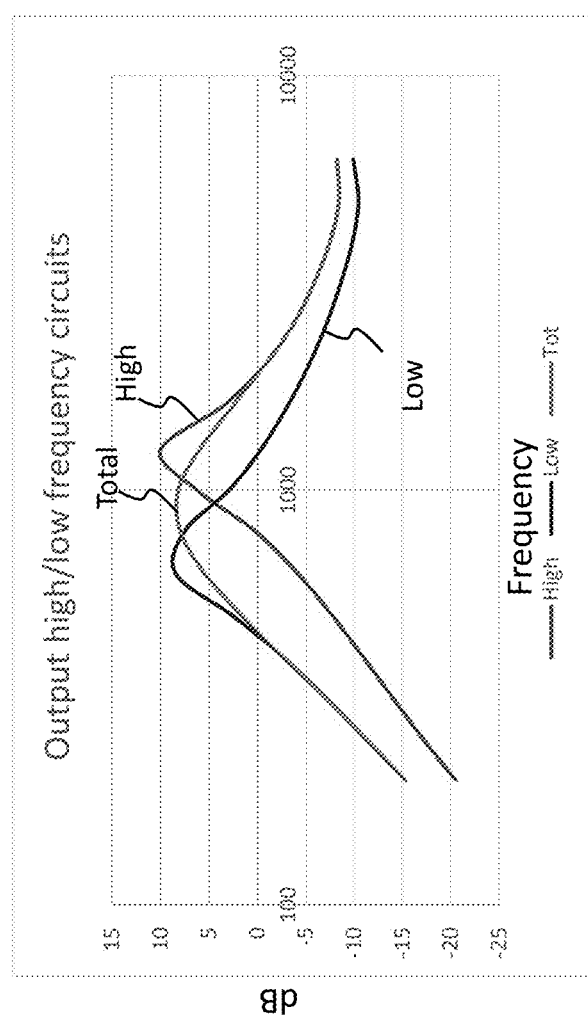
FIG. 22 presents some exemplary conceptual performance data according to an exemplary embodiment.

FIG. 22 presents a conceptual result of the outputs of the transducer according to an exemplary embodiment (1 Newton per volt of a battery connected to the actuator to power the actuator) where the two dynamic paths are separated from each other and optimized (or at least tuned) for different frequencies, one for high frequencies and one for lower frequencies. Here, both circuits work for all frequencies of input (e.g., from the microphone). The total power generated by the transducer is the sum of the power from the high frequency circuit and the low frequency circuit, as presented by way of concept only and not by way of limitation in FIG. 22.

In view of the above, it can be seen that the some embodiments increase/multiply the static force effect of the magnetic field by increasing the static flux.

It is noted that impedance increases faster as frequency increases. In this regard, the impedance in a wire can increase at a rate of about the square of the frequency increase. In an exemplary embodiment, one battery having a 1 V output, where current is proportional the force, and thus the force is proportional to current, It is briefly noted that in an exemplary embodiment, there is an electromagnetic transducer, comprising a plurality of dynamic flux circuits, wherein a first of the plurality of dynamic flux circuits is established by one or more coils collectively having a first total number of coil turns, a second of the plurality of dynamic flux circuits is established by other one or more coils collectively having a second total number of coil turns, and the first total number of coil turns is less than the second total number of coils. In this exemplary embodiment, consistent with the teachings above, the electromagnetic transducer include a seismic mass that moves relative to a fixation component of the transducer configured to fix the transducer to a body, the coils of the dynamic flux circuits are part of the seismic mass, and the electrometric transducer includes at least one static flux circuit generated by permanent magnets, wherein the permanent magnets are part of the seismic mass. Also in an exemplary embodiment of this embodiment, the aforementioned electromagnetic transducer is such that the seismic mass is supported by a spring that is connected to one or more components that are rigidly coupled to the fixation component, the spring dividing the first of the plurality of dynamic flux circuits and dividing the second of the plurality of dynamic flux circuits. Also, as can be seen from the above, in an exemplary embodiment, the spring divides the first of the plurality of dynamic flux circuits and divides the second of the plurality of dynamic flux circuits and the spring divides a first static magnetic flux circuit from a second static magnetic flux circuit.

In an exemplary embodiment, there is an electromagnetic transducer comprising at least one active air gap, wherein the active air gap is a non-axial air gap. The axial direction is the direction of the major direction of movement of the counterweight assembly (as opposed to the minor direction), and thus parallel to the longitudinal axis 1748 of the transducer. The axial direction is the direction that force is imparted from the transducer to the body to which the transducer is attached. In this regard, the minor direction of movement of the counter mass (the direction normal to the longitudinal axis 1798), at least in the embodiments of FIGS. 13A-17E, counteract each other and thus there is no force or otherwise substantially little force that is imparted from the transducer to the body to which the transducer is attached.

Figure 23:
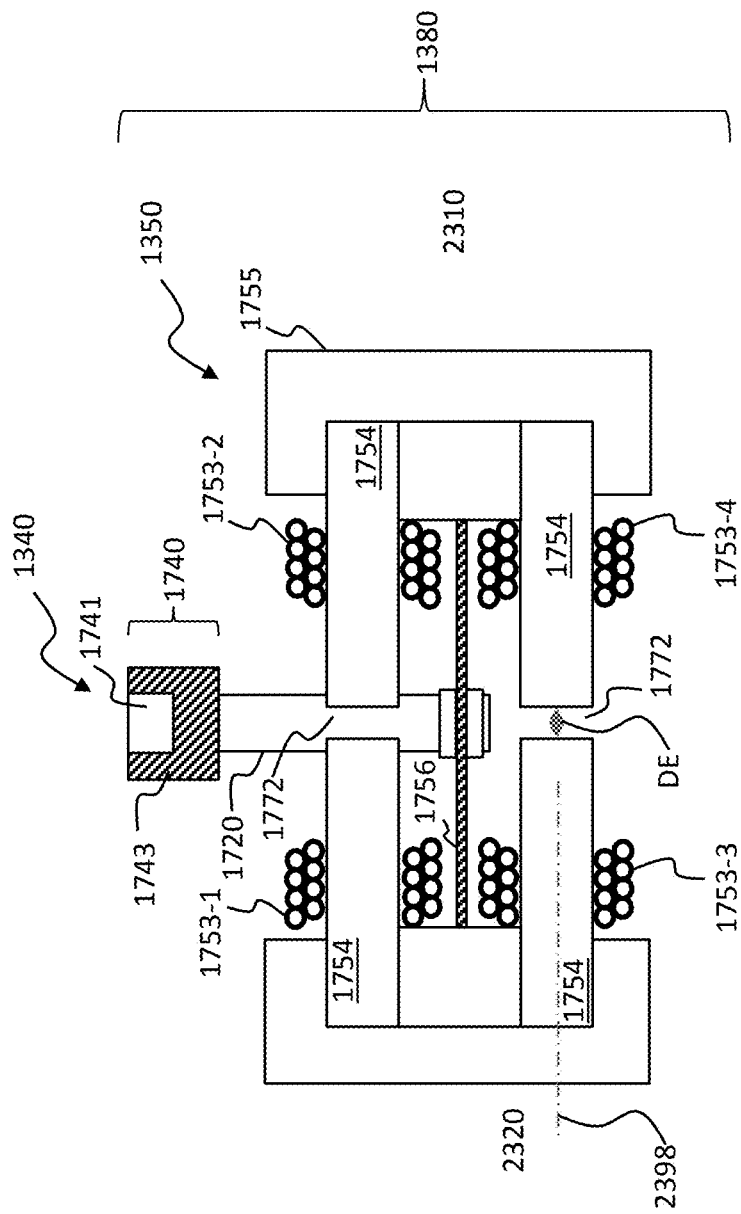
FIGS. 23, 24 and 25 depict dimensional details according to the embodiment of FIG. 13A.

An active air gap is an air gap that takes up the movement (at least the major direction of movement) of the components during transduction/expands and contracts during movement of the components (as opposed to, for example, air gaps 572A and 572B, which do not take up movement/do not expand or contract, but instead the surfaces establishing the air gaps thereof for the most part only move parallel to each other, and also as opposed to air gaps that have surface that do not move relative to one another). As seen in FIG. 23, the electromagnetic transducer includes a coil configured to generate a dynamic magnetic field (any of coils 1753), the coil having a longitudinal axis 2398 (the representative axis of representative coil 1753-3), wherein the active air gap extends in the direction of the longitudinal axis of the coil (FIG. 23 depicts the direction of extension DE, which is the direction of extension of the air gap 1722, as opposed to the direction of extension of the surfaces of the air gap). Consistent with the embodiment of FIG. 23, the active air gap is established by a first surface and a second surface (e.g., 1722SL, and the opposite surface), wherein the first surface and/or the second surface tilt relative to one another upon transduction. Put another way, the active air gap is the air gap that is sized and dimensioned to enable relative movement of the components of the transducer to output the force into the body to which the transducer is attached, as opposed to air gaps that are simply present so as to close the magnetic field.

In an exemplary embodiment of the aforementioned transducer, the transducer includes a static component (e.g., element 1740, connecting rod 1720, etc.), the transducer being configured to transduce energy such that the static component remains static during transduction, and the active air gap is established by a first surface and a second surface (e.g., 1722SL and the opposite surface) that both move relative to the static component during transduction. In this regard, the electromagnetic transducer can include a coupling configured to couple the transducer to an object (e.g., an abutment, a bone fixture in the case of an active transcutaneous bone conduction device, etc.), wherein the active air gap is established by a first surface and a second surface that both move relative to the coupling during transduction.

As detailed above, the seismic mass assembly is bifurcated (although in some embodiments, it can be trifurcated, quadfurcated, etc.), and thus there is a first counter mass (e.g., the mass on the left of FIG. 23) and a second counter mass (e.g., the mass of the right of FIG. 23), and the first counter mass and the second counter mass tilt relative to a longitudinal axis 1498 of the electromagnetic transducer in a symmetrical manner about the longitudinal axis upon transduction. Corollary to this is that the counter mass rocks relative to the longitudinal axis of the electromagnetic transducer upon transduction. Also, in some embodiments, the transducer is configured to move the seismic mass in a major direction of movement upon transduction, the major direction of movement being normal to a major direction of expansion and contraction of the air gap during transduction.

As can be seen, in some exemplary embodiments, the electromagnetic transducer is a transducer where all air gaps have components that move relative to one another and relative to a static component of the transducer.

Figure 24:
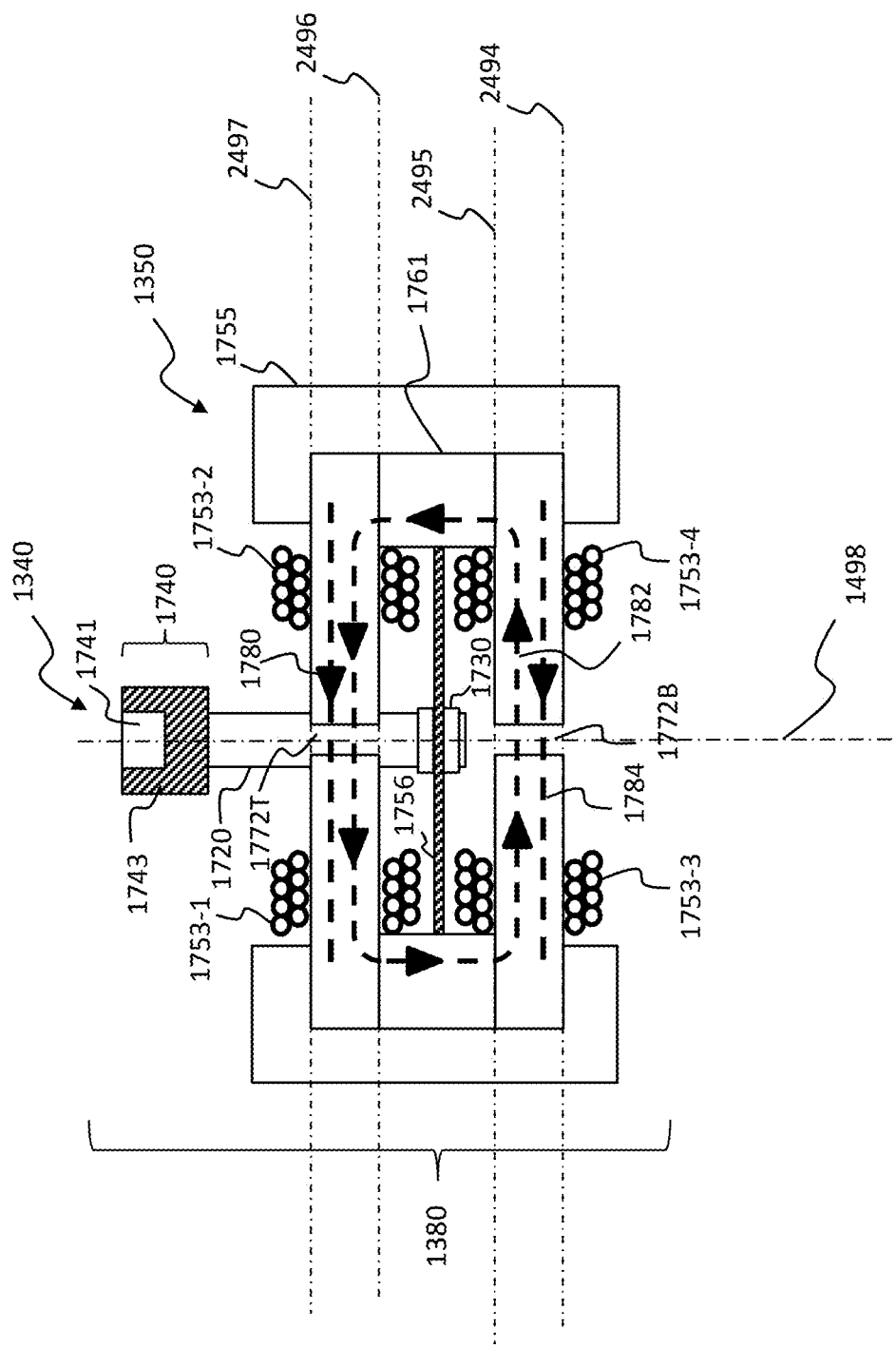

Also as seen above, there is an electromagnetic transducer, comprising at least one dynamic magnetic flux circuit and a seismic mass assembly, wherein both sides of an air gap crossed by the dynamic magnetic flux are established by the seismic mass assembly. This is different than, for example, the air gaps of the embodiment of FIG. 5 above, where one side of the air gap is established by a static component (i.e., the component that does not move relative to the body to which the transducer is attached) and another side of the air gap is established by the dynamic component. Further, in an exemplary embodiment, the electromagnetic transducer also includes at least one static magnetic flux circuit, wherein with respect to location along the longitudinal axis of the transducer, one of the static magnetic flux circuit or the dynamic magnetic flux circuit is at least substantially entirely within the area taken up by the air gap, and with respect to location along the longitudinal axis of the transducer, the other of the static magnetic flux circuit or the dynamic magnetic flux circuit is mostly outside the area taken up by the air gap. FIG. 24 schematically illustrates this, feature, where planes 2497 and 2496, represented by lines in FIG. 24, extend into and out of the page, and are normal to longitudinal axis 1498. As can be seen, all of flux circuit 1780 is between planes 2497 and 2496, and these planes are located at the topmost portion and the bottom most portion of the surfaces that establish the air gap 1722T. This is also the case with respect to flux circuit 1784, as can be seen with respect to planes 2495 and 2494 vis-à-vis airgap 1772B.

While the just described embodiment concentrates on the static magnetic flux, it is noted that in some alternate embodiments, it is the dynamic magnetic fluxes that travels in a circuit that is perpendicular to the longitudinal axis 2498, and the static magnetic fluxes that travel in a circuit that is parallel to the longitudinal axis 2498. Thus, in at least some exemplary embodiments, it is the dynamic magnetic fluxes that are located between the planes 2497 and 2496, etc., and thus are the fluxes that are located, with respect to location along the longitudinal axis of the transducer at least substantially entirely within the area taken up by the airgap.

In at least some embodiments, the transducer includes at least four air gaps established by the seismic mass assembly, a first of the at least one dynamic magnetic flux circuits is closed by a first and second of the four air gaps, a second of the at least one dynamic magnetic flux circuits is closed by a third and fourth of the four air gaps, the first of the at least one dynamic magnetic flux circuits does not cross the third and does not cross the fourth of the four air gaps, and the second of the at least one dynamic magnetic flux circuits does not cross the first and does not cross the second of the four air gaps.

Corollary to this is that a similar arrangement is also the case for the static magnetic flux circuits. In this regard, where the transducer includes at least two static magnetic flux circuits; a first of the at least two static magnetic flux circuits crosses the first and the third of the four air gaps, a second of the at least two static magnetic flux circuits crosses the second and the fourth of the four air gaps, the first of the at least two static magnetic flux circuits does not cross the second of the four air gaps and does not cross the fourth of the four air gaps, and the second of the at least two static magnetic flux circuits does not cross the first of the four air gaps and does not cross the fourth of the four air gaps. Again, concomitant with the fact that the static magnetic fluxes and the dynamic magnetic fluxes can be arranged on different plane than that disclosed in FIGS. 17A-17D (e.g., in some embodiments, the static magnetic fluxes will travel in a circuit parallel to the longitudinal axis 1498, and the dynamic magnetic fluxes will travel in a circuit that is perpendicular to the longitudinal axis 1498), the aforementioned first, second, third, and fourth air gaps are not limited to those specifically described in the figures.

Also consistent with the teachings detailed above, the at least one dynamic magnetic flux circuit extends along a closed path consisting of one or more air gaps and solid material, and all of the solid material making up the closed path moves during transduction of the electromagnetic transducer.

Again, emphasis has been placed on a balanced electromagnetic transducer. As briefly noted above and as will be described in greater detail below, the teachings detailed herein are also applicable, with some modification, to an un-balanced transducer. That said, still with respect to embodiments where the electromagnetic transducer is a balance transducer, the at least one dynamic magnetic flux circuit can extend through only two air gaps cant relative to one another during transduction (as seen in FIGS. 19 and 20). Alternatively, in some exemplary embodiments, the electromagnetic transducer is an unbalanced transducer, and the at least one dynamic magnetic flux circuit extends through only one air gap and respective surfaces of the air gap cant relative to one another during transduction. Additional details of the unbalanced feature will be described below.

As can be seen, in some exemplary embodiments, the electromagnetic transducer is a balanced transducer that includes at least one coil configured to generate the at least one dynamic magnetic flux. The at least one dynamic magnetic flux circuit extends through the air gap, and the dynamic magnetic flux travels through the air gap when the at least one coil is energized in the same direction as a direction of travel of the at least one dynamic magnetic flux at a location of the at least one coil. Also, in at least some embodiments, at least a first coil and a second coil are configured to generate the at least one dynamic magnetic flux, and the first coil drives the dynamic magnetic flux in a first direction and the second coil drives the dynamic magnetic flux in a second direction opposite the first direction. By way of example only and not by way of limitation, such first and second coils can correspond to coils 1753-1 and 1753-3, or coils 1753-2 and 1753-4, etc. In this regard, in an exemplary embodiment, it can be seen that at least some exemplary embodiments have a dynamic magnetic flux circuit that has coils that have longitudinal axes that are parallel to one another but, when the coils are energized, drive the dynamic magnetic flux in opposite directions. It is further noted that in at least some exemplary embodiments, the coils of the dynamic magnetic flux circuit can have longitudinal axes that are normal to one another and/or otherwise angled at angles different than zero and ninety degrees, and thus the coils, when energized, drive the dynamic magnetic flux interactions that are angled relative to one another.

It is also noted that in at least some exemplary embodiments, as can be seen, the permanent magnets are arranged such that the magnets drive the static magnetic flux traveling in a circuit in opposite directions or otherwise in directions that are angled relative to one another at angles other than zero or 90 degrees.

Considering further, it can be seen that in at least some exemplary embodiments, the electromagnetic transducer includes at least a first coil and a second coil configured to generate the at least one dynamic magnetic flux, wherein the first coil and the second coil drive the dynamic magnetic flux in the same direction, and a longitudinal axis of the first coil and a longitudinal axis of the second coil tilt relative to one another during transduction. This is seen in FIG. 20, where axis 2001 of coil 1753-1 and axis 2002 of coil 1753-4 are depicted as angled (other than zero) relative to one another, where when the transducer is in the at rest/neutral position, those axes would be parallel to one another. This is also the case with respect to coils 1753-1 and 1753-2, etc., in the embodiments depicted in the figures.

Figure 25:
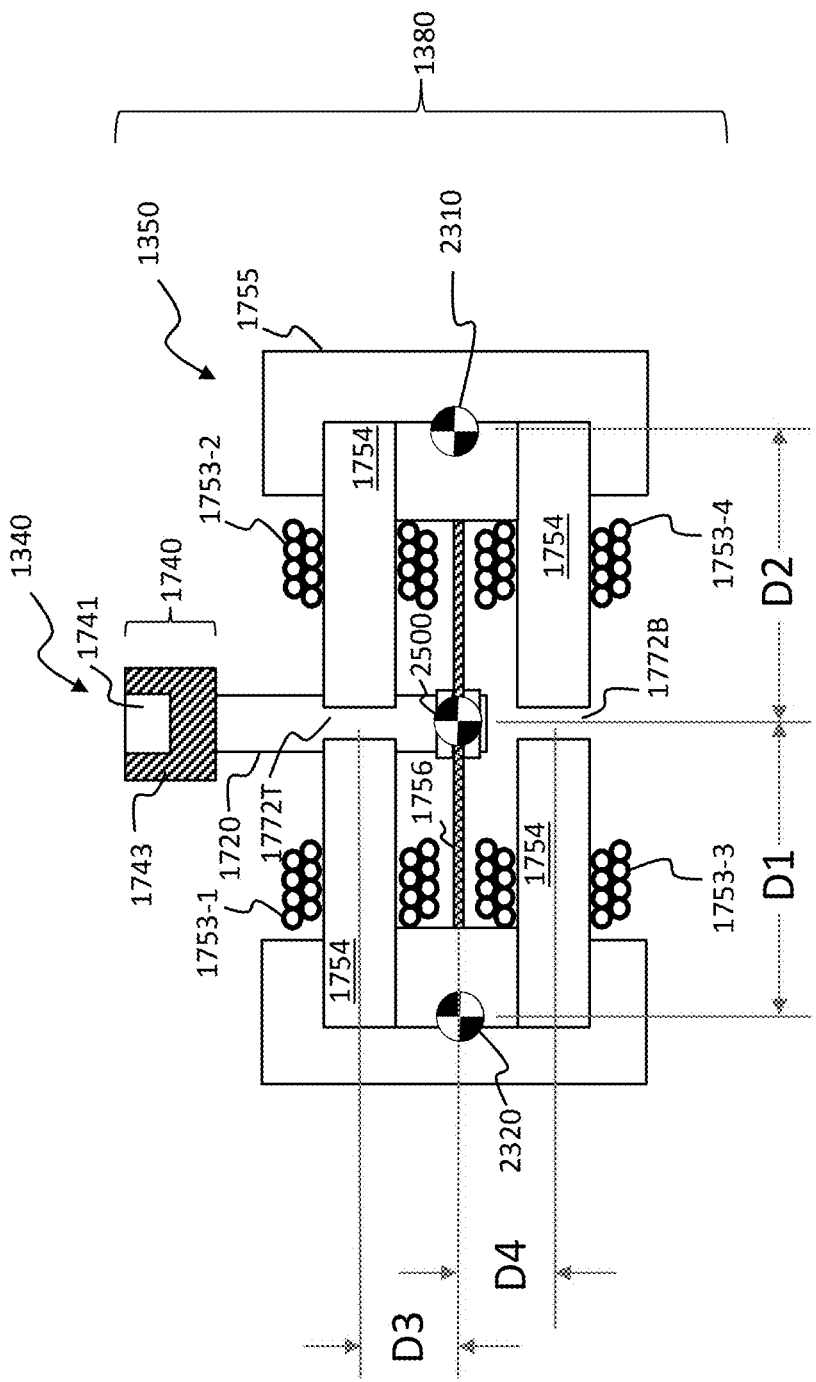

FIG. 25 duplicates in part FIG. 17D, and depicts thereon the centers of gravity 2320 of the left seismic mass and 2310 of the right seismic mass, respectively. Also shown is the center of rotation 2500 about which the left and right seismic masses rotate during transduction. As can be seen, in this embodiment, with respect to the frame of reference of FIG. 25 (the plane upon which the schematic of FIG. 25 is presented), the centers of gravity 2320 and 2310 are equidistant from the center of rotation 2500, by a distance D1 and D2 in the horizontal direction (the X axis), where D1 is equal to D2. However, in some embodiments, D1 can be different than D2. In an exemplary embodiment, D1 and/or D2 is about 0.1, 0.2, 0.3, 0.4, 0.5, 0.75, 1.0, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.5, 9, 9.5, 10, 10.5, 11, 11.5, 12, 12.5, 13, 13.5, 14, 14.5, 15, 15.5, 16, 16.5, 17, 18, 19, 20, 21, 22, 23, 24, 25, 26, 27, 28, 29, 30, 31, 32, 33, 34, 35, 36, 37, 38, 39, 40, 42, 44, 46, 48, 50, 55, 60, 65, or 70 mm or more or any value or range of values therebetween in 0.01 mm increments.

Also as can be seen, the geometric center of the air gap 1722T and the geometric center of the air gap 1722B are distances D3 and D4, respectively, from the center of rotation 2500.

In an exemplary embodiment, the distance D3 and D4 are equal to each other, while in other embodiments, D3 can be different than D4. In an exemplary embodiment, D3 and/or D4 is about 0.0.5, 0.075, 0.1, 0.15, 0.2, 0.25, 0.3, 0.4, 0.5, 0.75, 1.0, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.5, 9, 9.5, 10, 10.5, 11, 11.5, 12, 12.5, 13, 13.5, 14, 14.5, 15, 15.5, 16, 16.5, 17, 18, 19, 20, 21, 22, 23, 24, 25, 26, 27, 28, 29, 30, 31, 32, 33, 34, 35, 36, 37, 38, 39, 40, 42, 44, 46, 48, 50, 55, 60 mm, or more or any value or range of values therebetween in 0.01 mm increments.

It is noted that with respect to geometric centers the air gap, it is meant the location in space that exists equidistant from the geometric centers of the respective surfaces that establish the surfaces of the air gap. In an exemplary embodiment, this location is along a vector that extends from the geometric center of one surface to the geometric center of the other surface. In embodiments where the surfaces are identical to one another and coaxial to one another with respect to the direction of extension of the air gap, the vector is exactly normal to both surfaces. With respect to surfaces that are not identical to one another or otherwise not coaxial with one another, this vector will be at a non-90° angle relative to the surfaces of the air gap. It is also noted that in at least some exemplary embodiments, the distances D3 and D4 can be measured from the geometric centers of one or more surfaces of the air gaps as opposed to the geometric center of the air gap. This is because the distance that the air gap extends is relatively small in the greater scheme of things, and certainly relative to the distances D1 and D2.

In an exemplary embodiment, the arrangement of the centers of gravity of the seismic mass and geometric centers of the air gaps enable, in an exemplary embodiment, an electromagnetic transducer, comprising a seismic mass (either of the left or right seismic masses), and a dynamic magnetic field generator (e.g., any of the coils 1753 and the associated components that energize such). In an exemplary embodiment, the generated magnetic field crosses an air gap (any of air gaps 1722) that expands and contracts with movement of the seismic mass relative to a stationary component of the transducer (e.g., the connecting rod 1720). Here, the respective amounts of movement of the seismic mass, at the center of gravity thereof, relative to the stationary component in a first direction and a second direction opposite the first direction (e.g., directions parallel to the longitudinal axis of the transducer) relative to the non-energized state is more than the respective amounts of expansion and contraction of the air gap from a non-energized. It is noted that in the embodiments depicted in the figures, it is the entire seismic mass that moves the aforementioned distances, as opposed to a portion thereof.

More particularly, the aforementioned phenomenon regarding the respective amounts of movement can be achieved by making D1 and/or D2 greater than D3 and/or D4. That is, if D1 and/or D2 is greater than D3 and/or D4, the movement in the respective air gaps will be smaller than the movement of the seismic masses. That is, if the distance D3 and/or D4 is smaller than D1 and/or D2, for the same angular deflection of the spring 1756, the movement in the respective air gaps is smaller than the movement of the counter weights.

Accordingly, in an exemplary embodiment, there is an electromagnetic transducer where the amount of movement of the seismic mass relative to the stationary component in a respective first direction and a respective second direction relative to the non-energized state is respectively more than the respective amount of expansion and the respective amount of contraction of the air gap from a non-energized. The more is 5, 6, 7, 8, 9, 10, 11, 12, 13, 14, 15, 16, 17, 18, 19, 20, 25, 30, 35, 40, 45, 50, 60, 65, 70, 75, 80, 85, 90, 100, 110, 120, 130, 140, 150, 160, 170, 180, 190, 200, 225, 250, 275, 300, 325, 350, 375, 400, 450, 500, 550, 600, 650, 700, 750, 800, 850, 900, 950, 1000 percent or more, or any value or range of values therebetween in 0.1 percent increments. In an exemplary embodiment, the amount of movement of the seismic mass relative to the stationary component in a respective first direction and a respective second direction relative to the non-energized state is respectively substantially more than the respective amount of expansion and the respective amount of contraction of the air gap from a non-energized.

In an exemplary embodiment, consistent with the bifurcation of the seismic mass assembly into two seismic masses, the aforementioned seismic mass is a first seismic mass that is part of a seismic mass assembly including a second seismic mass, the first and second seismic masses having respective centers of gravity (e.g., CG 2320 and 2310). Further, the transducer is configured to move the first and second seismic mass relative to a center point (e.g., 2500) equidistant in at least one axis between the respective centers of gravity, the distance between the respective centers of gravity and the enter point being a first distance (D1 and D2, respectively), when the transducer is in a non-energized state. By "in at least one axis", it is meant that it is possible that the centers of gravity could be nonaligned with respect to the longitudinal axis 1498, but still be the same distance from the center point 2500 in, for example, the X axis/horizontal axis.

Further, in this exemplary embodiment, the air gap has a geometric center when the transducer is in the non-energized state, the geometric center being a second distance from the center point (e.g., D3 or D4), and the first distance is more than the second distance, and the more can correspond to the aforementioned more just detailed.

Again, as is consistent with the embodiments, the electromagnetic transducer is such that the first seismic mass and the second seismic mass are supported via a spring apparatus (e.g., spring 1756). As can be seen, in some embodiments, the spring apparatus is centered about the center point in at least one axis. The transducer is configured to rotate the first seismic mass and the second seismic mass about the center point during transduction, and, in some embodiments, this rotation is symmetrical about a plane parallel to the longitudinal axis, such as a plane that is normal to the plane on which FIG. 25 is presented, which plane extends through the longitudinal axis 1498. In at least some exemplary embodiments, again, where the seismic mass is a first seismic mass that is part of a seismic mass assembly including a second seismic mass, the transducer is configured to flap the first seismic mass and the second seismic mass during transduction. Again, in an exemplary embodiment, the first seismic mass and the second seismic mass flap in unison in a manner analogous to the wings of a bird flapping.

Also, in at least some embodiments, the at least one static magnetic flux circuit extending along a closed path consisting of one or more air gaps and solid material (i.e., nothing else makes up the path), and all of the solid material making up the closed path moves during transduction of the electromagnetic transducer.

In the embodiments of FIGS. 5-12, at least one air gap is oriented in a way that the amplitude of the air gap movement is essentially the same as the amplitude of the counterweight movement. The counter weight movement defines the force/motion that the actuator transfers. The transferred force can be calculated by Newton's second law: $F=m \times a$ ($F$=Force [N], $m$=mass (of counter weight) [kg], $a$-acceleration (of counter weight) [m/s$^2$]). In order to get a stable equilibrium, the mechanical spring stiffness is typically larger than the magnetic force stiffness acting in the air gap (in all positions). However, as seen in the embodiment of FIGS. 13A-16, the mechanical spring(s), counterweights and air gaps are arranged in a way that the amplitude of the movement (and thereby the acceleration) of the counter weight is larger, and in some instances, significantly larger, than the amplitude of the movement (and thereby the acceleration) in the air gap. In at least some exemplary embodiments, this enables the generated force (which typically has a vector parallel to and coaxial with the longitudinal axis 1498) to be higher for the same counterweight mass, alternatively the counter weight mass can be lower at the same force output. (Lower counterweight mass can be achieved by choosing lower density material that is less expensive or making it smaller.)

Thus, in some embodiments, there is an electromagnetic actuator, wherein the transducer is an actuator that includes an air gap, such as an active air gap. The sides of the air gap move in a direction having a major component non-parallel to a major direction of force output of the transducer. By way of example, in the embodiments where the direction of force output is parallel to the longitudinal axis 1498, and thus the major direction of force output is parallel to the longitudinal axis 1498, the sides of the air gap have a major component of movement that is normal to the longitudinal axis 1498, and thus not parallel to the longitudinal axis 1498. Granted, in at least some exemplary embodiments, the sides can have a direction of movement that is parallel to the longitudinal axis 1498, and thus parallel to the direction of force output. However, as noted above, this direction of movement is not a major component of movement, but instead a minor component of movement. Accordingly, even if such minor component of movement is the case, this is still encompassed by the embodiment where the major direction of movement is not parallel to the major direction of force output. Also, in an exemplary embodiment, the amount of force output by the actuator is greater relative to the same mass of seismic mass and the same forces created by the static and dynamic magnetic fluxes than that which would be the case if the sides of the air gap moved in a direction having a major component parallel to the major direction of force output of the transducer. That is, by way of example only and not by way of limitation, if the embodiment of FIG. 5 or, say FIG. 6A, were constructed such that the mass of the seismic mass the same as the embodiment of FIGS. 13A-17D, for example, and the amount of static magnetic flux and dynamic magnetic flux generated for actuation was the exact same amount, the force output of the embodiment of FIGS. 13A-17D would be greater than the force output for the aforementioned prior embodiments, again all other things being equal (e.g., the amount of power consumption, etc.).

Indeed, with respect to power consumption, again, in a scenario where the transducer is an actuator, and the actuator is powered by a battery (e.g., a battery of a BTE device, a battery of a removable component of a percutaneous bone conduction device, a battery that is implanted, a battery that is outside the recipient but via the use of an inductance field extending through skin of the recipient, the actuator is implanted and powered by the external battery, etc.). Again, the sides of the air gap move in a direction having a major component non-parallel to a major direction of force output of the transducer. Here, the amount of force output by the actuator is greater relative to the same mass of seismic mass and the same battery power consumption than that which would be the case if the sides of the air gap moved in a direction having a major component parallel to the major direction of force output of the transducer, all other things being equal.

In an exemplary embodiment, the amount of force output is 5, 6, 7, 8, 9, 10, 11, 12, 13, 14, 15, 16, 17, 18, 19, 20, 25, 30, 35, 40, 45, 50, 60, 65, 70, 75, 80, 85, 90, 100, 110, 120, 130, 140, 150, 160, 170, 180, 190, 200, 225, 250, 275, 300, 325, 350, 375, 400, 450, 500, 550, 600, 650, 700, 750, 800, 850, 900, 950, 1000 percent or more, or any value or range of values therebetween in 0.1 percent increments more than that which would be the case (i) for an embodiment where the same mass of seismic mass and the same forces created by the static and dynamic magnetic fluxes if the sides of the air gap moved in a direction having a major component parallel to the major direction of force output of the transducer and/or (ii) for an embodiment where the same mass of seismic mass and the same battery power consumption if the sides of the air gap moved in a direction having a major component parallel to the major direction of force output of the transducer, all other things being equal.

Figure 26:
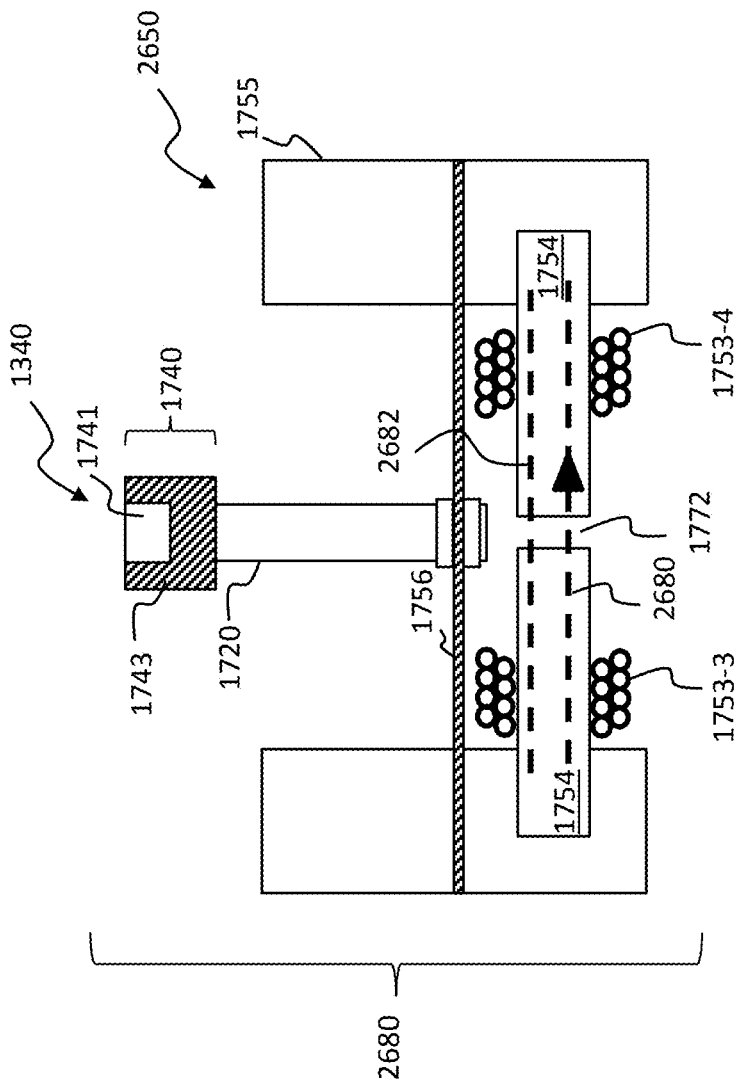
FIGS. 26-27 depict another exemplary embodiment.
Figure 27:
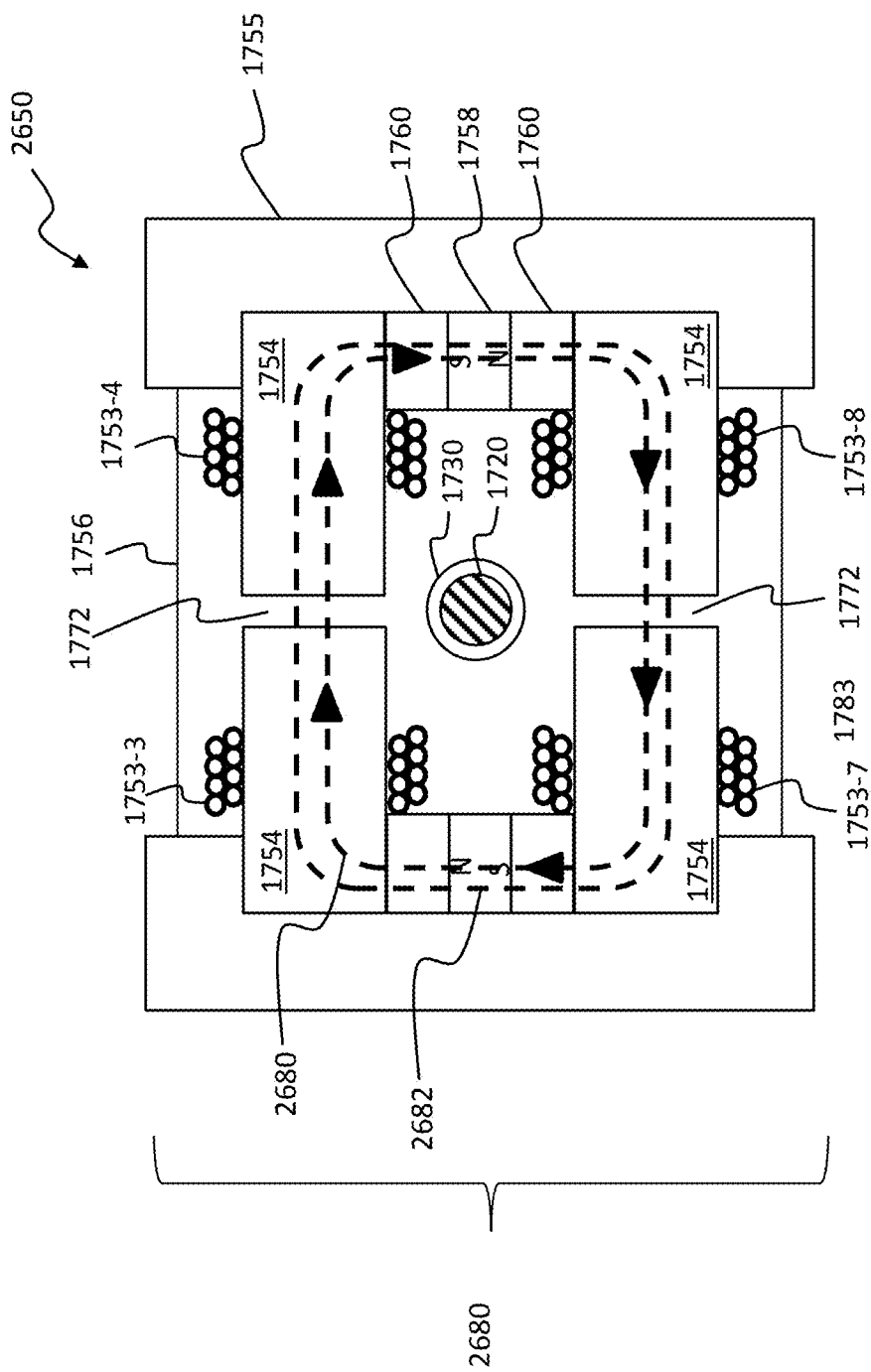

As noted above, the teachings detailed herein can be applied to unbalanced transducers as well. In this regard, FIGS. 26 and 27 depict an exemplary embodiment of an unbalanced transducer. FIG. 26 depicts a side view and FIG.

27 depicts a bottom view of the vibratory actuator-coupling assembly 2680, that includes vibratory electromagnetic actuator 2650, which can be used as the vibratory electromagnetic actuators in the embodiments of FIGS. 2, 3, and 4 detailed above, for example. Like reference numbers have been utilized in accordance with the teachings above, and thus will not be described in further detail. As can be seen, the top static magnetic flux has been removed or otherwise is not present, and the dynamic magnetic flux, of which there is only one in this embodiment, now flows in a plane normal to the longitudinal axis. More specifically, there is only one static magnetic flux 2680, and only one dynamic magnetic flux 2682. Both fluxes flow in the same plane, a plane normal to the longitudinal axis of the transducer. Dynamic flux 2682 is represented without arrows simply because this flux changes with the alternating current applied to the coils 1753-3, 1753-4, 1753-7, and 1753-8, which coils drive the dynamic magnetic flux in the same direction (clockwise or counterclockwise with respect to the frame of reference of FIG. 27) when energized according to a first clarity, and in the opposite direction when energized according to a second polarity. The static magnetic field created by the magnets generates a force in the air gaps 1722 that wants to close the air gap. Accordingly, there is utilitarian value with respect to having a mechanical spring that is stronger than the magnetic forces so that the airgap does not collapse completely. The coils create a dynamic magnetic field that either works together with the static field or against it resulting in the total magnetic force varying, causing the counterweights to move in a flapping manner (relative to the frame of reference of FIG. 26). As with the embodiment of FIGS. 13A-17E, if the distance from the center of rotation to the geometric center of the airgaps is less than the distance from the center of rotation to the center of gravities of the left and right countermasses, the features detailed above associated there with will also be present in at least some embodiments.

Figure 28:
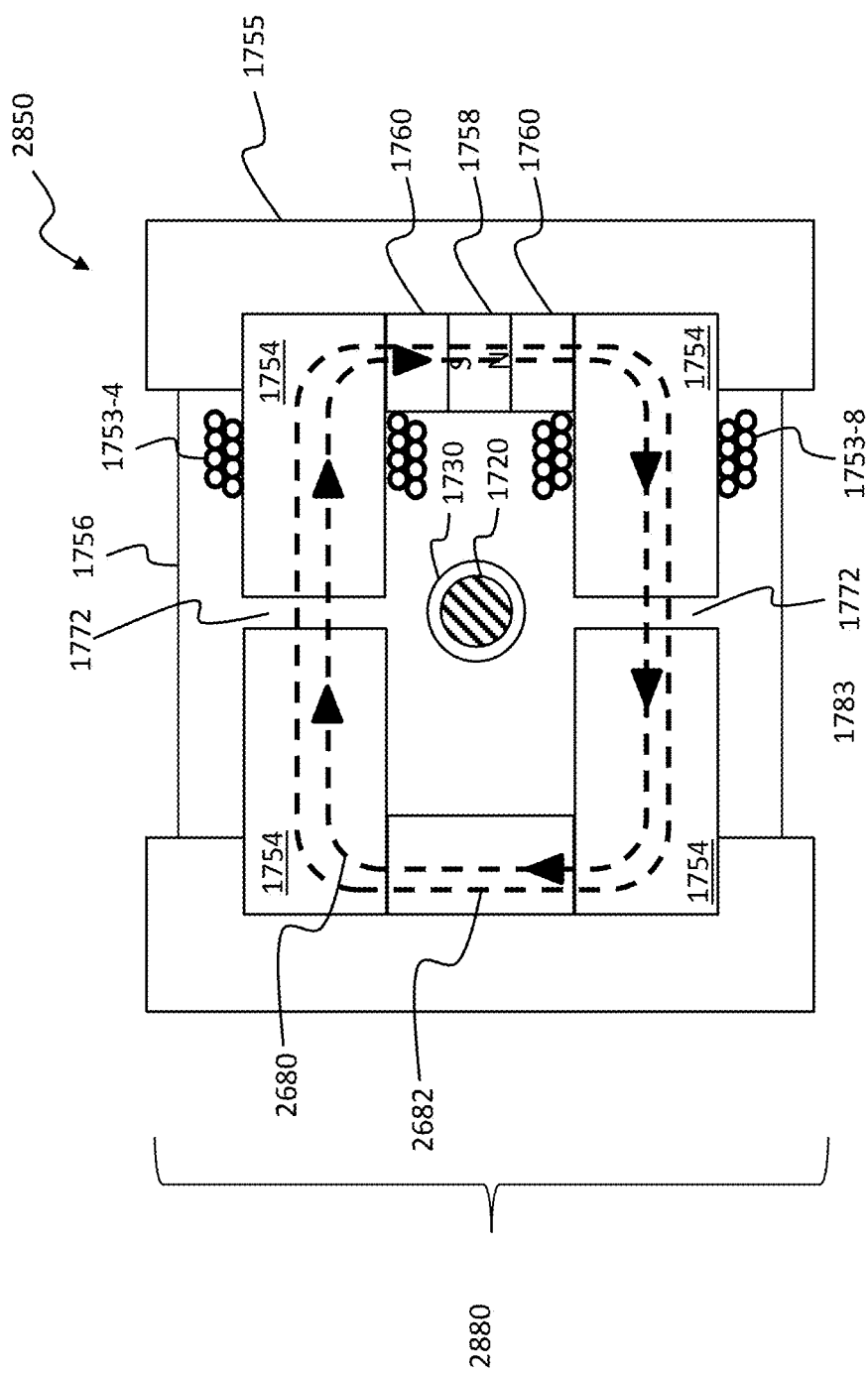
FIG. 28 depicts another exemplary embodiment.

As noted above, there are variations with respect to the placement and location and number of components and even the presence of some components with respect to various embodiments. In this regard, FIG. 28 depicts an exemplary vibratory actuator-coupling assembly 2880 that includes a vibratory electromagnetic actuator 2850 where the coils are only located only on one of the two seismic masses, and the magnet is located only on one of the two seismic masses. Instead, an extended yoke is located on the other seismic mass. In an exemplary embodiment, the arrangement is adjusted so as to balance the weight of the counterweights assembly on the left side counterweights assembly on the right side. That said, there can be utilitarian value of having counterweights that are not of the same weight.

It is noted that the concept associated with FIG. 28 vis-a-vis placement and location and number of components and even the presence of some components is also applicable to the embodiments detailed above of FIGS. 13A to 17E.

It is noted that any feature of any embodiment detailed herein can be present in any other embodiment detailed herein unless otherwise indicated or unless the art otherwise does not enable such. In this regard, by way of example only and not by way of limitation, one or more of the features of the embodiments of FIGS. 5 to 12 can be present in the embodiments of FIGS. 13A-28 (e.g. the use of soft magnetic material for the yokes, etc.). It is also noted that any method action detailed herein corresponds to a disclosure of a device and/or system of executing that method action. Also, any device and/or system detailed herein corresponds to a disclosure of a method of utilizing that device and/or system and/or a method of making that device and/or system. Also, any disclosure of any method action of making a device or a system herein corresponds to a disclosure of the resulting device made by that method action. Any disclosure of a method of using a device corresponds to a disclosure of a device having the functionality/configured for such use.

Recitations of "configured to" and "adapted to" correspond to a recitation of structure of achieving that functionality.

In an exemplary embodiment, there is an electromagnetic transducer, comprising a plurality of static magnetic flux paths; and a plurality of dynamic magnetic flux paths, wherein at least two of the plurality of static flux paths lie in respective first planes parallel and offset from one another, at least two of the plurality of dynamic flux paths lie in respective second planes parallel and offset from one another, and the first planes and the second planes are arrayed so as to establish at least a general tic-tac-toe lattice. In an exemplary embodiment of any embodiment described above and/or below, the respective first planes and respective second planes are symmetrical about a first reference plane parallel to and lying on a longitudinal axis of the transducer. In an exemplary embodiment of any embodiment described above and/or below, the transducer is an actuator in signal communication at least one of directly or indirectly with a sound capture apparatus; the sound capture apparatus is configured to transduce sounds in at least a first range of 300 Hz to 4000 Hz; and relative to the first range, the actuator is optimized for performance at, relative to the first range, both a low frequency and a high frequency.

In an exemplary embodiment, there is an electromagnetic transducer, comprising: a first static magnetic flux circuit generated by at least one permanent magnet; and a plurality of dynamic magnetic flux circuits, wherein at least two of the plurality of dynamic flux circuits interact with the static magnetic flux circuit to enable transduction.

In an exemplary embodiment, there is a hearing prosthesis, comprising: an electromagnetic actuator; and a sound capture apparatus, wherein the sound capture apparatus is configured to transduce sounds in at least a first range of 300 Hz to 4000 Hz, and relative to the first range, the actuator is optimized for performance at, relative to the first range, both a low frequency and a high frequency. In an exemplary embodiment of any embodiment described above and/or below, the sound capture apparatus outputs an electrical signal; the prosthesis is configured to actuate the actuator based on the electrical signal; and the prosthesis is configured such that a first of two dynamic flux circuits and a second of two dynamic flux circuits are arranged, relative to the output of the electrical signal, in parallel In an exemplary embodiment of any embodiment described above and/or below, the two dynamic magnetic flux circuits interact with a same static magnetic flux circuit to actuate the actuator. In an exemplary embodiment of any embodiment described above and/or below, the prosthesis is configured such that a first of two dynamic flux circuits and a second of two dynamic flux circuits are tuned to different frequencies, so as to optimize the performance at both the low frequency and the high frequency.

In an exemplary embodiment, there is an electromagnetic transducer, comprising a plurality of dynamic flux circuits, wherein a first of the plurality of dynamic flux circuits is established by one or more coils collectively having a first total number of coil turns, a second of the plurality of dynamic flux circuits is established by other one or more coils collectively having a second total number of coil turns, and the first total number of coil turns is less than the second total number of coils. In an exemplary embodiment of any embodiment described above and/or below, the electromagnetic transducer includes a seismic mass that moves relative to a fixation component of the transducer, the seismic mass being supported by a spring that is connected to one or more components that are rigidly coupled to the fixation component, the spring dividing the first of the plurality of dynamic flux circuits and dividing the second of the plurality of dynamic flux circuits. In an exemplary embodiment of any embodiment described above and/or below, the electromagnetic transducer includes a seismic mass that moves relative to fixation component of the transducer, the seismic mass being supported by a spring that is connected to one or more components that are rigidly coupled to the fixation component; the electromagnetic transducer includes a plurality of static magnetic flux circuits; the spring divides the first of the plurality of dynamic flux circuits and divides the second of the plurality of dynamic flux circuits; and the spring divides a first static magnetic flux circuit from a second static magnetic flux circuit.

In an exemplary embodiment, there is an electromagnetic transducer, comprising: at least one dynamic magnetic flux circuit; and a seismic mass assembly, wherein both sides of an air gap crossed by the dynamic magnetic flux are established by the seismic mass assembly. In an exemplary embodiment of any embodiment described above and/or below, the transducer includes at least four air gaps established by the seismic mass assembly; a first of the at least one dynamic magnetic flux circuits is closed by a first and second of the four air gaps; a second of the at least one dynamic magnetic flux circuits is closed by a third and fourth of the four air gaps; the first of the at least one dynamic magnetic flux circuits does not cross the third of the four air gaps and does not cross the fourth of the four air gaps; and the second of the at least one dynamic magnetic flux circuits does not cross the first of the four air gaps and does not cross the second of the four air gaps. In an exemplary embodiment of any embodiment described above and/or below, the transducer includes at least two static magnetic flux circuits; a first of the at least two static magnetic flux circuits crosses the first and the third of the four air gaps; a second of the at least two static magnetic flux circuits crosses the second and the fourth of the four air gaps; the first of the at least two static magnetic flux circuits does not cross the second of the four air gaps and does not cross the fourth of the four air gaps; and the second of the at least two static magnetic flux circuits does not cross the first of the four air gaps and does not cross the fourth of the four air gaps. In an exemplary embodiment of any embodiment described above and/or below, the electromagnetic transducer further comprises at least one coil configured to generate at least one dynamic magnetic flux that travels in the at least one dynamic magnetic flux circuit, wherein the at least one dynamic magnetic flux circuit extends through the air gap, the dynamic magnetic flux travels through the air gap, when the at least one coil is energized, in the same direction as a direction of travel of the at least one dynamic magnetic flux at a location of the at least one coil, and the electromagnetic transducer is a balanced transducer. In an exemplary embodiment of any embodiment described above and/or below, the electromagnetic transducer further comprises at least a first coil and a second coil configured to generate at least one dynamic magnetic flux that travels in the at least one dynamic magnetic flux circuit, wherein the first coil drives the dynamic magnetic flux in a first direction and the second coil drives the dynamic magnetic flux in a second direction opposite the first direction. In an exemplary embodiment of any embodiment described above and/or below, the electromagnetic transducer further comprises at least a first coil and a second coil configured to generate the at least one dynamic magnetic flux, wherein the first coil and the second coil drive the dynamic magnetic flux in the same direction; and a longitudinal axis of the first coil and a longitudinal axis of the second coil tilt relative to one another during transduction. In an exemplary embodiment of any embodiment described above and/or below, the at least one dynamic magnetic flux circuit extends along a closed path consisting of one or more air gaps and solid material; and all of the solid material making up the closed path moves during transduction of the electromagnetic transducer. In an exemplary embodiment of any embodiment described above and/or below, one of: the electromagnetic transducer is a balanced transducer, and the at least one dynamic magnetic flux circuit extends through only two air gaps and respective surfaces of the respective airgaps of the only two air gaps cant relative to one another during transduction; or the electromagnetic transducer is an unbalanced transducer, and the at least one dynamic magnetic flux circuit extends through only one air gap and respective surfaces of the air gap cant relative to one another during transduction.

In an exemplary embodiment, there is an electromagnetic transducer, comprising: at least one active air gap, wherein the active air gap is a non-axial air gap. In an exemplary embodiment of any embodiment described above and/or below, the electromagnetic transducer further comprises a seismic mass, wherein the transducer is configured to move the seismic mass in a major direction of movement upon transduction, the major direction of movement being normal to a major direction of expansion and contraction of the air gap during transduction. In an exemplary embodiment of any embodiment described above and/or below, all air gaps have components that move relative to one another and relative to a static component of the transducer.

Again, any feature of any embodiment herein can be combined with or otherwise be present in any other feature of any other embodiment unless otherwise noted or unless otherwise not enabled. Any feature disclosed herein can be explicitly excluded from any embodiment.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A device, comprising:
   an electromagnetic transducer including at least two dynamic magnetic flux circuits, wherein the device is configured so that alternating current provided to the at least two dynamic magnetic flux circuits during operation of the device causes a surface of an airgap of the device to move so that the device generates vibrations.

2. The device of claim 1, wherein:
   the electromagnetic transducer is part of a prosthesis.

3. The device of claim 1, wherein:
   the electromagnetic transducer includes a spring that supports components that establish a plurality of air gaps, one of the plurality of air gaps establishing the surface of the airgap, of the electromagnetic transducer across which at least one of the dynamic magnetic flux circuits of the at least two dynamic flux circuits extends; and the electromagnetic transducer is configured so that the varying magnetic field across the plurality of air gaps causes the spring and the components that establish the plurality of air gaps to act collectively as a bender.

4. The device of claim 1, wherein:

at least two dynamic flux circuits of the at least two dynamic flux circuits are magnetically decoupled from each other.

5. The device of claim 1, wherein a first dynamic flux circuit of the at least two dynamic flux circuits is established by one or more coils collectively having a first total number of coil turns and wherein a second dynamic magnetic flux circuit of the at least two dynamic flux circuits is established by other one or more coils collectively having a second total number of coil turns and wherein the first total number of coil turns is less than the second total number of coils.

6. The device of claim of claim 1, wherein:

the transducer is an actuator that includes at least one static magnetic flux that extends in a circuit in a plane that is normal to the respective planes in which at least two dynamic magnetic flux circuits of the at least two dynamic flux circuits extend.

7. The device of claim 1, wherein:

a first dynamic magnetic flux circuit of the at least two dynamic flux circuits is tuned for a higher frequency response than a second dynamic magnetic flux circuit of the at least two dynamic flux circuits.

8. The device of claim 1, wherein:

a first dynamic magnetic flux circuit of the at least two dynamic flux circuits is tuned to a high frequency response; and a second dynamic magnetic flux circuit of the plurality of dynamic flux circuits is tuned to a low frequency response;

the first dynamic magnetic flux circuit of the at least two dynamic flux circuits is established by one or more coils collectively having a first total number of coil turns and the second dynamic magnetic flux circuit of the at least two dynamic flux circuits is established by other one or more coils collectively having a second total number of coil turns.

9. The device of claim 8, wherein:

the first total number of coil turns is less than the second total number of coils.

10. The device of claim of claim 5, wherein:

the turns of the coil(s) of a first dynamic magnetic flux circuit of the least two dynamic flux circuits are thicker than the turns of the coil(s) of a second dynamic magnetic flux circuit of the at least two dynamic flux circuits.

11. The device of claim 1, wherein:

a first dynamic magnetic flux circuit of the least two dynamic flux circuits is tuned for a higher frequency response than a second dynamic magnetic flux circuit of the least two dynamic flux circuits, the frequency response of the first dynamic magnetic flux circuit of the at least two dynamic flux circuits being about one and a half times that of the second dynamic magnetic flux circuit of the at least two dynamic flux circuits.

12. The device of claim 1, wherein:

the device is a prosthesis that includes sensor that captures energy in an environment and outputs an electrical signal to the actuator;

the prosthesis is configured so that a first dynamic magnetic flux circuit of the at least two dynamic flux circuits is established by a plurality of first coils electrically arranged in series with one another and a second dynamic magnetic flux circuit of the at least two dynamic flux circuits is established by a plurality of second coils electrically arranged in series with one another; and the prosthesis is configured so that upon output of an electrical signal to the transducer, for the outputted signal, the dynamic magnetic flux generated by the first dynamic magnetic flux circuit of the at least two dynamic flux circuits travers in a direction counter to the direction of travel of the dynamic magnetic flux generated by the second dynamic magnetic flux circuit of the at least two dynamic flux circuits.

13. The device of claim 1, wherein:

the at least two dynamic magnetic flux circuits are energized by the same source, and an impedance of the electrical system of which the two dynamic magnetic flux circuits are a part is the sum of the impedance of a first dynamic magnetic flux circuit of the at least two dynamic magnetic flux circuits and a second dynamic magnetic flux circuit of the at least two dynamic magnetic flux circuits.

14. The device of claim 1, wherein:

the electromagnetic transducer includes a seismic mass that moves relative to a fixation component of the transducer configured to fix the transducer to a body;

a first dynamic flux circuit of the at least two dynamic flux circuits is established by one or more coils collectively having a first total number of coil turns and a second dynamic flux circuit of the at least two dynamic flux circuits is established by other one or more coils collectively having a second total number of coil turns;

the coils of the at least two dynamic flux circuits are part of the seismic mass;

the first total number of coil turns is less than the second total number of coils; and the electrometric transducer includes at least one static flux circuit generated by permanent magnets, wherein the permanent magnets are part of the seismic mass.

15. The device of claim 1, wherein:

at least two dynamic flux circuit of the at least two dynamic magnetic flux circuits are connected to each other by a spring.

16. The device of claim 1, wherein:

the transducer is an actuator; and the device is configured so that a first structure of the device that establishes a first dynamic magnetic flux circuit of the at least two dynamic magnetic flux circuits with components that move relative to one another with actuation of the actuator and a second structure of the device that establishes a second dynamic magnetic flux circuit of the at least two dynamic magnetic flux circuits with components that move with actuation of the actuator move in a one-to-one relationship with each other.

17. The device of claim of claim 2, wherein:

the transducer includes a plurality of static magnetic flux circuits that respectively lie in respective planes, the respective planes being parallel and spaced apart from one another, the respective parallel planes being normal to the respective planes in which at least two dynamic magnetic flux circuits of the at least two dynamic flux circuits extend.

18. The device of claim 1, wherein:
at least two dynamic magnetic flux circuits of the at least two dynamic magnetic flux circuits are mechanically connected to each other; and
the device is configured so that a first dynamic magnetic flux circuit of the at least two dynamic magnetic flux circuits of the at least two dynamic magnetic flux circuits is present even if a second dynamic magnetic flux circuit of the at least two dynamic magnetic flux circuits of the at least two dynamic magnetic flux circuits was not present.

19. The device of claim 1, wherein:
the electromagnetic transducer has a longitudinal axis;
the at least two dynamic magnetic flux circuits include a first dynamic magnetic flux circuit and a second dynamic magnetic flux circuit; and
the first dynamic magnetic flux circuit is concentric with the second dynamic magnetic flux circuit with respect to an axis normal to the longitudinal axis.

20. The device of claim 1, wherein:
the electromagnetic transducer has a longitudinal axis;
the electromagnetic transducer includes a first permanent magnet entirely located on a first side of a first plane parallel to the longitudinal axis and a second permanent magnet entirely located on a second side of the plane opposite the first side of the first plane; and
a first dynamic magnetic flux circuit of the two dynamic magnetic flux circuits is entirely located on a first side of a second plane parallel to the longitudinal axis and a second dynamic magnetic flux circuit of the two dynamic magnetic flux circuits is entirely located on a second side of the second plane opposite the first side of the second plane.

21. The device of claim 1, wherein:
the electromagnetic transducer has a longitudinal axis;
the electromagnetic transducer includes a first permanent magnet and a second permanent magnet, the first permanent magnet located opposite the second permanent magnet with respect to location about the longitudinal axis;
the device includes a first static magnetic flux circuit;
the device includes a second static magnetic flux circuit;
the first static magnetic flux circuit and the second magnetic flux circuit respectively extend completely about the longitudinal axis on respective spaced apart planes normal to the longitudinal axis.

22. The device of claim 1, wherein:
the electromagnetic transducer is an actuator;
the electromagnetic transducer has a longitudinal axis;
the electromagnetic transducer includes a first permanent magnet and a second permanent magnet, the first permanent magnet located opposite the second permanent magnet with respect to location about the longitudinal axis;
the electromagnetic transducer is configured so that the first permanent magnet moves closer to the second permanent magnet and then moves further away from the second permanent magnet in a repeating manner with actuation of the actuator.

23. The device of claim 22, wherein:
the electromagnetic transducer includes a third permanent magnet and a fourth permanent magnet, the third permanent magnet located opposite the fourth permanent magnet with respect to location about the longitudinal axis;
the electromagnetic transducer is configured so that the third permanent magnet moves further away from the fourth permanent magnet and then moves closer to the fourth permanent magnet in a repeating manner with actuation of the actuator when, respectively, the first permanent magnet moves closer to the second permanent magnet and then moves further away from the second permanent magnet in the repeating manner with actuation of the actuator.

24. The device of claim 1, wherein:
the electromagnetic transducer has a longitudinal axis;
the electromagnetic transducer is an actuator;
the at least two dynamic magnetic flux circuits include a first dynamic magnetic flux circuit and a second dynamic magnetic flux circuit; and
a first dynamic magnetic flux that travels in the first dynamic magnetic flux circuit always moves in a direction opposite a second dynamic magnetic flux that travels in the second dynamic magnetic flux circuit.

25. The device of claim of claim 2, wherein:
the transducer includes a plurality of static magnetic flux circuits that are spaced apart from one another, wherein the static magnetic flux circuits of the plurality of static magnetic flux circuits are entirely normal to the respective planes in which at least two dynamic magnetic flux circuits of the at least two dynamic flux circuits extend.

26. The device of claim 19, wherein:
the transducer has a first structural portion and a second structural portion, the first structural portion moving relative to the second structural portion during transduction, a portion of the first dynamic magnetic flux circuit extending through the first structural portion, the movement of the first structural portion during transduction being in a direction parallel to the longitudinal axis.

27. The device of claim 1, wherein:
the electromagnetic transducer includes a first structural portion and a second structural portion; and
the electromagnetic transducer includes a means for moving the first structural portion of the electromagnetic transducer relative to the second structural portion of the electromagnetic transducer during transduction.

28. The device of claim 1, wherein:
the at least two dynamic magnetic flux circuits include a first dynamic magnetic flux circuit and a second dynamic magnetic flux circuit;
the electromagnetic transducer includes an assembly of solid structures; and
all of the solid structures of the assembly of solid structures through which the first dynamic magnetic flux travels move relative to a stationary structure of the device during transduction.

29. The device of claim 1, wherein:
the electromagnetic transducer includes an assembly of solid structures; and
all of the solid structures of the assembly of solid structures through which the only one dynamic magnetic flux travels move relative to a stationary structure of the device during transduction, the stationary structure being structure configured to enable connection of the device to another apparatus.

30. The device of claim 1, wherein:
the device includes a connector configured to connect the device to another apparatus;
the electromagnetic transducer includes a first structural assembly and a second structural assembly;
the at least two dynamic magnetic flux circuits include a first dynamic magnetic flux circuit and a second dynamic magnetic flux circuit; and all solid structure through which the first dynamic magnetic flux extends moves during transduction relative to the connector.

31. The device of claim 10, wherein:

the electromagnetic transducer includes a first core and a second core;

turns of the coil(s) of the first dynamic magnetic flux circuit extend about the first core; and turns of the coil(s) of the second dynamic magnetic flux circuit extend about the second core.

32. The device of claim 1, wherein:

the electromagnetic transducer includes a first core and a second core;

the electromagnetic transducer includes a first coil wound about the first core and a second coil wound about the second core;

the at least two dynamic magnetic flux circuits include a first dynamic magnetic flux circuit and a second dynamic magnetic flux circuit, the first core and the second core establishing part of the first dynamic magnetic flux circuit; and the first core and the second core move independently relative to each other and relative to a stationary component of the electromagnetic transducer during transduction.

33. The device of claim 32, wherein:

the first core and the second core move with respective trajectories during transduction that mirror each other about a plane, wherein a longitudinal axis of the electromagnetic transducer extends in the plane.

34. The device of claim 1, wherein:

the electromagnetic transducer includes a first core and a second core;

the electromagnetic transducer includes a first coil wound about the first core and a second coil wound about the second core;

the at least two dynamic magnetic flux circuits include a first dynamic magnetic flux circuit and a second dynamic magnetic flux circuit, the first core establishing part of the first dynamic magnetic flux circuit, the second core establishing part of the second dynamic magnetic flux circuit; and the first core and the second core move together in a one-to-one manner and move relative to a stationary component of the electromagnetic transducer during transduction.

35. The device of claim 1, wherein:

the device is devoid of piezoelectric components.

36. The device of claim 1, wherein:

the device is a vibrator.

37. The device of claim 1, wherein:

the device is configured so that upon transduction by the electromagnetic transducer, the entire device vibrates.

38. The device of claim 1, wherein:

the device is an electromagnetic actuator.

39. The device of claim 1, wherein:

the device includes an alternating current source that sources the alternating current; and the alternating current sourced by the alternating current source is provided to the at least two dynamic magnetic flux circuits during operation of the device to generate movement of a portion of the device to generate vibrations.

40. The device of claim 1, wherein:

the device is an actuator; and the device is configured to transduce the alternating current to generate movement of the at least two dynamic magnetic flux circuits to actuate the actuator.

41. A device, comprising:

means for transducing electricity into movement of a component, the means for transducing including at least two dynamic magnetic flux circuits, wherein the device is configured so that alternating current provided to the at least two dynamic magnetic flux circuits during operation of the device causes a surface of an airgap of the device to move so that the device generates vibrations; and at least one of:

a seismic mass; or a coupling.

* * * * *